United States Patent
Oberbeck et al.

(10) Patent No.: US 7,435,392 B2
(45) Date of Patent: Oct. 14, 2008

(54) SCALABLE CONTINUOUS PRODUCTION SYSTEM

(75) Inventors: Sebastian Oberbeck, Weilburg (DE); Thomas Schwalbe, Bad Vilbel (DE); Volker Autze, Frankfurt am Main (DE); Klaus Poelderl, Schoeneck (DE)

(73) Assignee: Acclavis, LLC, Brookline, MA (US)

( * ) Notice: Subject to any disclaimer, the term of this patent is extended or adjusted under 35 U.S.C. 154(b) by 1052 days.

(21) Appl. No.: 10/456,162

(22) Filed: Jun. 6, 2003

(65) Prior Publication Data

US 2003/0223909 A1   Dec. 4, 2003

Related U.S. Application Data

(63) Continuation-in-part of application No. 09/991,377, filed on Nov. 15, 2001, now Pat. No. 7,241,423, which is a continuation-in-part of application No. 09/496,999, filed on Feb. 3, 2000, now Pat. No. 6,537,506.

(51) Int. Cl.
*B01J 19/00* (2006.01)
(52) U.S. Cl. .................. 422/130; 422/101; 422/102; 422/104; 422/129; 422/131
(58) Field of Classification Search .............. 422/99, 422/101, 102, 104, 129, 130, 131, 134
See application file for complete search history.

(56) References Cited

U.S. PATENT DOCUMENTS

| | | | |
|---|---|---|---|
| 3,881,701 A | 5/1975 | Schoenman et al. | 259/4 |
| 4,222,671 A | 9/1980 | Gilmore | 366/337 |
| 4,702,073 A | 10/1987 | Melconian | 60/39 |
| 4,728,502 A | 3/1988 | Hamill | 422/116 |
| 4,748,002 A | 5/1988 | Neimark et al. | 422/116 |
| 4,894,146 A | 1/1990 | Giddings | 209/12.2 |
| 5,122,345 A | 6/1992 | Tabor et al. | 422/116 |
| 5,209,906 A | 5/1993 | Watkins et al. | 422/200 |
| 5,250,263 A | 10/1993 | Manz | 422/81 |
| 5,273,715 A | 12/1993 | Bridgham et al. | 422/63 |
| 5,288,468 A | 2/1994 | Church et al. | 422/116 |

(Continued)

FOREIGN PATENT DOCUMENTS

DE   960 183   3/1957

(Continued)

OTHER PUBLICATIONS

Van den Berg, A et al. 1996. "Modular Concept for Miniature Chemical Systems." *DECHEMA Monographs*: 132:109-23.

*Primary Examiner*—Jill Warden
*Assistant Examiner*—Dwayne K Handy
(74) *Attorney, Agent, or Firm*—Ronald M. Anderson

(57) ABSTRACT

A parallel chemical production system producing a desired product by operating a plurality of reactors in parallel. The fluidic properties of each of the reactors are identical to the properties of a test reactor employed to determine conditions for producing the product, to facilitate scaling up production. In one embodiment, the production system is configured such that at least one reactor is always offline for cleaning, servicing, and use as a backup. If sensors detect less than optimal conditions in any reactor, the reactor is taken offline and serviced, while a previously designated backup reactor is placed online to maintain continuous production. Another aspect involves arranging the reactors in a concentric configuration to facilitate equal fluid distribution.

51 Claims, 24 Drawing Sheets

U.S. PATENT DOCUMENTS

| | | | | |
|---|---|---|---|---|
| 5,324,483 | A | 6/1994 | Cody et al. | 422/131 |
| 5,399,317 | A | 3/1995 | Stolowitz | 422/99 |
| 5,463,564 | A | 10/1995 | Agrafiotis | 364/496 |
| 5,468,643 | A | 11/1995 | Su et al. | 436/161 |
| 5,482,862 | A | 1/1996 | LaPack et al. | 436/52 |
| 5,499,650 | A | 3/1996 | McArthur et al. | 137/85 |
| 5,516,423 | A | 5/1996 | Conoby et al. | 210/85 |
| 5,534,328 | A | 7/1996 | Ashmead et al. | 428/166 |
| 5,580,523 | A | 12/1996 | Bard | 422/50 |
| 5,595,712 | A | 1/1997 | Harbster et al. | 422/129 |
| 5,641,400 | A | 6/1997 | Kaltenbach et al. | 210/198.2 |
| 5,644,395 | A | 7/1997 | Folta | 356/246 |
| 5,681,534 | A | 10/1997 | Neves | 422/131 |
| 5,690,763 | A | 11/1997 | Ashmead et al. | 156/60 |
| 5,698,485 | A | 12/1997 | Bruck et al. | 501/87 |
| 5,705,018 | A | 1/1998 | Hartley | 156/345 |
| 5,727,618 | A | 3/1998 | Mundinger et al. | 165/80.4 |
| 5,730,947 | A | 3/1998 | Chaussonnet | 422/177 |
| 5,741,466 | A | 4/1998 | Bodnaras | 422/228 |
| 5,803,600 | A | 9/1998 | Schubert et al. | 366/144 |
| 5,811,062 | A | 9/1998 | Wegeng et al. | 422/129 |
| 5,928,880 | A | 7/1999 | Wilding et al. | 435/7.21 |
| 5,939,024 | A | 8/1999 | Robertson | 422/101 |
| 5,961,932 | A | 10/1999 | Ghosh et al. | 422/193 |
| 5,976,472 | A | 11/1999 | Chatterjee et al. | 422/130 |
| 5,993,750 | A | 11/1999 | Ghosh et al. | 422/191 |
| 6,036,355 | A | 3/2000 | Yant et al. | 366/171 |
| 6,036,927 | A | 3/2000 | Chatterjee et al. | 422/211 |
| 6,063,019 | A | 5/2000 | Wade | 494/14 |
| 6,126,723 | A | 10/2000 | Drost et al. | 96/4 |
| 6,149,882 | A * | 11/2000 | Guan et al. | 422/211 |
| 6,171,865 | B1 | 1/2001 | Weigl et al. | 436/52 |
| 6,180,081 | B1 | 1/2001 | Poschmann et al. | 423/648 |
| 6,190,034 | B1 | 2/2001 | Nielsen et al. | 366/336 |
| 6,190,619 | B1 * | 2/2001 | Kilcoin et al. | 506/33 |
| 6,192,596 | B1 | 2/2001 | Bennett et al. | 34/76 |
| 6,221,226 | B1 | 4/2001 | Kopf-Sill | 204/602 |
| 6,224,832 | B1 * | 5/2001 | Moore et al. | 422/134 |
| 6,264,891 | B1 * | 7/2001 | Heyneker et al. | 422/64 |
| 6,264,900 | B1 | 7/2001 | Schubert et al. | 422/224 |
| 6,306,658 | B1 * | 10/2001 | Turner et al. | 436/37 |
| 6,494,614 | B1 | 12/2002 | Bennett et al. | 336/36 |
| 6,537,506 | B1 | 3/2003 | Schwalbe et al. | 422/130 |
| 6,656,423 | B1 | 12/2003 | Joslyn | 422/1 |
| 6,701,774 | B2 | 3/2004 | Srinivasan et al. | 73/23.42 |
| 6,827,095 | B2 | 12/2004 | O'Connor et al. | 137/15.01 |
| 2002/0042140 | A1 | 4/2002 | Hagemeyer et al. | 436/34 |
| 2002/0045265 | A1 | 4/2002 | Bergh et al. | 436/37 |
| 2002/0080563 | A1 | 6/2002 | Pence et al. | 361/677 |
| 2002/0151080 | A1 | 10/2002 | Dasgupta | 422/55 |
| 2002/0170976 | A1 | 11/2002 | Bergh et al. | 236/49.1 |

FOREIGN PATENT DOCUMENTS

| | | |
|---|---|---|
| EP | 0796654 | 3/1997 |
| WO | WO 87/02139 | 4/1987 |
| WO | WO 93/00625 | 1/1993 |
| WO | WO 98/38487 | 3/1998 |
| WO | WO 99/04892 | 7/1998 |
| WO | WO 98/55812 | 12/1998 |
| WO | WO 99/20395 | 4/1999 |
| WO | WO 00/34728 | 6/2000 |
| WO | WO 00/51720 | 9/2000 |
| WO | WO 00/62914 | 10/2000 |
| WO | WO 00/62919 | 10/2000 |
| WO | WO 01/41916 | 6/2001 |
| WO | WO 01/66245 | 9/2001 |
| WO | WO 01/68257 | 9/2001 |
| WO | WO 01/93998 | 12/2001 |

* cited by examiner

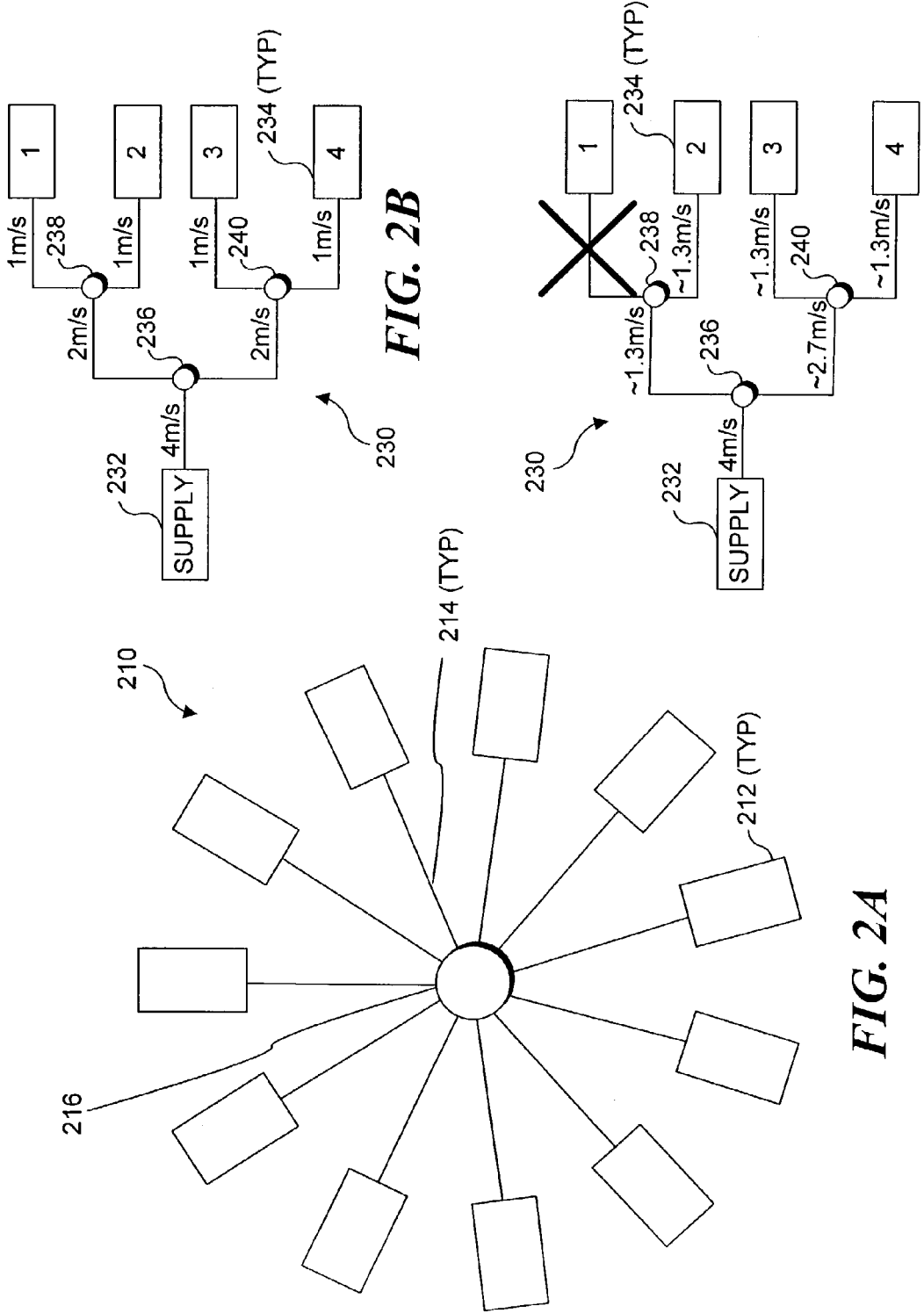

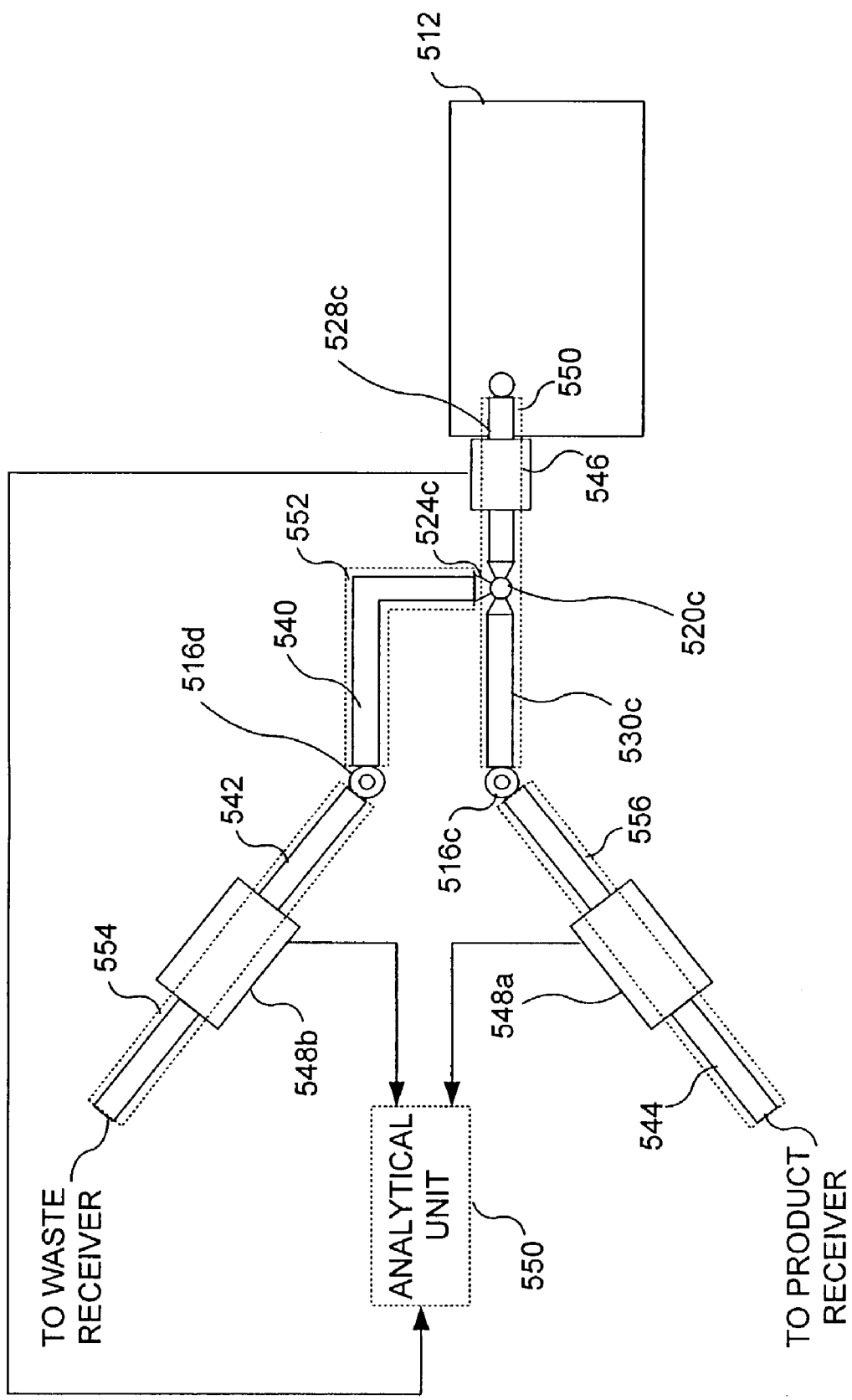

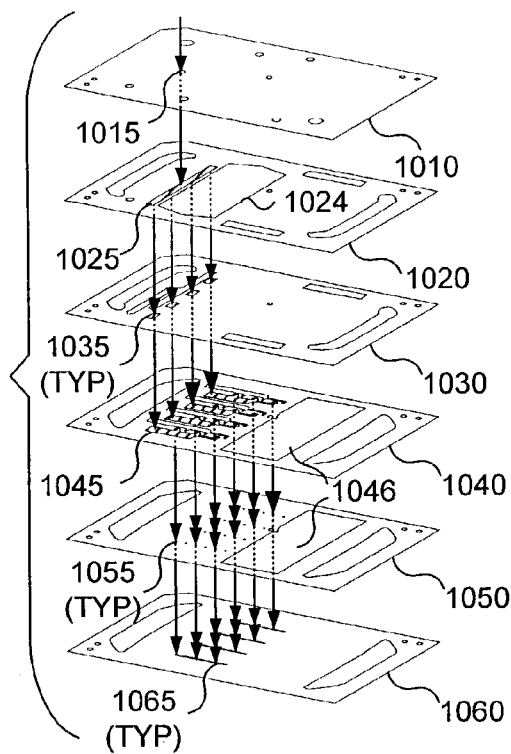
FIG. 11A
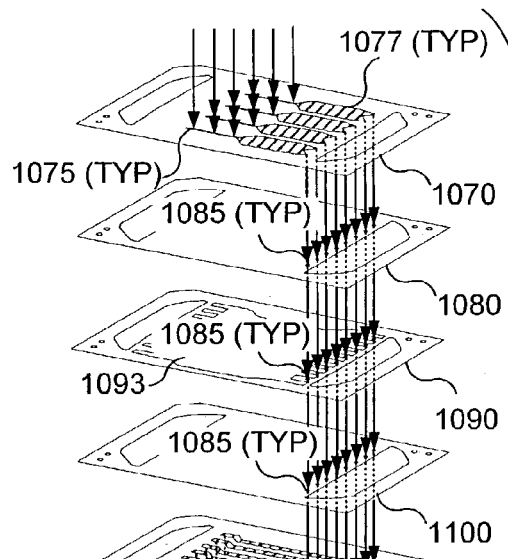
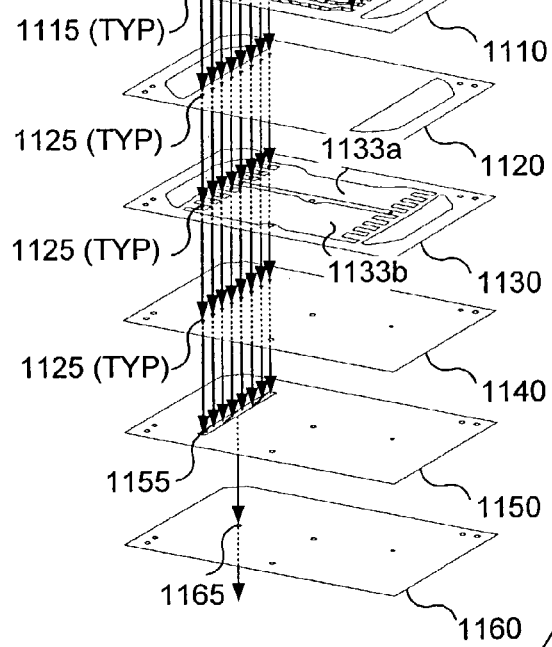
FIG. 11C
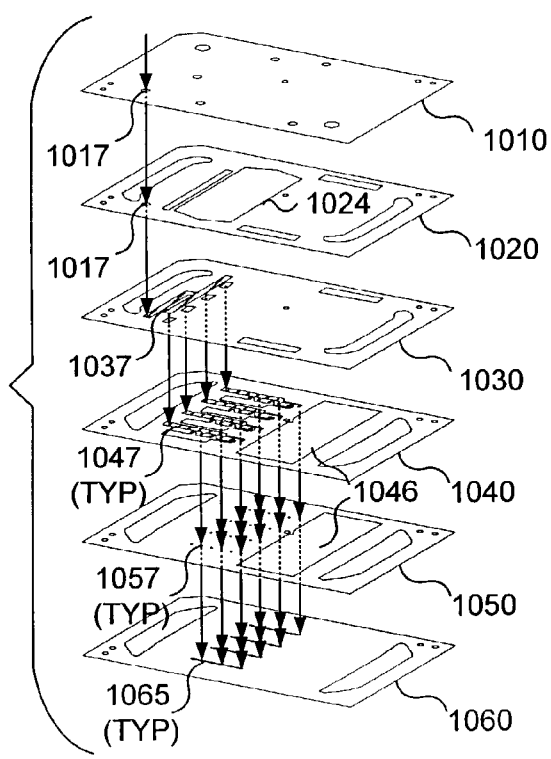
FIG. 11B

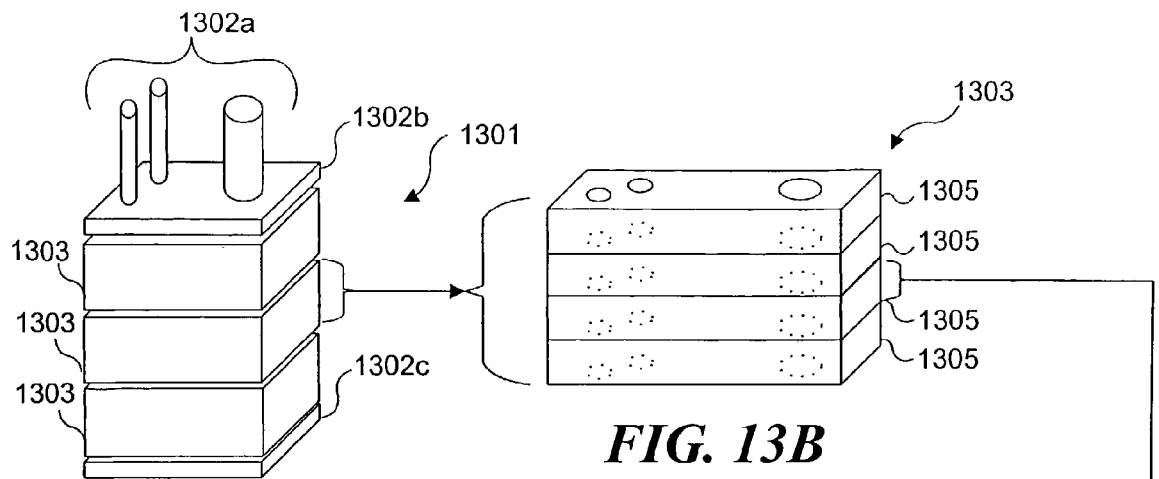
FIG. 13A
FIG. 13B
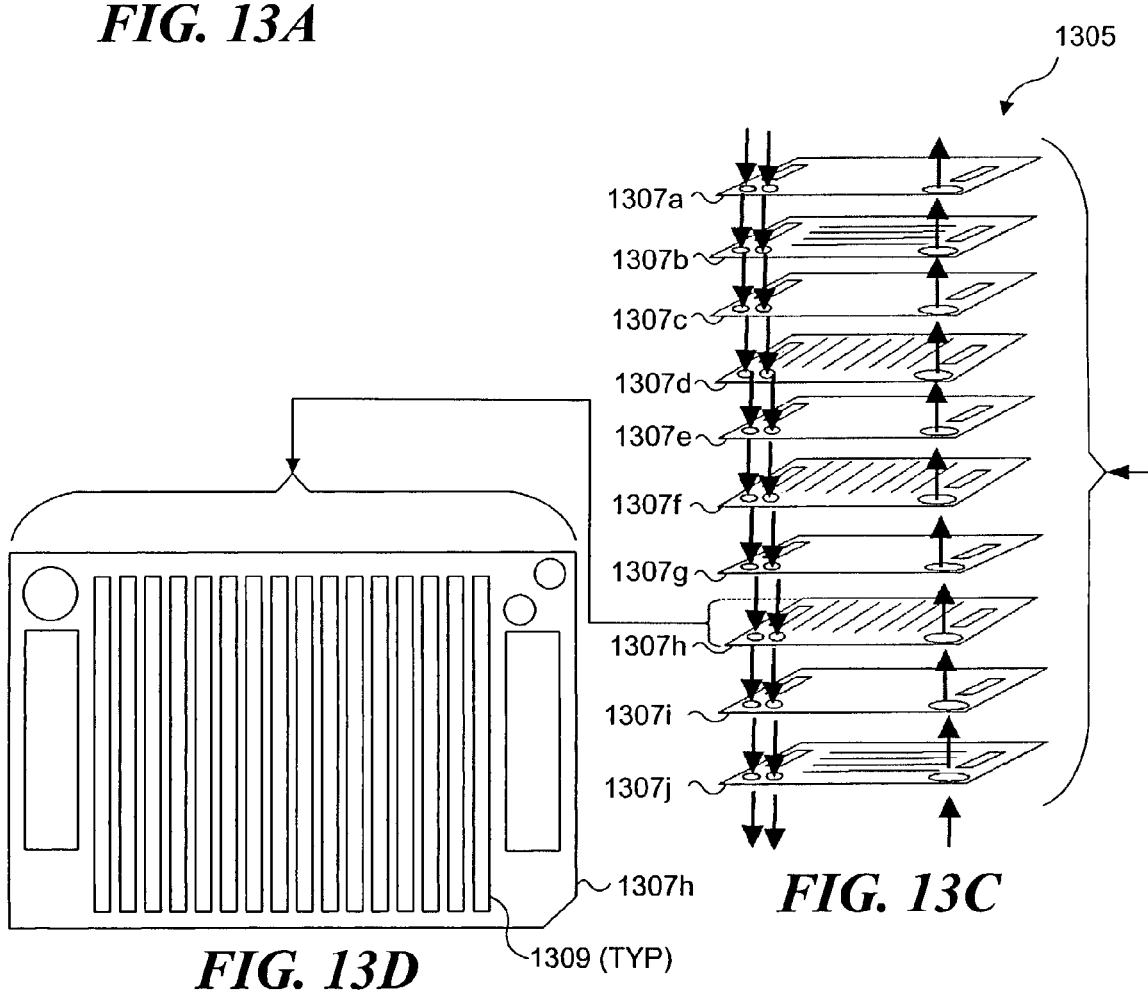
FIG. 13C
FIG. 13D

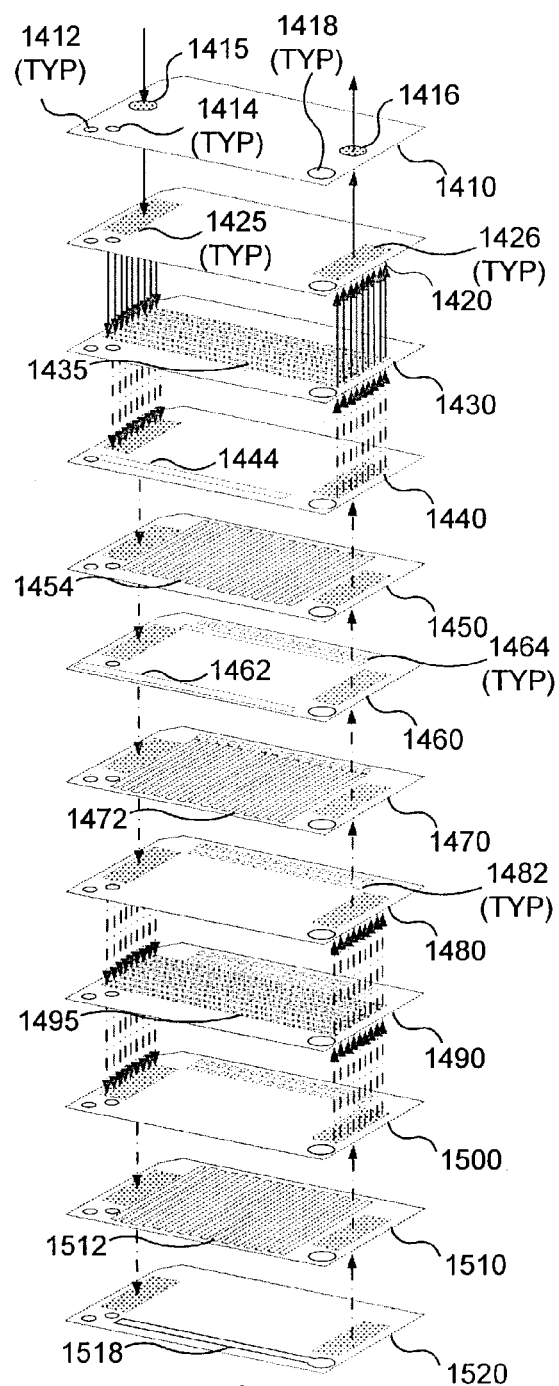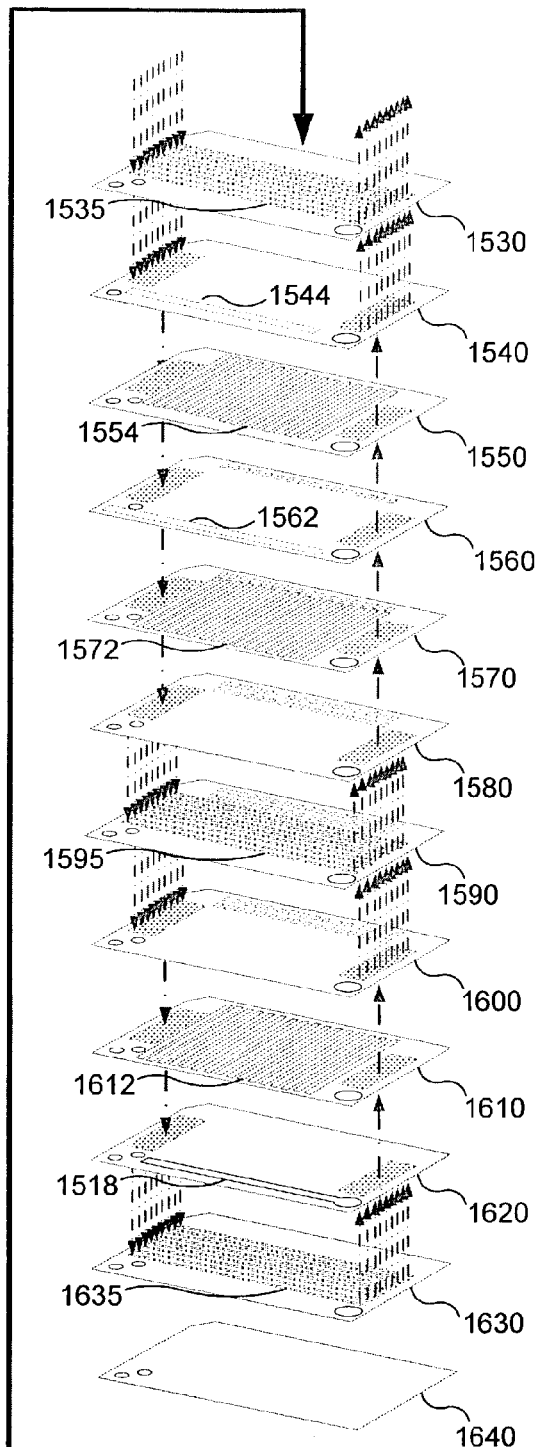
FIG. 14A

SCALABLE CONTINUOUS PRODUCTION SYSTEM

RELATED APPLICATIONS

This application is a continuation-in-part of prior U.S. patent application Ser. No. 09/991,377, filed Nov. 15, 2001, now U.S. Pat. No. 7,241,423 which itself is a continuation-in-part of U.S. patent application Ser. No. 09/496,999, filed Feb. 3, 2000, now U.S. Pat. No. 6,537,506 priority in the filing dates of which are hereby claimed under 35 U.S.C. § 120.

FIELD OF THE INVENTION

This invention generally relates to microreactors for producing chemical products, and more specifically, to a chemical production system including a plurality of separate microreactors operating in parallel and configured such that at least one microreactor is reserved offline as a backup, so that the chemical production system can be operated continuously over long periods of time.

BACKGROUND OF THE INVENTION

Methods of controlling and optimizing processes for producing chemical compounds are well known. The control of parameters such as temperature, pressure, mixing conditions, relative volumes of reactants, and uses of catalysts are generally well understood. Traditionally, newly discovered chemical compounds and processes involving either the production of such compounds, or processes involving the use of such compounds, have initially been carried out by researchers in "bench scale" environments. Particularly promising chemicals or processes may ultimately be produced in quantity by application to industrial-scale processes. Often, problems are encountered in scaling up a process from the laboratory to industrial-scale production.

Problems associated with moving from bench scale production to industrial-scale production often involve changes in process conditions between the bench scale environment and the industrial environment. For example, the temperature of the reactants in a small beaker or flask in a laboratory is much easier to keep constant than the temperature in a production tank having a capacity of hundreds of liters, as is often the case in a chemical processing plant. Variations in other process conditions within a large tank are also more difficult to control, and frequently affect the quality and yield of the desired product.

An alternative to building large scale chemical reactors is to operate a plurality of relatively smaller reactors in parallel. This can minimize the problem inherent in scaling up from the bench scale environment to the industrial environment, particularly if the plurality of chemical reactors operating in parallel are similar to the reactor employed in bench scale development.

Recently, much attention has been directed to the use of micro scale reactors for development of both chemical processes and chemicals. These types of reactors offer several advantages. As noted above, the control of chemical processes within very small reactors is much simpler than control in a large-scale production tank. Once a reaction process has been developed and optimized in a micro scale reactor, it can be scaled up to industrial production level by replicating the micro scale reactors in sufficient quantity to achieve the required production output of the process. If such reactors can be fabricated in quantity, and for a modest cost, industrial quantities of a desired product can be manufactured with a capital expenditure equal to or even less than that of a traditional chemical production facility. An additional benefit is that because the volume of material in each individual reactor is small, the effect of an explosion or fire is minimized, and with proper design, an accident in one reactor can be prevented from propagating to other reactors.

A distinction can be made between chemical production systems that are operated continuously, and those operated discontinuously. Discontinuous processing is often referred to as batch processing. As used herein and in the claims that follow, the term "continuous processing" refers to a processing environment in which a continuous stream of material is processed without interruption, generally over a relatively long period, measured, for example, in terms of days or weeks. The continuous process is generally interrupted only for maintaining the processing equipment, and not because the supply of material being treated or consumed has been exhausted. In contrast, the term "batch processing" as used herein refers to a processing environment in which a finite volume of material is processed without interruption, but only until the supply of material is exhausted, in a period that is relatively short, and generally measurable in terms of minutes or hours. Batch processing, rather than continuous flow processing, is advantageous when a limited volume of material is to be processed. While microreactors are advantageous for the reasons noted above, microreactors are prone to fouling. The fluid channels within microreactors are quite small (micro in size, hence the term microreactors), and their small size make them susceptible to being plugged by reactants, product, byproducts, impurities and the like. Thus, most microreactor based chemical production systems are batch processing systems, as microreactors need for frequent maintenance makes them less well suited for continuous processing applications. It would be desirable to provide a continuous processing chemical production system that offers the advantages of microreactors, but does not need to be frequently shut down for maintenance operations.

Many different types of chemical production systems are known. Often in large-scale chemical or pharmaceutical production, reactors are made as large as possible to generate as much volume of product as possible. At the opposite end of the scale, there is often a need, particularly in the development of new compounds or in clinical diagnoses, to produce large combinatorial libraries, with relatively small amounts of different compounds being generated. Chemical production systems optimized for such requirements generally minimize the size of each reactor, and employ different reaction conditions in each reaction chamber, to produce many different compounds in parallel. Exemplary of such systems are patents and patent applications assigned to Symyx Technologies, including: U.S. patent application Publication No. 2002/0045265; U.S. patent application Publication No. 2002/0042140; International Patent Application Publication No. WO 01/93998; International Patent Application Publication No. WO 01/66245; International Patent Application Publication No. WO 00/51720; and U.S. Pat. No. 6,149,882 (collectively referred to as the Symyx references). The Symyx references generally disclose parallel reactors and fluid control systems configured to enable different flow rates to be achieved in different reactors, or using fluid channels with variable flow resistance, which facilitates producing different products in parallel.

In addition to the variable flow resistance described in the Symyx references, other fluid control configurations are known. U.S. patent application Publication No. 2002/0080563 (Pence et al.) discloses a fluid control device for thermal management that includes both a concentric flow, and bifurcated flow. International Patent Application Publication No. WO 01/68257 (Jury et al.) discloses a parallel micro reactor based chemical production system that incorporates bifurcated fluid flow channels.

When a plurality of chemical reactors are operated in parallel, regardless of whether the reactors are micro scale reactors or larger reactors, it should be apparent that raw materials and heating transfer media can be supplied through individual fluid lines to each reactor. While effective, such a configuration requires multiple pumps and too many fluid lines, making fluid control for such a parallel production system much more complicated than required in a single reactor system of larger scale. It would therefore be desirable to provide a more efficient and less costly fluid control system for reactors coupled in parallel. It would be desirable, particularly with respect to systems that include microreactors, to provide fluid control systems that ensure that the volumes and flow rates of reactants and heat transfer media into and out of each reactor are equivalent, so that the process conditions in each reactor are the same, thereby ensuring that the product generated by each reactor in the parallel production system is consistent.

Because parallel reactor chemical production systems are well suited to the production of commercial quantities of a desired product, it is likely that such a system will be operated continuously over long periods of time. Chemical production systems that are shut down for maintenance are not producing revenue; thus, it would be desirable to provide a parallel reactor chemical production system configured for continuous production over relatively long periods of time, such that the system is offline for minimal periods of time.

Several different microreactor designs have been developed for use in a parallel chemical production system. In addition to the micro reactor designs described in the Symyx references, microreactors suitable for such use are also described in U.S. Pat. No. 5,534,328 (Ashmead et al.); U.S. Pat. No. 5,690,763 (Ashmead et al.); U.S. Pat. No. 5,580,523 (Bard); and U.S. Pat. No. 5,961,932 (Ghosh et al.).

The two Ashmead patents describe reactors fabricated from a plurality of interconnected layers. Generally, each layer has at least one channel or groove formed in it, and most include orifices that serve to connect one layer in fluid communication with another. These layers are preferably made from silicon wafers, because silicon is relatively inert to the chemicals that may be processed in the reactor, and because the techniques required to mass produce silicon wafers by etching the required channels and other features into their surfaces are well known.

A disadvantage of the reactors described by Ashmead stems from the rather expensive and complicated process required for manufacturing the devices. While silicon wafer technology has advanced to the state that wafers having desired surface features can readily be mass produced, the equipment required is capital intensive, and unless unit production is extremely high, the substantial costs are difficult to offset. The specific surface features taught by Ashmead require significant manufacturing steps to fabricate. For instance, while forming an opening through a material is relatively easy, forming a groove or channel that penetrates only part way through the material comprising a layer is more difficult, as the manufacturing process must not only control the size of the surface feature, but the depth, as well.

Bard similarly discloses the use of silicon wafer technology to etch channels and/or other features into the surface of a silicon wafer to be used as a micro reactor. Other disclosed fabrication techniques include injection molding, casting, and micromachining of metals and semiconductor substrates. Again, the processing required to fabricate the individual modules goes beyond merely forming a plurality of openings into each component.

The Ghosh patent describes the desirability of sizing fluid channels in microreactors appropriately to provide for laminar flow and mixing via diffusion, rather than mixing via turbulence. Ghosh describes fabricating reactor layers from "green" or uncured ceramic, which once shaped as desired, must be sintered. Significantly, the sintering process changes the size of the ceramic layer, so that the sizes of the features formed into the ceramic layer in the initial stages of production are different than in the finished product.

It would be desirable to provide a reactor design in which the dimensions of the individual components can be rigidly controlled during fabrication, and are not subject to shrinkage, which can negatively effect the dimensions of the finished reactor. This object is particularly important when a reactor design focuses on achieving a laminar flow, because precise dimensional control of fluid pathways in the reactor must be maintained to achieve a consistent laminar flow, precisely controlled pressure drops, and precisely controlled fluidic resistance.

In all of these prior art reactors, relatively complicated manufacturing techniques are required. The manufacture of layers of silicon material requires a large capital investment. Sintering of a ceramic material requires the precise control of the shrinkage process, or individual components of a desired size cannot be achieved. In all cases, the prior art teaches that complicated structures (for example, fluid channels and reaction channels) must be etched or otherwise fabricated in each layer. Additionally, orifices or passages also need to be formed in each layer, so that fluids can move between adjacent layers of the reactor. Thus, a series of different manufacturing steps typically must be performed for each layer. It would be desirable to provide a reactor design offering the advantages described above, but which is relatively simple to manufacture, so as to minimize capital investment in scaling up production from the laboratory to industrial production levels.

As indicated above, while a single micro reactor can produce only a limited volume of product, additional microreactors can be added in parallel to increase production capacity. When additional modular micro reactor units are added, additional systems for reactant supply, heat transfer media supply, and product collection are typically required, which not only increases the complexity of the system, but also requires more space for duplicative parallel fluid systems. Furthermore, even minor differences in feed rates for some of the parallel reactor modules can negatively effect product quality. Finally, more sophisticated control and monitoring are required to manage additional reaction modules and feed systems. It would therefore be desirable to provide a micro reactor capable of n-fold parallelization without requiring that additional fluid and control systems be provided.

Consider an array of identical fluid channels having a single common reactant distribution channel and a single common product collection channel, with the reactant inlet and the product outlet located at opposite ends. If the common reactant distribution and the common product collection channel have the same cross sectional area and if the viscosity of the product relative to the reactants is substantially the same, then the pressure drop through the array can be considered the same. In addition, the resulting flow distribution is fairly even, with only slightly lower flow rates in the central fluid channels.

However, the flow distribution through this array will not be even if the viscosity of the product is significantly different than the viscosities of the reactants. When such an array is employed to process a reaction whose product has a significantly different viscosity compared to the viscosity of the mixture of the unreacted reactants, broad residence time distributions occur in the array due to the fact that the pressure drop in the common reactant distribution channel no longer balances with the pressure drop in the common product collection channel. The flow rates within each individual fluid channel in the array are no longer identical. If the viscosity of the product is significantly greater than the viscosity of the mixed but unreacted reactants, then the flow rates in the individual fluid channels in the array tend to increase across the array for channels closest to the common product outlet. Thus, the highest flow rate is experienced in the fluid channel in the array that is closest to the common product outlet, while the lowest flow rate is experienced in the fluid channel in the array that is located furthest from the common product outlet. This phenomenon is different if the viscosity of the product is less than the viscosity of the mixed but unreacted reactants. For lower viscosity products, the highest flow rate is experienced in the fluid channel in the array that is closest to the common reactant inlet, while the lowest flow rate is experienced in the fluid channel in the array that is located furthest from the common reactant inlet. The greater the relative change in viscosity, the greater the variation in flow rates across the array.

This imbalance leads to different residence times being associated with different fluid channels, resulting in an undesirable imbalanced residence time distribution within the whole reaction unit. In certain cases, the additional residence time can lead to undesired cross reactions, and even clogging of the "slowest" fluid channels. It would be desirable to provide a micro reactor including a plurality of fluid channels that is capable of processing reactant mixtures undergoing a significant viscosity change without the above-described imbalanced residence time distributions and related problems, so that such a micro reactor can be incorporated into a parallel chemical production system.

It should further be noted that for the imbalanced residence time distributions discussed above, only one type of undesirable residence time distribution is discussed relative to reactant mixtures produced in fluid channels in which a plurality of different reactants are mixed. Similar distribution problems can also arise in fluid channels used to direct reactants before mixing, as well as products for collection. It would be desirable to provide a micro reactor that includes a plurality of fluid channels adapted to provide substantially equal residence time distributions for fluid flow within the micro reactor, to provide a micro reactor that can be incorporated into a parallel chemical production system.

Other desirable features for a parallel chemical production system include ease of manufacture, a relatively small footprint, the ability to employ efficient diffusion mixing using a precisely controlled laminar flow, the ability to facilitate n-fold parallelization without requiring additional fluid supply, removal, and control systems, individual reactors that can process reaction mixtures to form a product with a significantly different viscosity, and systems that can provide substantially equal residence time distributions for fluid flow within each different reactor. Currently, the prior art does not include reactors that can achieve these objectives.

SUMMARY OF THE INVENTION

One aspect of the present invention is directed to a continuous processing parallel chemical production system for automatically producing a desired chemical product by combining at least two reactants. Such an embodiment is referred to as an automated continuous processing parallel chemical production system. The automated continuous processing parallel chemical production system includes a plurality of chemical reactors, each of which is configured to produce a quantity of the desired chemical product. Each chemical reactor includes a first reactant inlet, a second reactant inlet, and a product outlet. The system also includes a reactant feed apparatus, which itself includes a first and second reactant feed assembly. Each reactant feed assembly is respectively configured to be placed in fluid communication with a supply of a first reactant and a second reactant. Each first reactant feed assembly is configured to selectively couple the first reactant inlet of each chemical reactor in parallel fluid communication with the supply of the first reactant. Similarly, each second reactant feed assembly is configured to selectively couple the second reactant inlet of each chemical reactor in parallel fluid communication with the supply of the second reactant. The system includes a product collection assembly configured to be placed in fluid communication with a product receiver, and to selectively couple the product outlet of each chemical reactor in fluid communication with the product receiver.

Further, the system includes a system controller controllably coupled with the first reactant feed assembly, the second reactant feed assembly, and the product collection assembly. The system controller is programmed to monitor and control production of the desired chemical product by the plurality of chemical reactors. The system controller can designate one or more of the plurality of chemical reactors as a backup reactor(s), causing each reactant feed assembly to isolate the corresponding reactant inlet of the backup reactor from the supply of the first and second reactants, while coupling the corresponding reactant inlets of each other reactor in fluid communication with the supply of the first reactant and second reactants. The system controller also causes the product collection assembly to isolate the product outlet of the backup reactor(s) from the product receiver, while coupling the product outlet of each other reactor in fluid communication with the product receiver.

Preferably, each chemical reactor of the parallel system is a micro reactor, and each chemical reactor (micro reactor or not) is configured to provide substantially identical processing conditions. Particularly when each chemical reactor is a micro reactor, each chemical reactor is substantially identical to a test reactor employed to determine preferred processing conditions that should be employed to produce the desired chemical product, before the automated continuous processing parallel chemical production system is used to produce larger quantities of the desired chemical product.

It is further preferable for the system controller to be programmed to designate a different one of the plurality of chemical reactors as the backup reactor after a predefined period. The previously designated backup reactor is then coupled in fluid communication with the supply of the first reactant, the supply of the second reactant, and the product receiver, while the newly designated backup reactor is isolated from the supply of the first reactant, the supply of the second reactant, and the product receiver. This step enables the newly designated backup reactor to be available for maintenance operations to facilitate continuous production of the desired product over extended periods of time.

In some embodiments of the automated continuous processing parallel chemical production system, the product collection assembly includes a sensor for each chemical reactor. Each sensor is disposed between the product outlet of the chemical reactor and the product receiver, so that an indication of the quality of the chemical product produced by the chemical reactor is provided to the system controller. In such embodiments, the system controller is programmed to designate a different one of the plurality of chemical reactors as the backup reactor when one of the sensors indicates that the quality of the chemical product produced by its corresponding chemical reactor deviates from a predetermined standard. Again, the previously designated backup reactor is then coupled with the supply of the first reactant, the supply of the second reactant, and the product receiver, while the newly designated backup reactor is isolated from the supply of the first reactant, the supply of the second reactant, and the product receiver, thereby making the newly designated backup reactor available for maintenance operations.

Preferred embodiments will also be configured such that the first reactant feed assembly and the second reactant feed assembly are each respectively configured to be selectively coupled in fluid communication with a first solvent supply and a second solvent supply. In such an embodiment, the first reactant feed assembly can selectively couple the first reactant inlet in fluid communication with one of the first reactant supply and the first solvent supply, and the second reactant feed assembly can selectively be configured to couple the second reactant inlet in fluid communication with one of the second reactant supply and the second solvent supply. Similarly, the product collection assembly is configured to be selectively coupled in fluid communication with a waste receiver, such that for each chemical reactor, the product collection assembly can selectively be configured to couple the product outlet in fluid communication with one of the product receiver and the waste receiver, thereby enabling the backup reactor to be flushed with solvent.

Incorporating a heat exchanger into such an automated continuous processing parallel chemical production system is desirable. In some embodiments, a common heat exchange assembly is coupled in fluid communication with each chemical reactor and a heat transfer media supply. The common heat exchange assembly provides substantially equivalent thermal conditions in each chemical reactor.

In some embodiments of an automated continuous processing parallel chemical production system of this type, the chemical reactors are disposed in a generally concentric orientation. For such embodiments, the common heat exchange assembly preferably includes a first fluid line disposed outwardly of the plurality of chemical reactors, and a second fluid line disposed inwardly of the plurality of chemical reactors. Each chemical reactor is coupled in fluid communication with the first and second fluid lines. In related embodiments, the first and second fluid lines of the common heat exchange assembly are configured as concentric rings, and chemical reactors are disposed between the concentric rings.

Some embodiments of such an automated continuous processing parallel chemical production system are configured so that the first reactant feed assembly includes a first reactant distributor. The first reactant distributor is configured to couple in fluid communication with the supply of the first reactant. A plurality of first reactant fluid lines are configured to selectively couple the first reactant distributor to each first reactant inlet of the plurality of chemical reactors. Each first reactant fluid line is configured to provide a substantially equivalent flow rate. A second reactant distributor and a plurality of second reactant fluid lines are similarly configured.

Preferably, each first reactant fluid line includes a valve configured to selectively couple the first reactant inlet of each reactor in fluid communication with either the supply of the first reactant or the supply of the first solvent supply. Each second reactant fluid line includes a similarly valve for selectively coupling the second reactant inlet of each reactor in fluid communication with either the supply of the second reactant or the second solvent supply. Each valve is controllably coupled with the system controller. In this embodiment, the product collection assembly preferably includes a product collector configured to couple in fluid communication with the product receiver.

In such embodiments, the product collection assembly includes a plurality of product fluid lines that selectively couple the product collector to each product outlet of the plurality of chemical reactors, each product fluid line being configured to provide a substantially equivalent flow rate. Preferably, each product fluid line includes a valve configured to selectively couple the product outlet of each reactor in fluid communication with either the product receiver or the waste receiver. Again, each such valve is controllably coupled with the system controller.

In at least one embodiment, each chemical reactor includes a plurality of simple plates stacked together in layers. Each such reactor includes a first inlet pathway coupled to the first reactant inlet and a second inlet pathway coupled to the second reactant inlet. Each of the first and the second inlet pathways merge within the reactor to form at least one reaction chamber in which at least two chemical reactants can react to generate a chemical product. At least one outlet pathway couples the at least one reaction chamber in fluid communication with the product outlet. Each first reactant inlet, first reactant pathway, second reactant inlet, second reactant pathway, reaction chamber and product outlet comprises an opening through at least one simple plate aligned with at least a portion of an opening through an adjacent simple plate.

In a related embodiment, each chemical reactor includes a plurality of simple plates, stacked in layers. Each simple plate has at least one opening that extends therethrough, an opening in each simple plate overlapping at least one other opening in an adjacent simple plate. The simple plates, when stacked in layers, thus define a fluid path for the first and second reactants, a fluid path for the desired chemical product, a fluid path for a heat transfer medium, a heat exchanger coupled in fluid communication with the fluid path for the heat transfer medium, and means for manipulating a flow of fluid in the stacked plate reactor to achieve a desired result.

Yet another type of chemical reactor that can be used in the automated continuous processing parallel chemical production system is formed from a plurality of simple plates, stacked in layers. Each simple plate has at least one opening that extends therethrough, an opening in each simple plate overlapping at least one other opening in an adjacent simple plate, thereby forming a fluid path for the first and second reactants, a processing volume in fluid communication with each fluid path for the first and second reactants, a fluid path for the desired chemical product in fluid communication with the processing volume, and a means for enhancing at least one of a quantity of the desired chemical product that is produced by the stacked plate reactor per unit time, and a quality of the desired chemical product that is produced by the stacked plate reactor.

Yet another aspect of the present invention is directed to a parallel chemical production system that includes a plurality of chemical reactors, each configured to produce a quantity of the desired chemical product, and disposed in a generally concentric orientation. Such an embodiment is referred to as a concentrically parallel chemical production system. Each chemical reactor includes a first reactant inlet, a second reactant inlet, and a product outlet.

The concentrically parallel chemical production system also has a reactant feed apparatus that includes a first reactant feed assembly configured to be placed in fluid communication with a supply of a first reactant, and to couple the first reactant inlet of each chemical reactor in parallel fluid communication with the supply of the first reactant. A second reactant feed assembly is also included, and is configured to be placed in parallel fluid communication with a supply of a second reactant. The parallel chemical production system also includes a product collection assembly configured to be placed in fluid communication with a product receiver, and to couple the product outlet of each chemical reactor in fluid communication with the product receiver.

In some embodiments, each reactant feed assembly includes a reactant distributor, configured to respectively couple in fluid communication with the supply of the first reactant and the supply of the second reactant. The first reactant feed assembly also includes a plurality of first reactant fluid lines configured to selectively couple the first reactant distributor to each first reactant inlet of the plurality of chemical reactors. Each first reactant fluid line is configured to provide a substantially equivalent flow rate, and each first reactant fluid line includes a first reactant fluid line valve configured to selectively couple the first reactant inlet of each reactor in fluid communication with either the supply of the first reactant or a first solvent supply. The second reactant feed assembly similarly includes a plurality of second reactant fluid lines configured to selectively couple the second reactant distributor to each second reactant inlet of the plurality of chemical reactors. Each second reactant fluid line is also configured to provide a substantially equivalent flow rate, and includes a second reactant fluid line valve configured to selectively couple the second reactant inlet of each reactor in fluid communication with either the supply of the second reactant or a second solvent supply. Such embodiments also include a product collection assembly incorporating a product collector configured to couple in fluid communication with the product receiver. The product collection assembly also includes a plurality of product fluid lines configured to selectively couple the product collector to each product outlet of the plurality of chemical reactors. Each product fluid line is configured to provide a substantially equivalent flow rate, and includes a product fluid line valve configured to selectively couple the product outlet of each reactor in fluid communication with one of the product receiver and a waste receiver, to enable each chemical reactor to be isolated from the other chemical reactors, and to be flushed with solvent.

Generally as discussed above, the concentrically parallel chemical production system can include a common heat exchange assembly coupled in fluid communication with each chemical reactor and a heat transfer media supply, so that substantially equivalent thermal conditions are established in each chemical reactor. Preferably, the common heat exchange assembly includes a first fluid line and a second fluid line configured as concentric rings, and the plurality of chemical reactors are disposed between the concentric rings.

The concentrically parallel chemical production system can beneficially include a system controller controllably coupled with the first reactant feed assembly, the second reactant feed assembly, and the product collection assembly. Preferably, the system controller is programmed to monitor and control production of the desired chemical product by the plurality of chemical reactors and to designate at least one of the plurality of chemical reactors as a backup reactor, thereby achieving an automated continuous processing concentrically parallel chemical production system.

The system controller causes the first reactant feed assembly to isolate the first reactant inlet of the backup reactor from the supply of the first reactant, while coupling the first reactant inlet of each other reactor in fluid communication with the supply of the first reactant. Similarly, the system controller causes the second reactant feed assembly to isolate the second reactant inlet of the backup reactor from the supply of the second reactant, while coupling the second reactant inlet of each other reactor in fluid communication with the supply of the second reactant. Further, the system controller causes the product collection assembly to isolate the product outlet of the backup reactor from the product receiver, while coupling the product outlet of each other reactor in fluid communication with the product receiver.

In such embodiments, the system controller is programmed to designate a different one of the plurality of chemical reactors as the backup reactor after a predefined period. The previously designated backup reactor is then coupled in fluid communication with the supply of the first reactant, the supply of the second reactant, and the product receiver, while the newly designated backup reactor is isolated from the supply of the first reactant, the supply of the second reactant, and the product receiver.

Sensors can be included so that the product from each chemical reactor is individually monitored. The system controller can then be programmed to designate a different one of the plurality of chemical reactors as the backup reactor when one of the sensors indicates that the quality of the chemical product produced by its corresponding chemical reactor deviates from a predetermined standard.

Still another aspect of the present invention is directed to a method for producing a desired chemical product by combining at least two reactants. The method includes the steps of providing a plurality of chemical reactors, where each chemical reactor is configured to produce a quantity of the desired chemical product, and using the plurality of chemical reactors to form a concentrically parallel chemical production system, in which the plurality of chemical reactors are disposed in a generally concentric orientation. The method also includes the steps of introducing a quantity of a first reactant into each chemical reactor, such that a flow rate associated with each quantity of first reactant introduced into each chemical reactor is substantially equivalent, and introducing a quantity of a second reactant into each chemical reactor, such that a flow rate associated with each quantity of second reactant introduced into each chemical reactor is substantially equivalent. The reactants combine in each reactor to produce the desired product. A quantity of the desired chemical product is collected from each chemical reactor.

Microreactors can be used for each chemical reactor. The chemical reactors can be configured to provide substantially identical processing conditions.

Some embodiments of the method include the step of coupling each of the plurality of chemical reactors to a common heat exchange assembly that includes a first fluid line and a second fluid line. Preferably, the first and second fluid lines are configured as concentric rings, and the plurality of chemical reactors are disposed between the concentric rings.

Another aspect of the method is designating one of the plurality of chemical reactors as a backup reactor, generally as described above, to facilitate concentrically parallel continuous processing. Again, the predetermined condition triggering the selection of another of the chemical reactors as the backup reactor can be the lapse of a predetermined time interval, or detecting a change in quality of a product from a specific chemical reactor. The backup reactor can be flushed with a cleaning solvent.

Another aspect of the present invention is directed to a method for producing a desired chemical product using an automated continuous processing parallel chemical production system, in which a backup reactor is always designated, as opposed to being an optional step. This method includes the steps of providing an automated continuous processing parallel chemical production system having a plurality of substantially identical chemical reactors, each chemical reactor being configured to produce the desired chemical product. The number of chemical reactors provided is in excess of the number of chemical reactors required to produce a desired quantity of the desired chemical product per unit time, and one of the chemical reactors is designated as a backup reactor. Quantities of the first and second reactant are introduced into each chemical reactor not designated as the backup reactor, and the desired product is collected from each chemical reactor not designated as the backup reactor. In response to a predetermined condition, a different one of the plurality of chemical reactors is designated as the backup reactor, and the newly designated backup reactor is isolated so that the first reactant and second reactant are no longer introduced into the newly designated backup reactor. The first and second reactants are introduced into the previously designated backup reactor, and the desired product is collected from the previously designated backup reactor.

Preferably, each step related to introducing the first and second reactant into the chemical reactors, collecting the desired chemical product, and designating one of the chemical reactors as a backup reactor is executed automatically. In some embodiments, each chemical reactor is a micro reactor. As noted above, the predetermined condition can correspond to the lapse of a predetermined time interval, or can be associated with the detection of a change in quality of the desired product from one of the chemical reactors.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2A is a schematic diagram that illustrates another aspect of the present invention, in which each of the parallel reactors in a parallel chemical production system are configured in a concentric orientation, which facilitates establishing substantially equivalent flow rates into each reactor;

FIGS. 2B and 2C are schematic diagrams that illustrate how the concentric distribution provided by the reactor configuration of FIG. 2A results in fluid distribution advantages over bifurcated fluid networks;

Figure 3A:
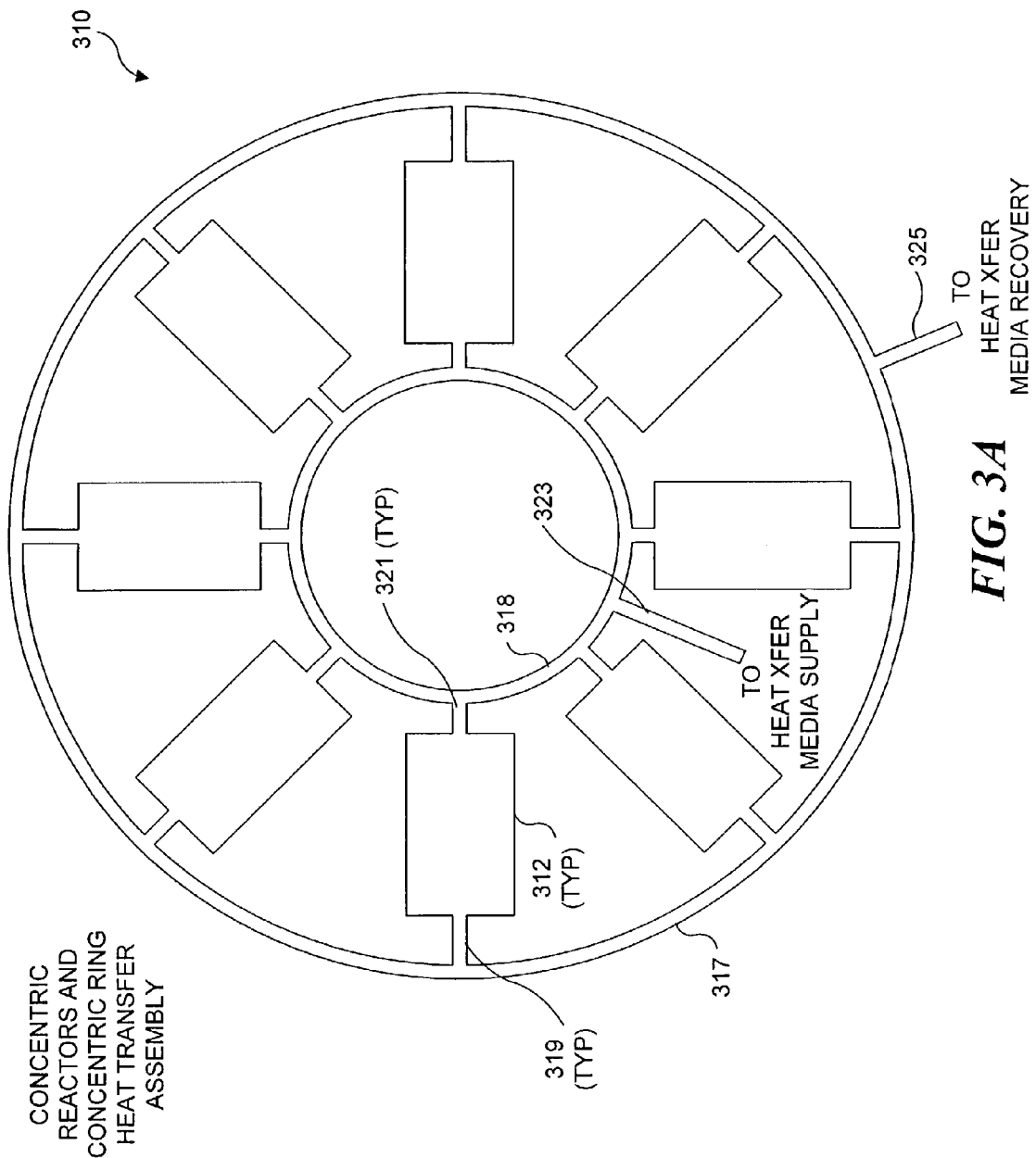
FIG. 3A is a schematic diagram that illustrates the incorporation of a concentric ring heat transfer assembly into the parallel chemical production system of FIG. 2.
Figure 3B:
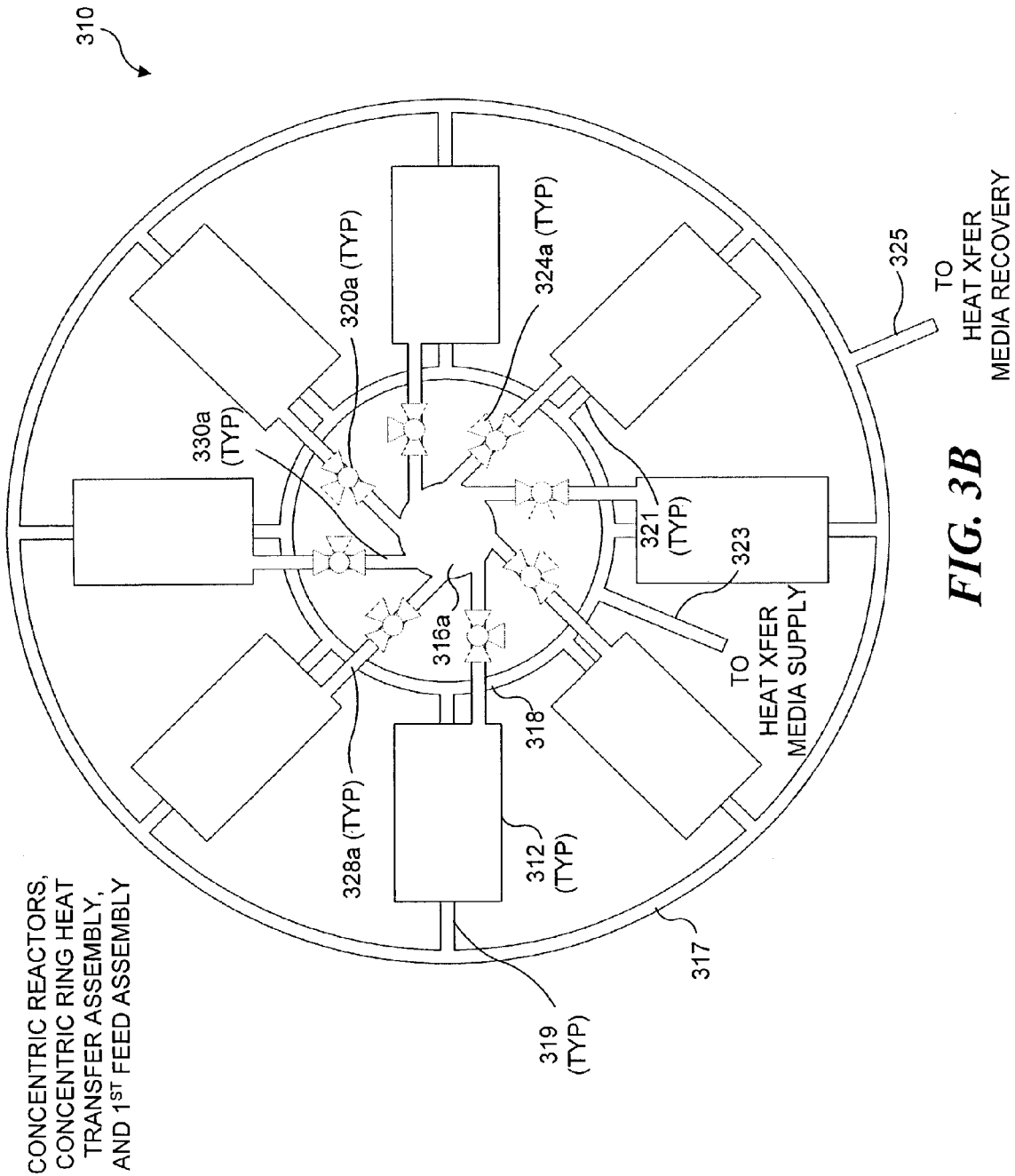
FIG. 3B is a schematic diagram that illustrates the incorporation of a first reactant feed assembly into the parallel chemical production system of FIG. 3A.
Figure 3C:
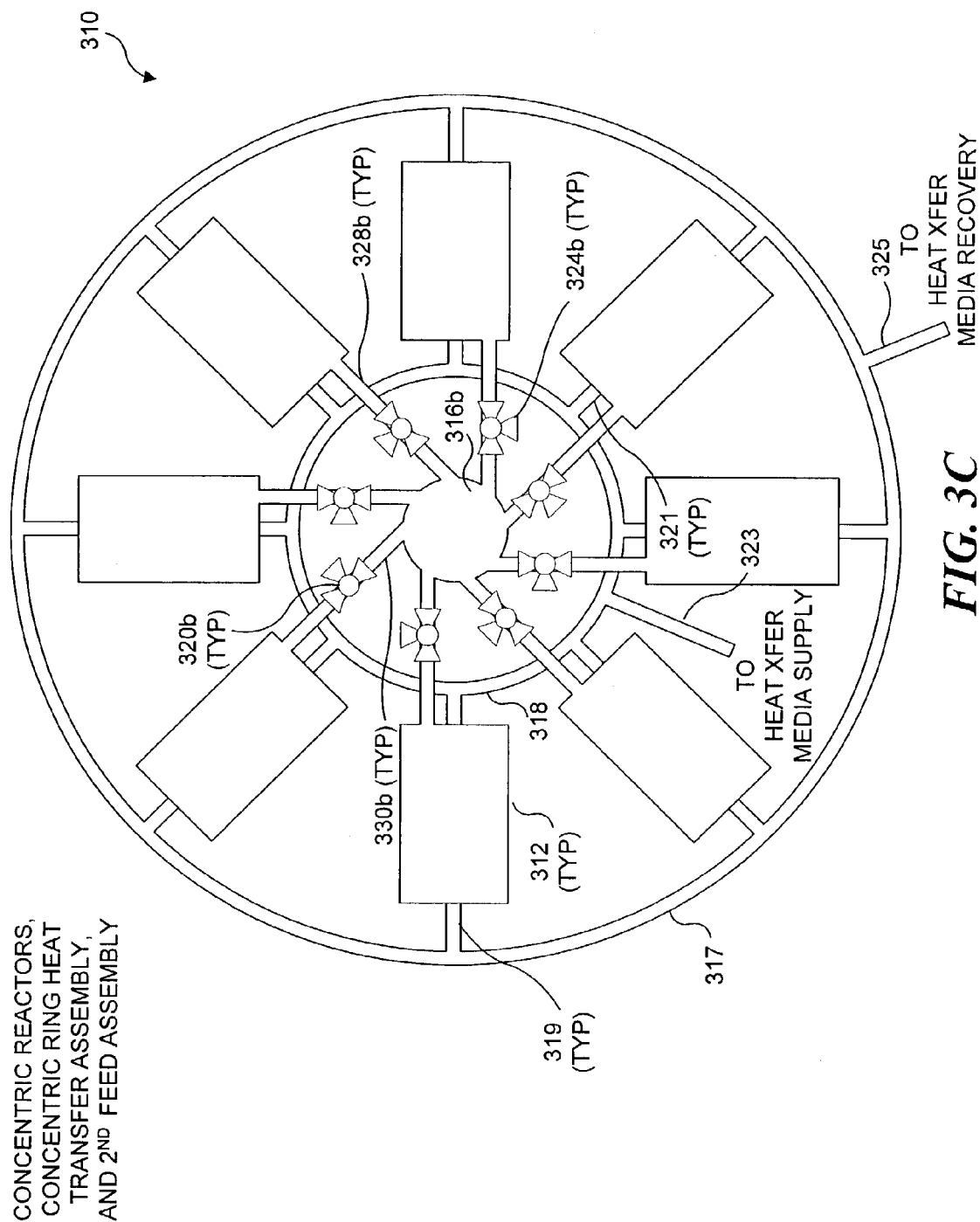
FIG. 3C is a schematic diagram that illustrates the incorporation of a second reactant feed assembly into the parallel chemical production system of FIG. 3A.
Figure 3D:
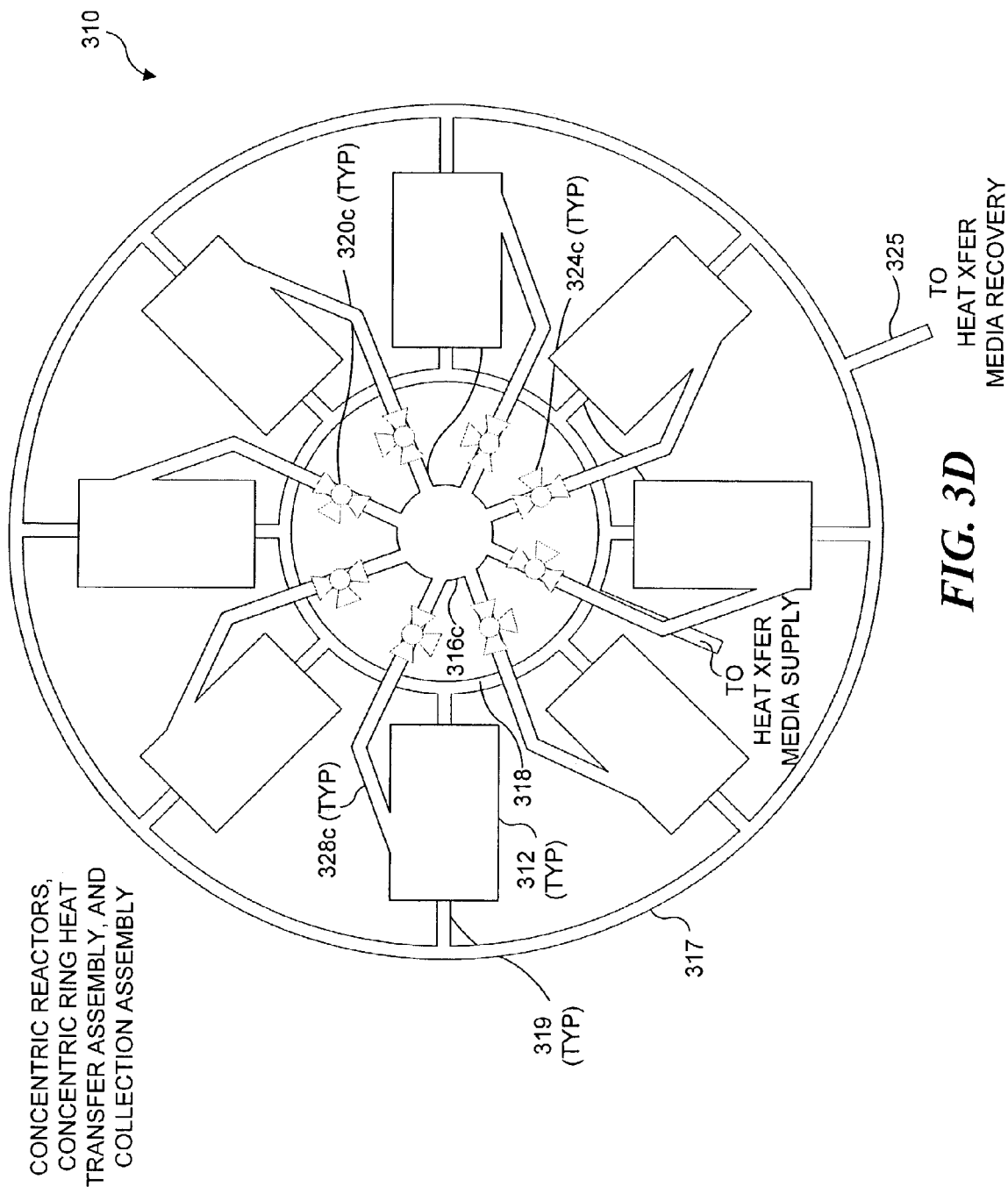
FIG. 3D is a schematic diagram that illustrates the incorporation of a collection assembly into the parallel chemical production system of FIG. 3A.
Figure 5A:
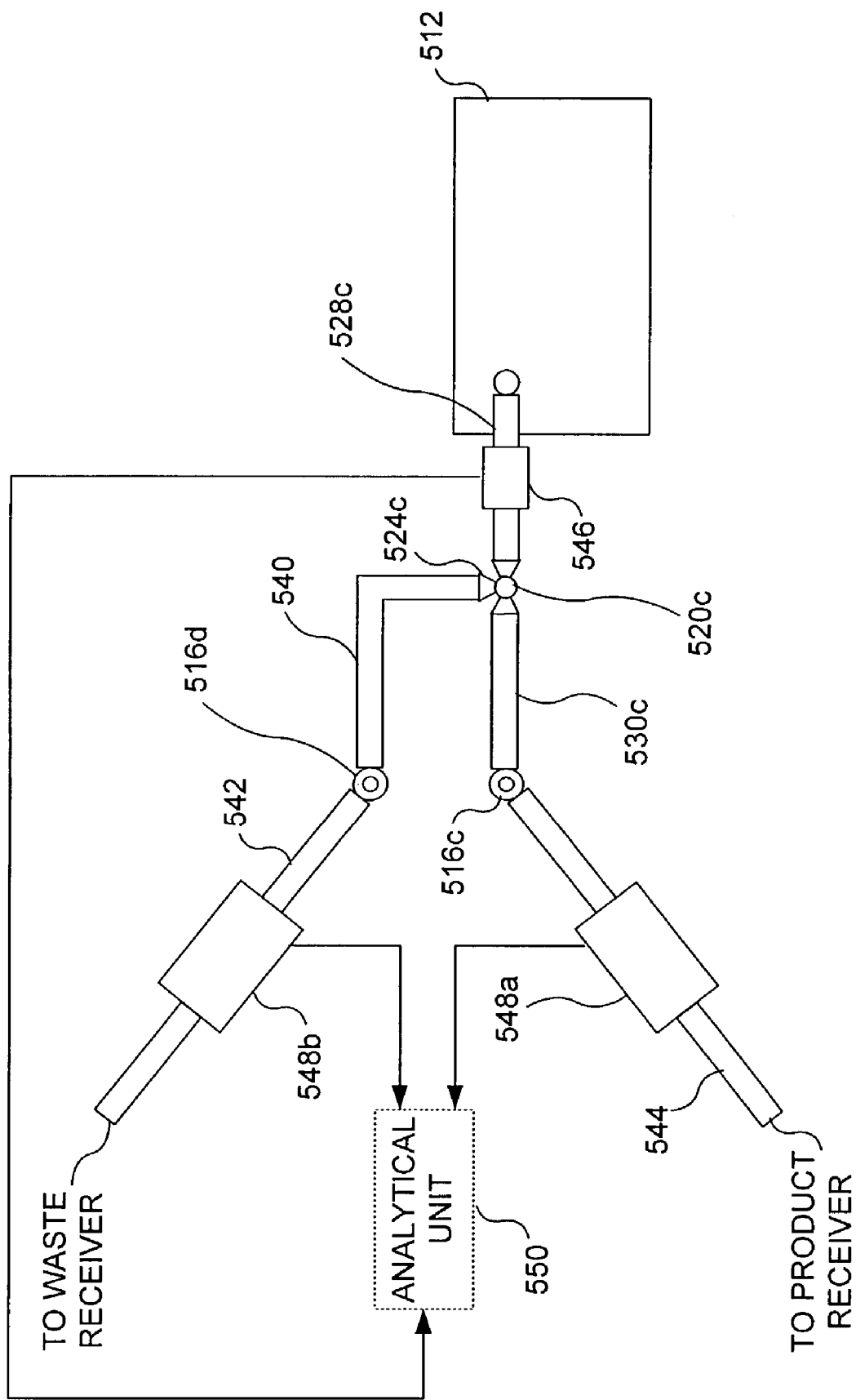
FIG. 5A is a schematic diagram that illustrates how each reactor from the parallel chemical production system of FIG. 2 is coupled to the collection assembly.
Figure 5D:
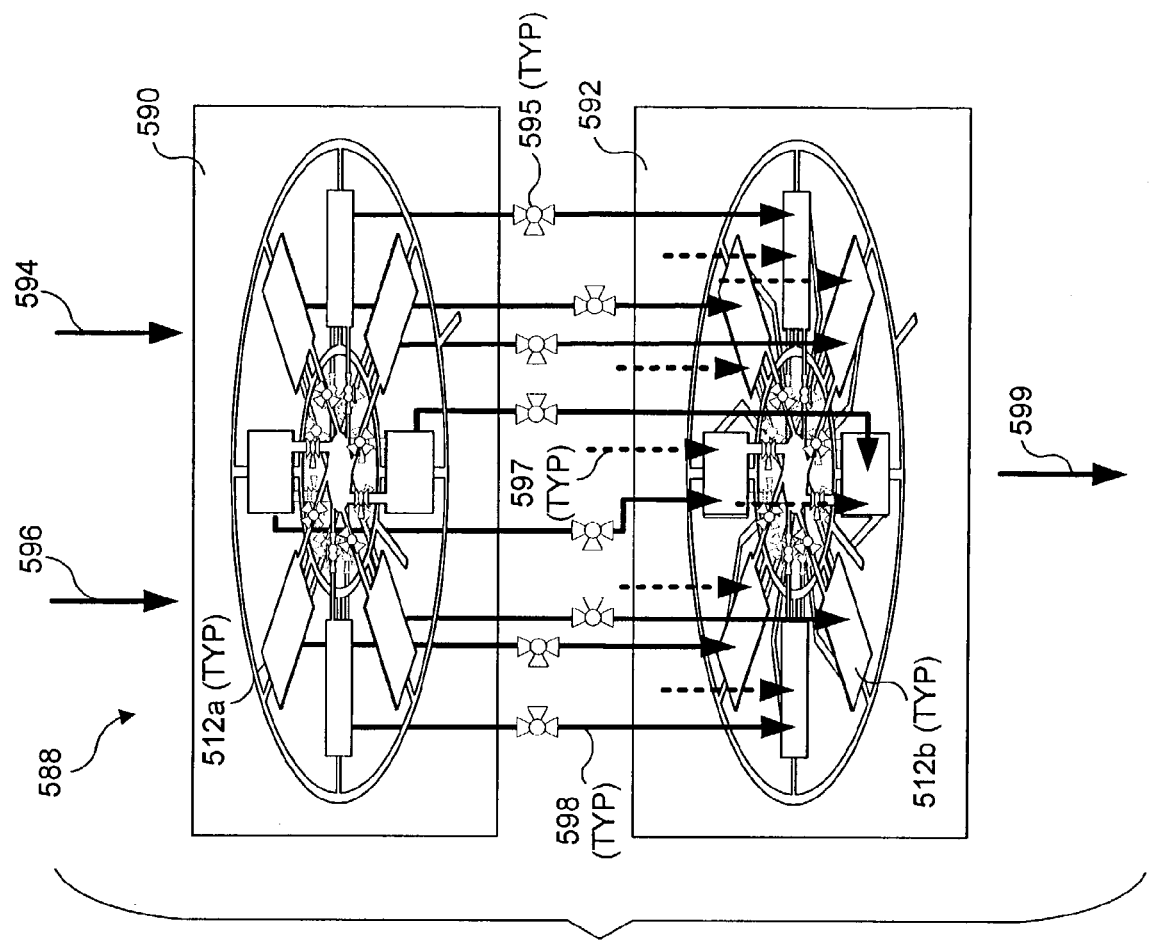
FIG. 5B illustrates a heat transfer assembly for thermally conditioning product incorporated into the schematic diagram of FIG. 5A.
Figure 5C:
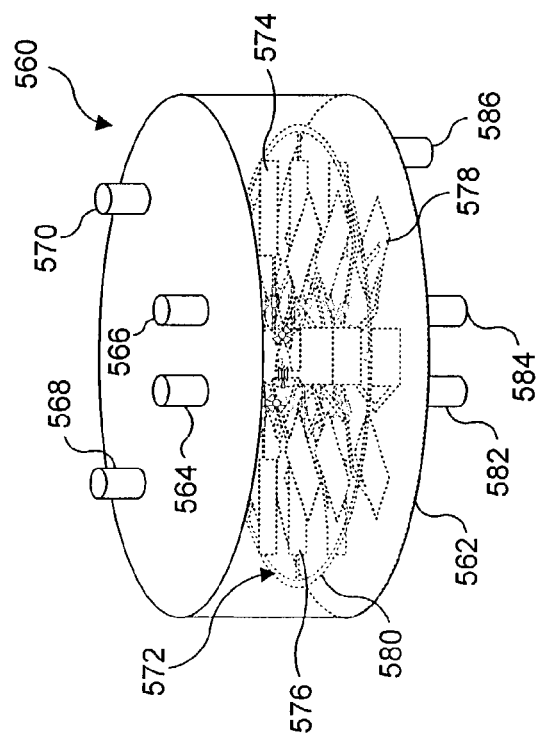
Figure 6:
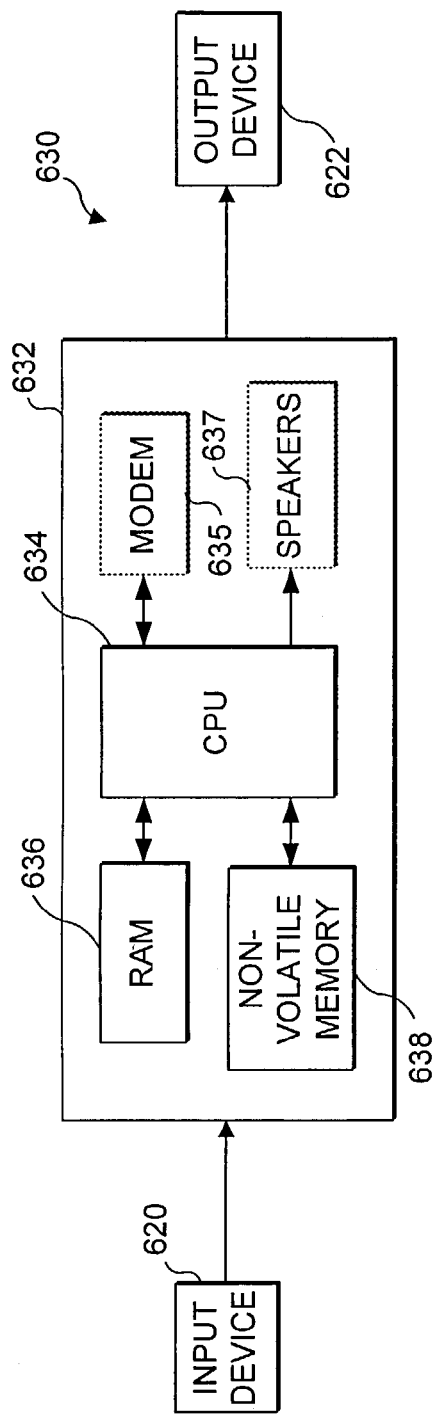
Figure 7:
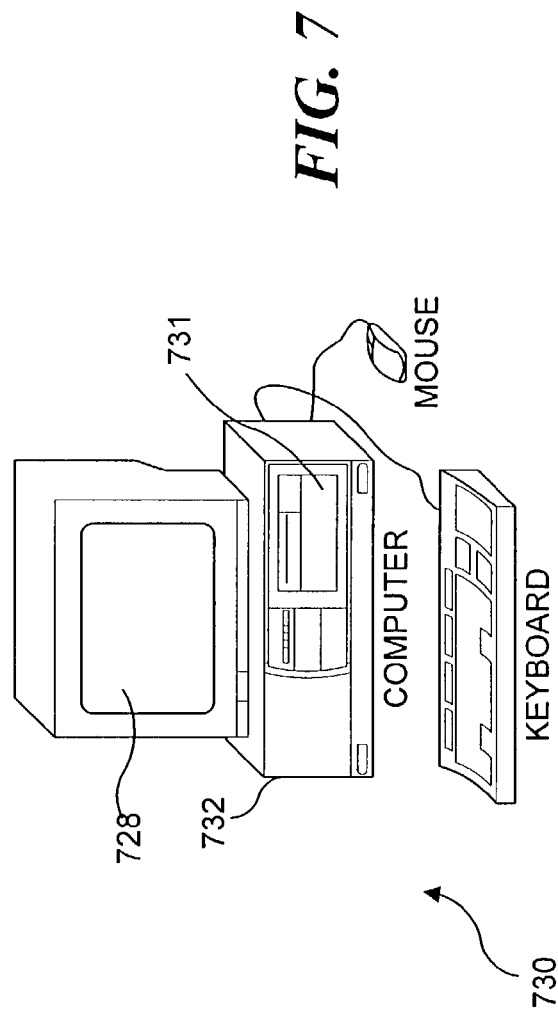
Figure 8:
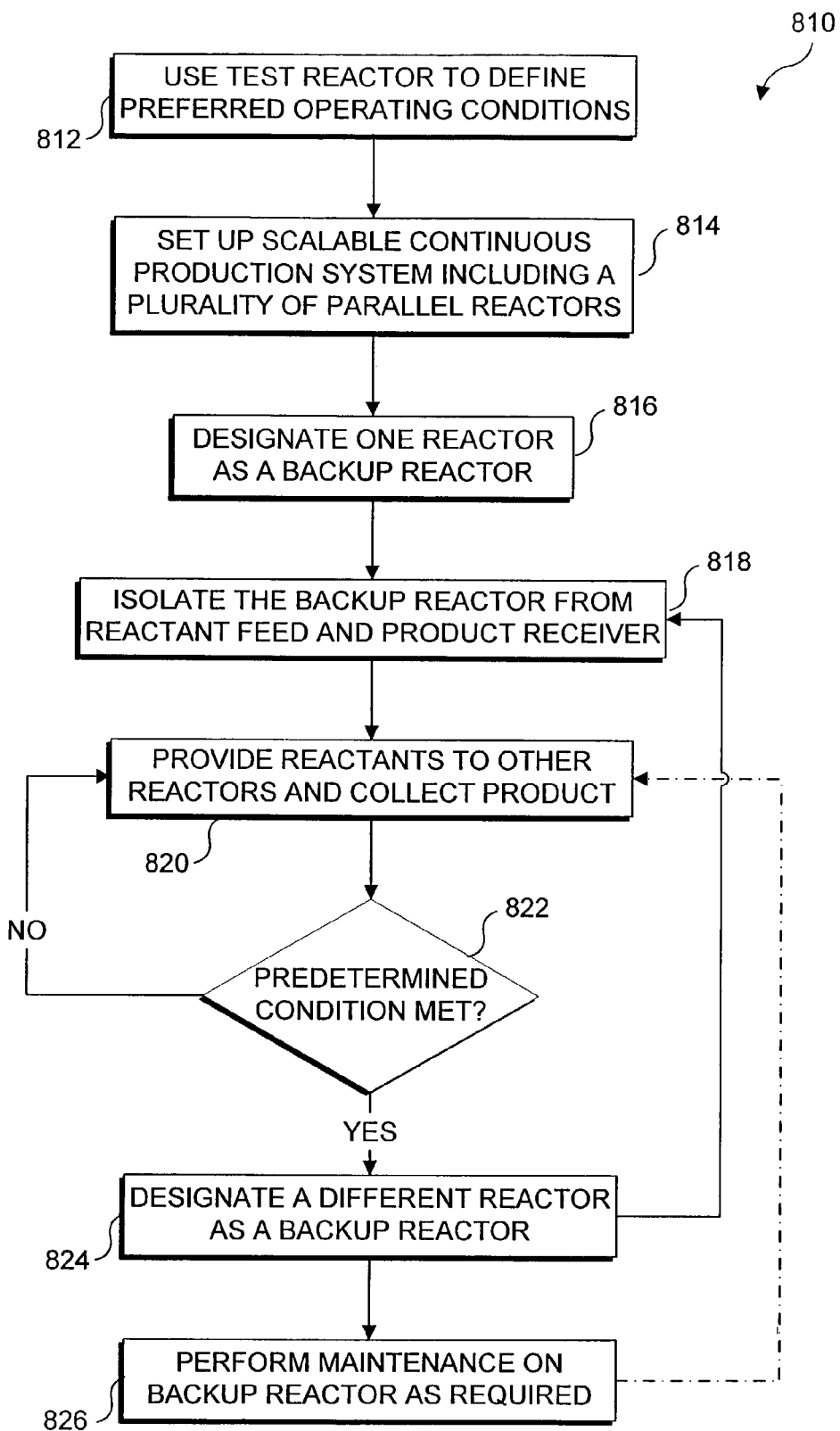
Figure 9:
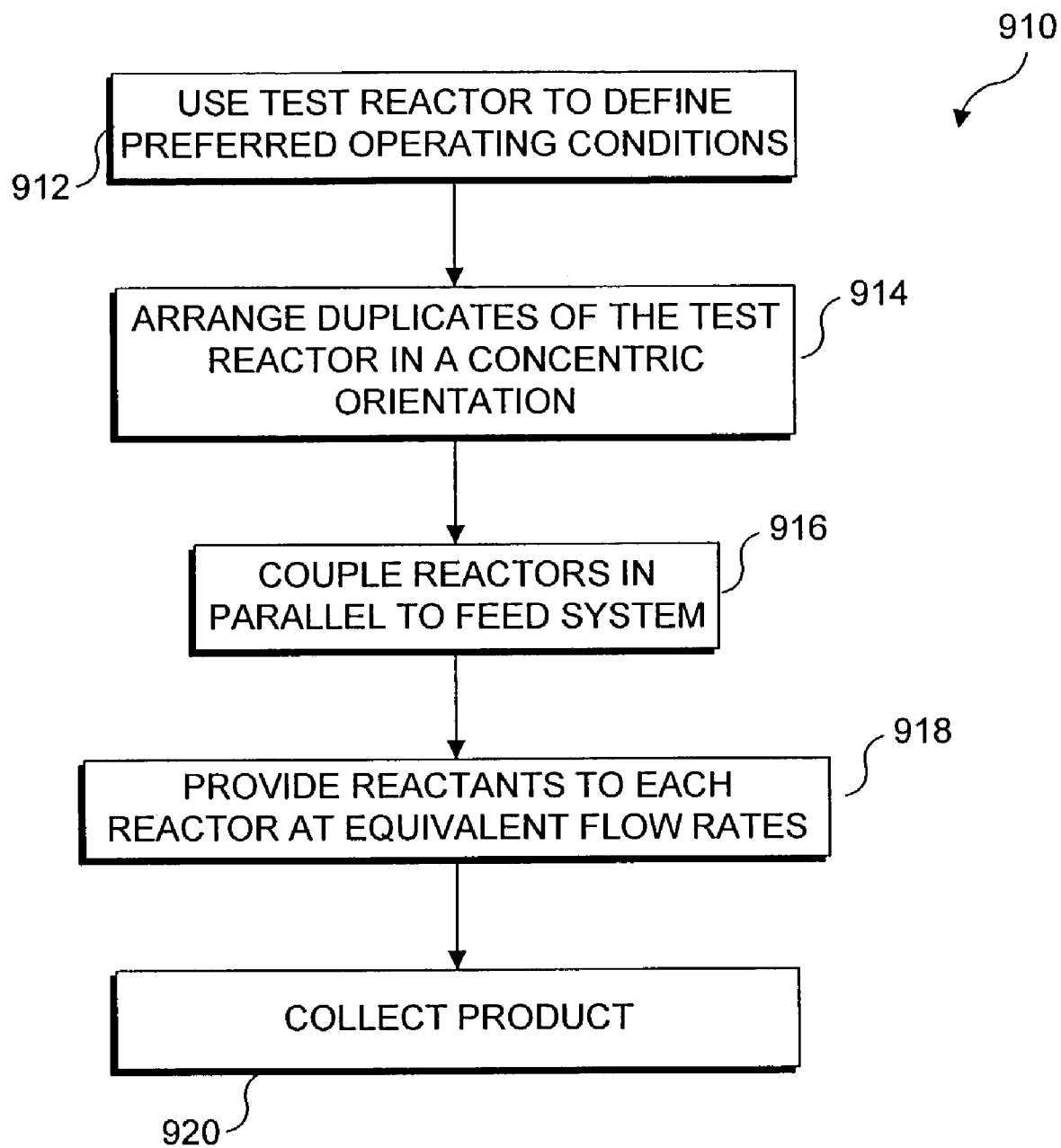
Figure 10:
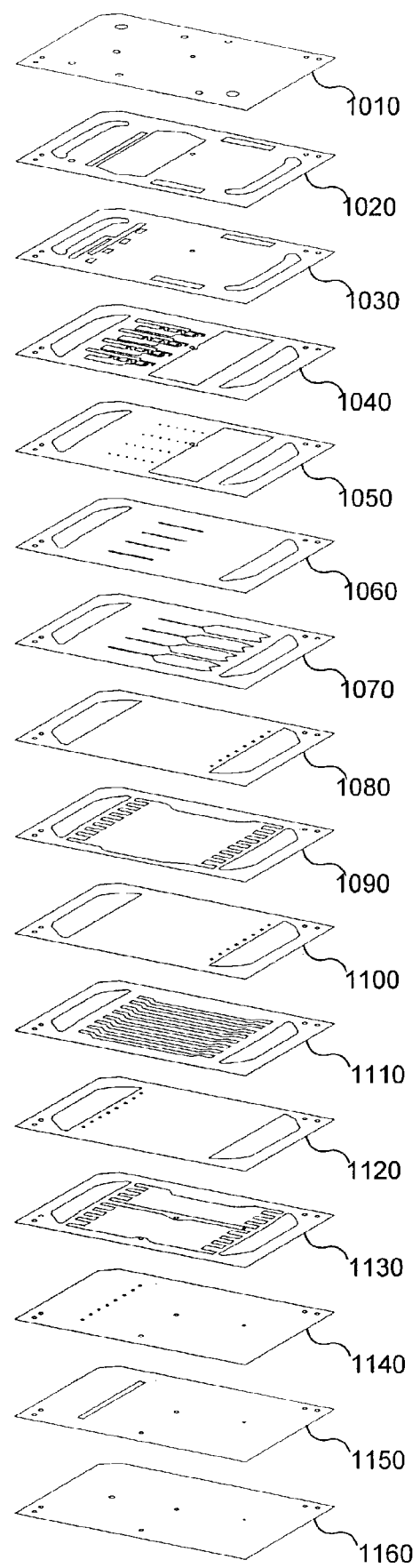
Figure 12A:
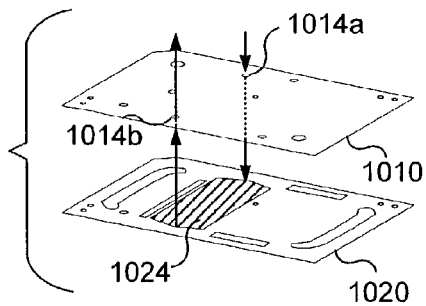
Figure 12B:
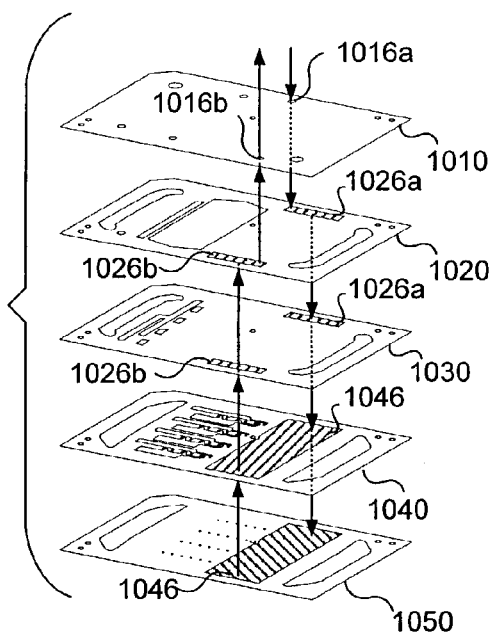
Figure 12C:
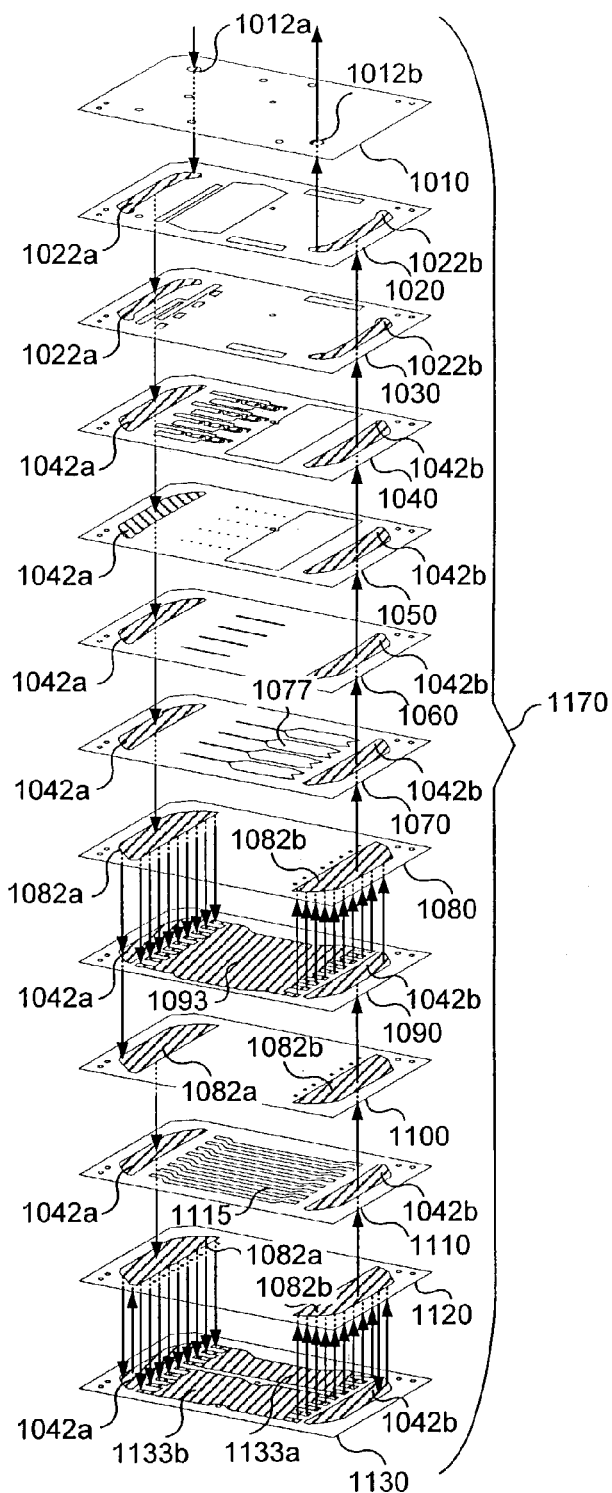
Figure 14B:
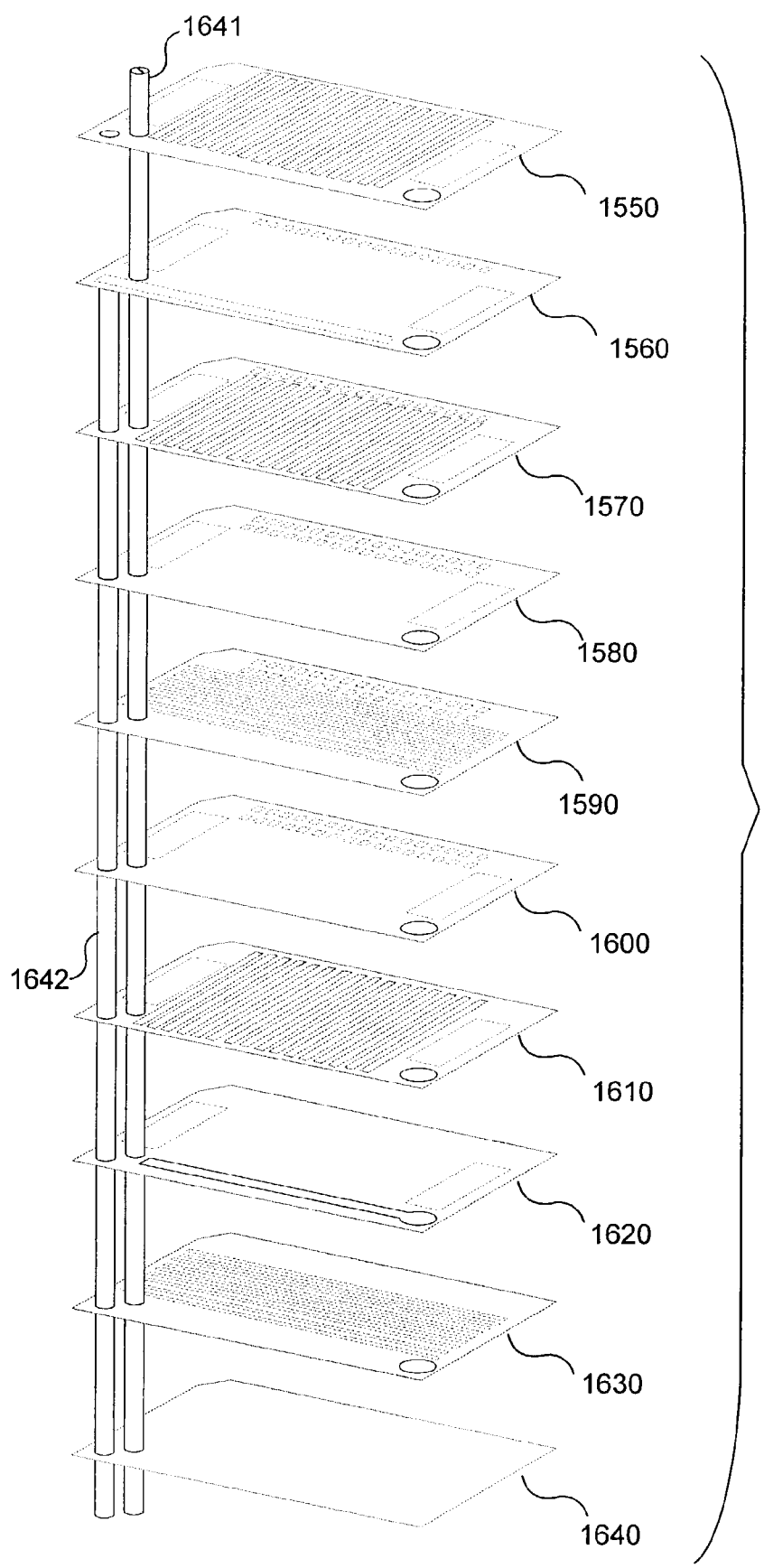

FIG. 5C schematically illustrates the concentric ring heat transfer assembly of FIG. 3A, the first reactant feed assembly of FIG. 3B, the second reactant feed assembly of FIG. 3C, and the collection assembly of FIG. 3D disposed within a housing including fluid inlets and outlets;

FIG. 5D schematically illustrates a multistage parallel chemical production system in accord with the present invention, in which a product from each reactor in the first stage is directed into a reactor in the second stage for further processing;

FIG. 6 is a simplified block diagram illustrating the functional elements of a preferred system controller for use in the continuous processing chemical production systems of FIGS. 1A-1E and FIG. 2;

FIG. 7 is a simplified schematic diagram showing a personal computer used as the system controller of FIGS. 1A-1E;

FIG. 8 is a flow chart of the sequence of logical steps employed by a system controller to control the operation of the automated continuous processing chemical production systems of FIGS. 1A-1E, according to one aspect of the present invention;

FIG. 9 is a flow chart showing the sequence of logical steps employed to produce and use the chemical production system of FIG. 2;

FIG. 10 is an exploded isometric view of one embodiment of a micro reactor suitable for use in the automated continuous processing parallel chemical production systems of FIGS. 1A-1E and the concentrically parallel chemical production system of FIG. 2, illustrating how a plurality of simple plates are stacked together to form the micro reactor;

FIG. 11A is an exploded isometric view of the first six simple plates of the micro reactor of FIG. 10, illustrating a fluid path for a first reactant;

FIG. 11B is an exploded isometric view of the first six simple plates of the micro reactor of FIG. 10, illustrating a fluid path of a second reactant;

FIG. 11C is an exploded isometric view of simple plates seven through sixteen of the micro reactor of FIG. 10, illustrating the combined fluid paths of the first and second reactants after they have been mixed, and as the mixed reactants flow through the balance of the micro reactor of FIG. 10;

FIG. 12A is an exploded isometric view of the first two simple plates of the micro reactor of FIG. 10, illustrating a fluid path for heat transfer media servicing the first heat exchanger;

FIG. 12B is an exploded isometric view of the first four simple plates of the micro reactor of FIG. 10, illustrating a fluid path for heat transfer media servicing the second heat exchanger;

FIG. 12C is an exploded isometric view of the first thirteen simple plates of the micro reactor of FIG. 10, illustrating the fluid paths for heat transfer media servicing heat exchangers three and four;

FIG. 13A is a schematic view of a chemical plant including a plurality of reversibly joined reactor stacks, illustrating yet another type of micro reactor that can be employed in the chemical production system of the present invention;

FIG. 13B is a schematic view of a reactor stack including a plurality of irreversibly joined reaction units;

FIG. 13C is a schematic view of a reaction unit including a plurality of irreversibly joined simple plates;

FIG. 13D is a plan view of a simple plate including a parallel array of reaction channels;

FIG. 14A is an exploded isometric view of the twenty-four simple plates of an exemplary internally paralleled reactor for use in the reactor stack of FIG. 13B, illustrating a fluid path for heat transfer media servicing the five heat exchangers; and FIG. 14B is an exploded isometric view of a portion of the twenty-four simple plates of the internally paralleled reactor of FIG. 14A, illustrating how plugs can be used to seal openings that are not required.

DESCRIPTION OF THE PREFERRED EMBODIMENT

The present invention relates to scalable parallel chemical production systems configured to simultaneously produce a desired product using a plurality of substantially identical chemical reactors coupled together in parallel. In some preferred embodiments, the reactors are micro scale reactors, although other sizes of reactors can be employed. Chemical production systems in accord with the present invention are scalable, in that additional reactors can be added to an existing system to satisfy a demand for more of the desired product, limited only by the number of reactors that can be simultaneously fed with a common feed assembly.

One feature of the present invention is the incorporation of a system controller to enable a chemical production system to operate automatically over an extended period of time. Such an embodiment is referred to as an automated continuous processing chemical production system. Because chemical reactors are prone to fouling after being operated for an extended period, in one preferred embodiment, the system controller is programmed to designate one chemical reactor as a backup reactor. The designated backup reactor is isolated from reactant feed supplies and a common product receiver. Based on a predetermined condition, the system controller selects a different reactor as the backup reactor, and the previously designated backup reactor is placed online (i.e., coupled in fluid communication with the reactant supplies and the common product receiver). The newly designated backup reactor can then be serviced, and later placed back in active service. This approach facilitates the continuous operation of the chemical production system over extended periods of time.

The predetermined condition can be the lapse of a defined period of time, or can be the determination of a deterioration in product quality from a specific reactor. In one preferred embodiment, each newly designated backup reactor is flushed with solvent to clear any fouling. In a more preferred embodiment, each flushed reactor is also tested before being placed back into service. Other maintenance operations can include the removal and replacement of a malfunctioning reactor that has been designated as the backup reactor.

Another aspect of the present invention is directed to arranging the individual reactors of a parallel chemical production system in a concentric configuration. As will be described in greater detail below, the concentric configuration facilitates equipartition of flow among the plurality of reactors, while simplifying the feed systems required. Such a configuration enables a single fluid pump to be employed to deliver each required fluid to the reactors. In one preferred embodiment, separate fluid pumps are employed for a first reactant, a second reactant, a first solvent and a second solvent. In a related embodiment, suitable when each reactant and the product are soluble in a common solvent, a separate fluid pump is employed for each reactant, and only a single solvent supply pump for a common solvent supply.

It should be understood that these two basic aspects of the present invention, i.e., automation of a chemical production system including the designation of a backup reactor, and the concentric configuration of the plurality of reactors, are not mutually exclusive. Indeed, in at least one preferred embodiment both aspects are combined.

Figure 1A:
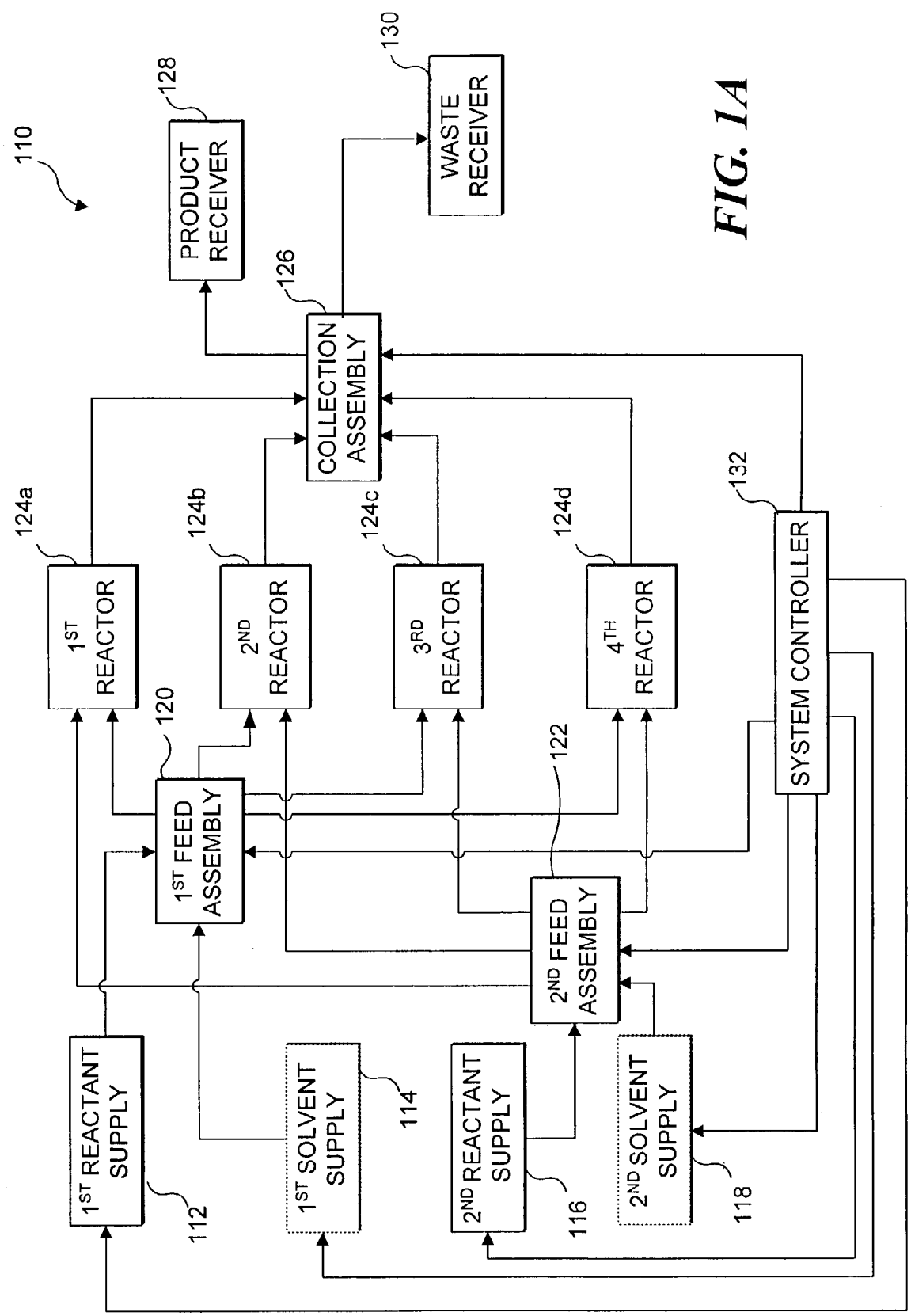
FIG. 1A is a simplified process flow block diagram for an automated continuous processing parallel chemical production system including a system controller configured to designate one of the reactors as a backup reactor, in accord with a first aspect of the present invention.
Figure 1B:
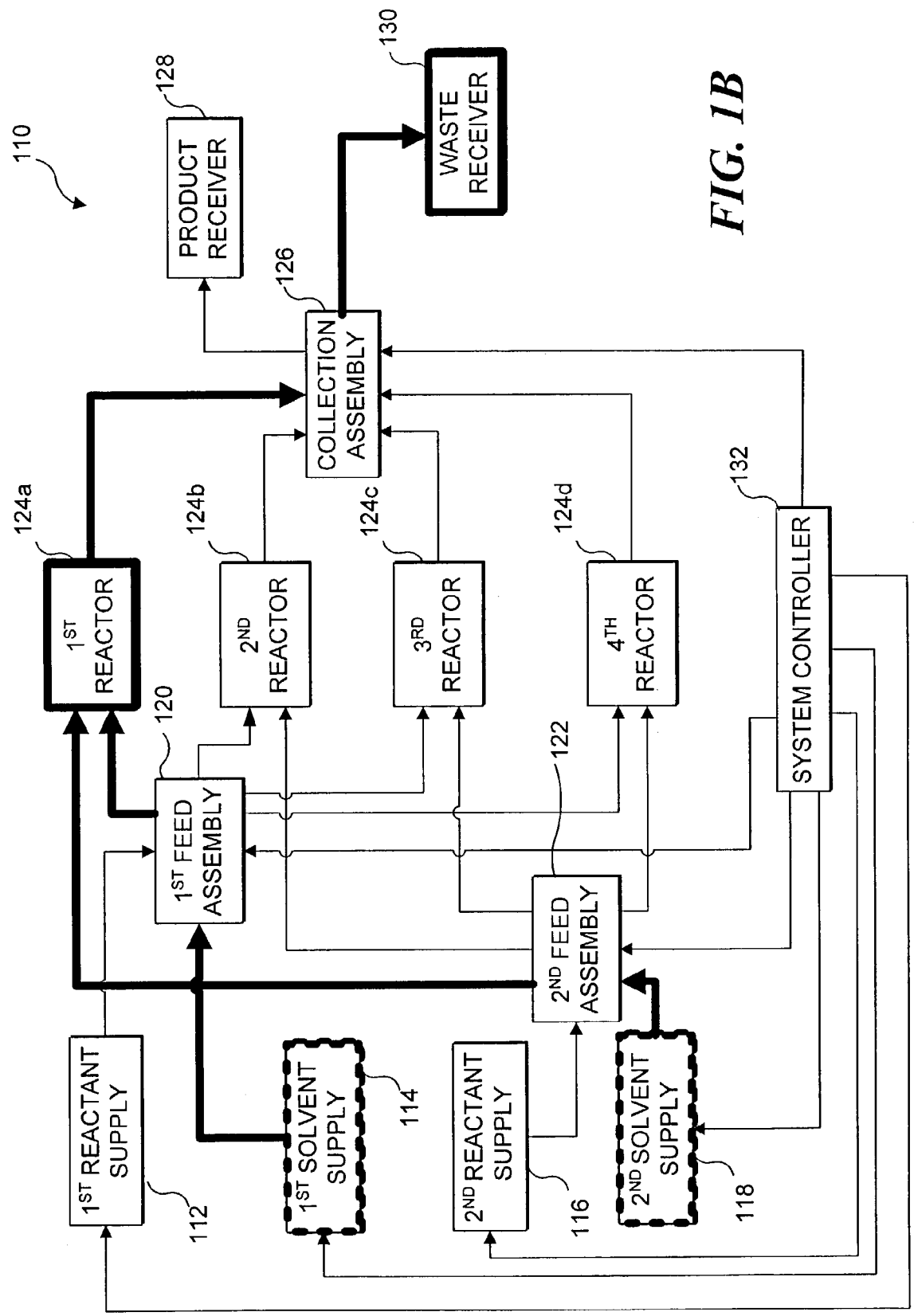
FIG. 1B is the flow block diagram of FIG. 1A, in which the system controller has designated a first reactor as the backup reactor, with bold lines indicating a maintenance operation being performed on the first reactor.
Figure 1C:
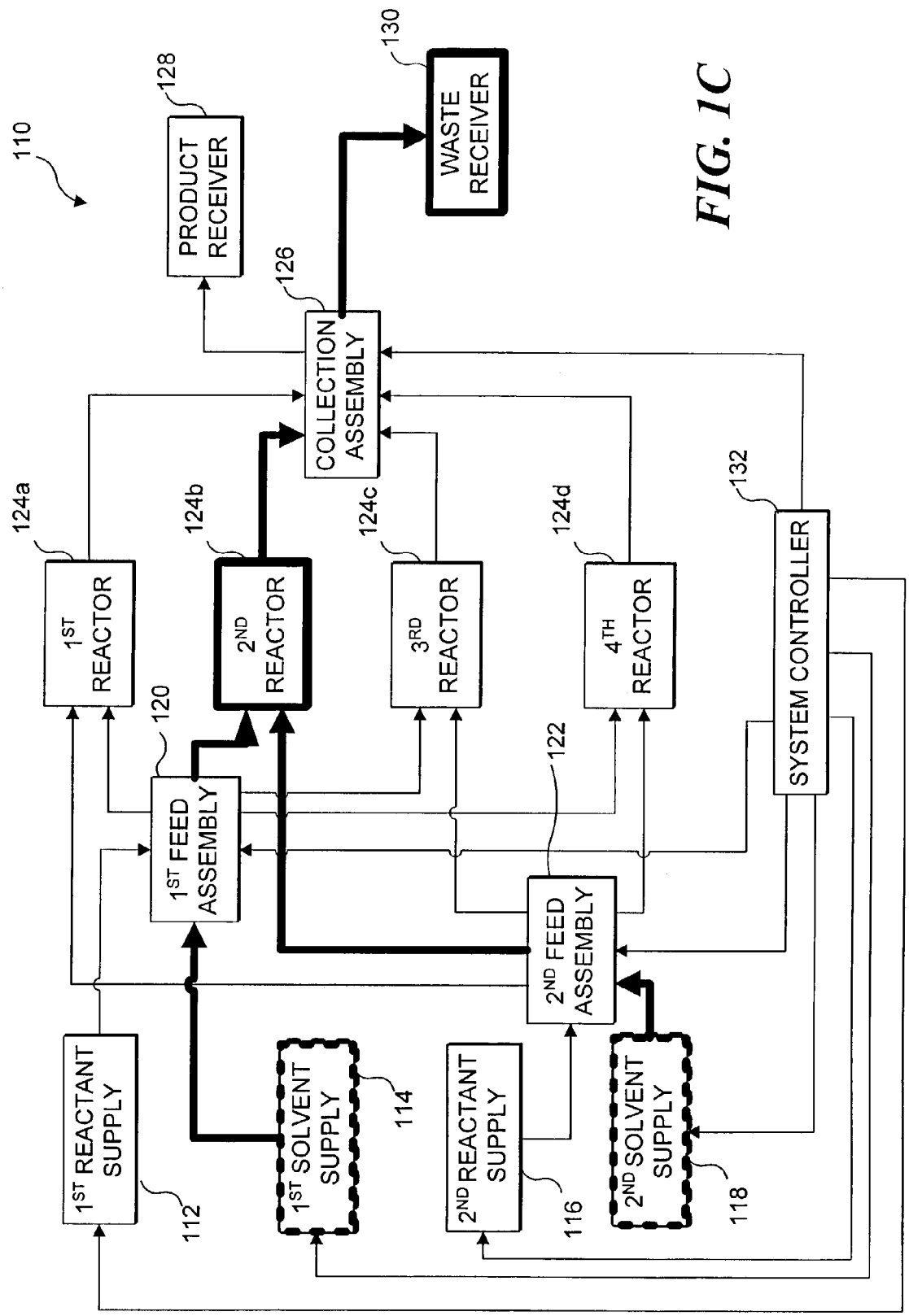
FIG. 1C is the flow block diagram of FIG. 1A, in which the system controller has designated a second reactor as the backup reactor, with bold lines indicating a maintenance operation being performed on the second reactor.
Figure 1D:
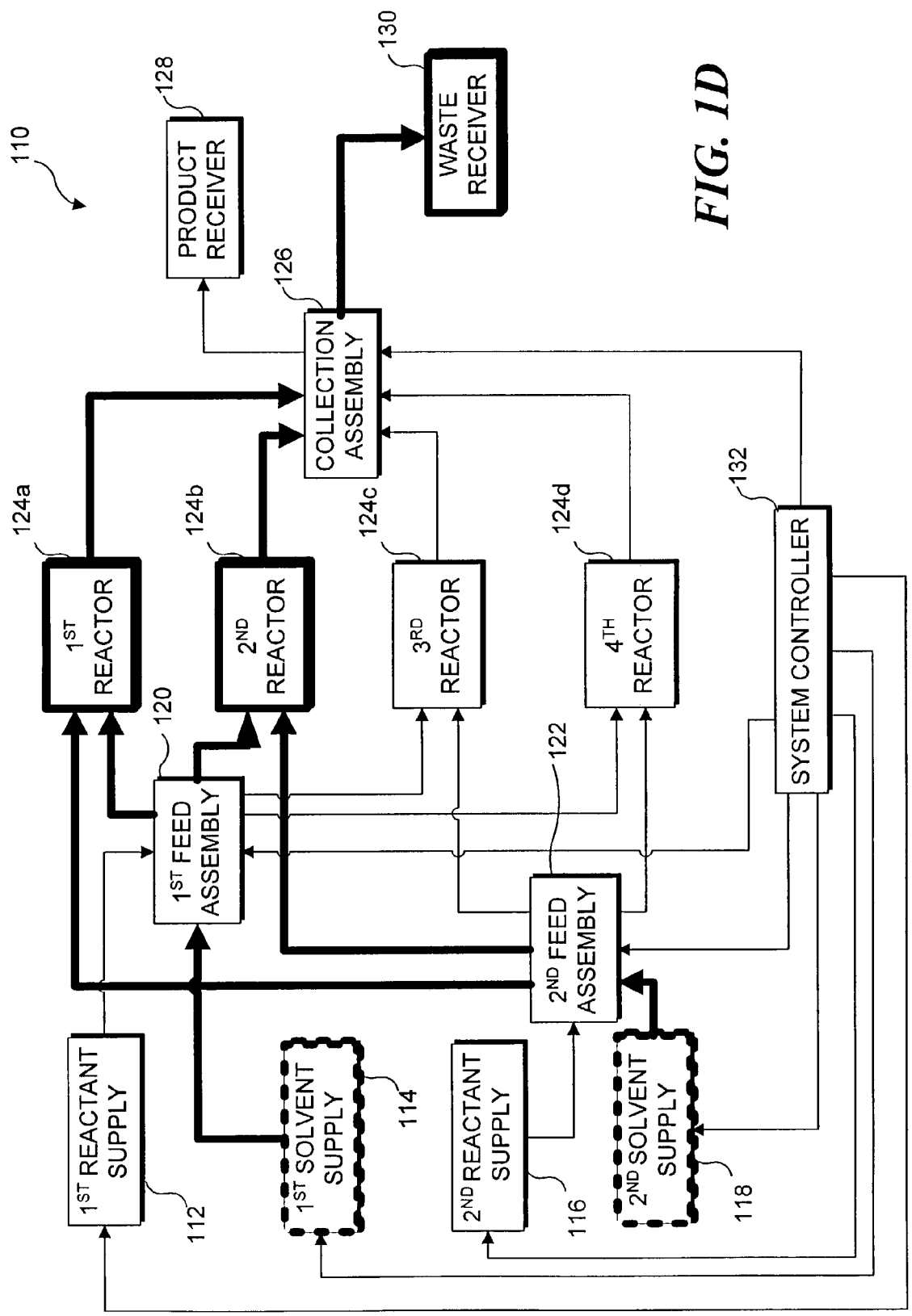
FIG. 1D is the flow block diagram of FIG. 1A, in which the system controller has designated both the first and second reactor as backup reactors, using bold lines for indicating a maintenance operation being performed on the first and second reactors.
Figure 1E:
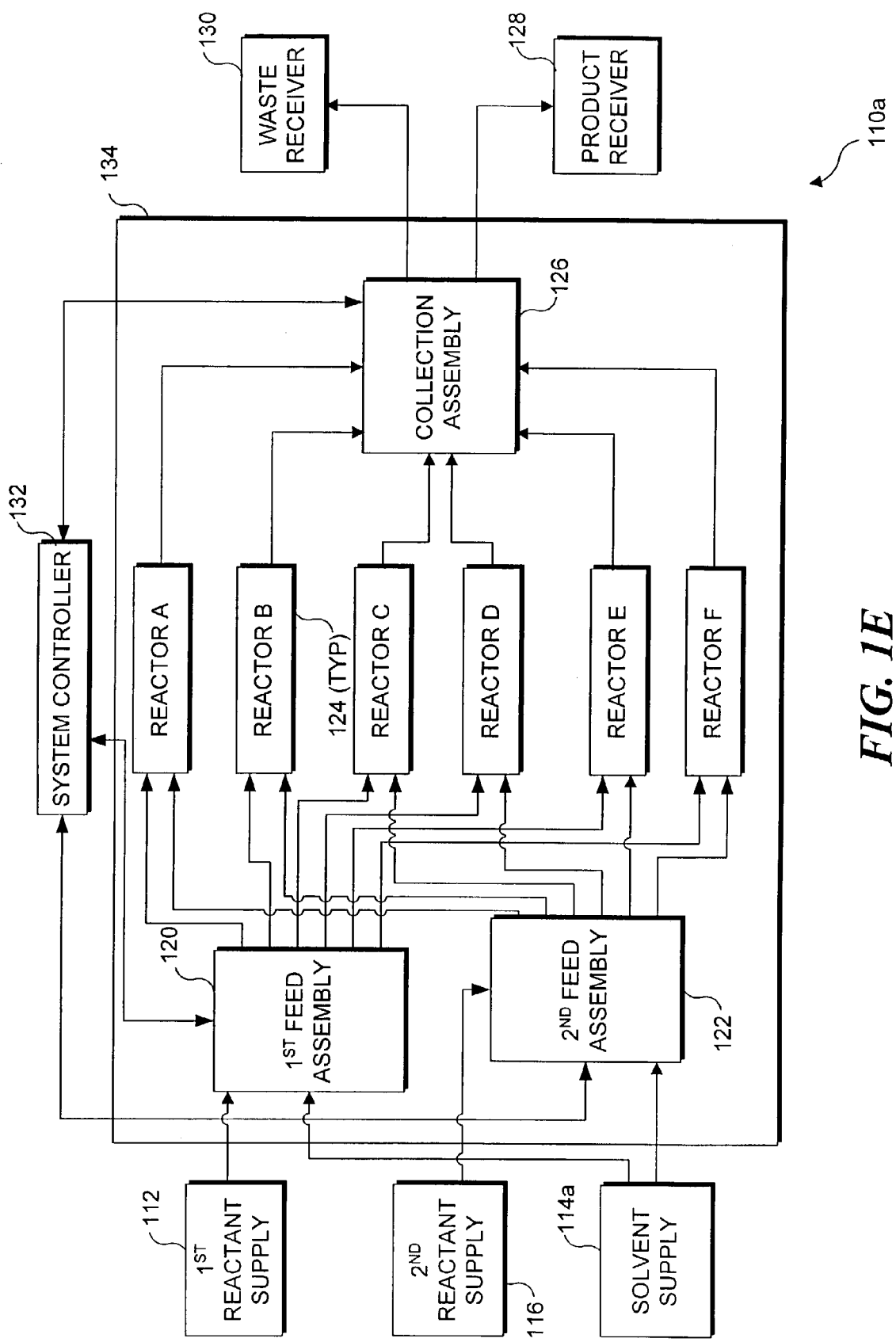
FIG. 1E is a simplified process flow block diagram for another embodiment of an automated parallel continuous processing chemical production system including a system controller configured to designate one of the reactors as a backup reactor, in which only a single solvent supply is used.

FIGS. 1A-1E illustrate the use of a system controller to automate a chemical production system. FIGS. 1A-1D are flow process block diagrams of an automated chemical production system 110 including two different solvent supplies, while FIG. 1E is a flow process block diagram of an automated chemical production system 110a including only one solvent supply.

Referring to system 110 of FIGS. 1A-1D, a first reactant supply 112 and a second reactant supply 116 are controllably coupled to a system controller 132. System controller 132 can be implemented as a programmable processor or a hard wired logic circuit. Since they are readily available, it is particularly preferred to utilize a personal computer for system controller 132. Process control systems, such as those typically used in production and pilot plant environments, can also be beneficially employed to implement controller 132.

While not separately shown, it should be understood that each reactant supply includes not only a volume of the appropriate reactant, but also a pump. The specific type of pump selected should be compatible with the reactant with which the pump is used. For example, if the reactant is flammable, an explosion-proof pump is appropriate. System controller 132 is coupled to each reactant supply to control the flow rate of the reactant provided by the pump. Each reactant supply preferably includes a valve that when opened, places the supply of reactant in fluid communication with the pump. The valve is controllably coupled to the system controller. In some cases, such as when the reactant comprises a compressed fluid, no pump may be necessary since the pressure produced by the compressed fluid may provide sufficient reactant flow without the need of a pump.

System 110 preferably includes a first solvent supply 114 and a second solvent supply 118. While an automated continuous processing parallel chemical production system can be provided without solvent supplies, such a system would not have the ability to flush designated backup reactors with solvent for maintenance purposes. Again, each solvent supply preferably includes an appropriate pump, which is controllably coupled to the system controller. Valves like those described above in connection with the reactant supplies may also be used in controlling the flow of solvent from the solvent supplies.

System 110 further includes a first reactant feed assembly 120 and a second reactant feed assembly 122, each of which are also controllably coupled to system controller 132. First reactant feed assembly 120 is coupled in fluid communication with both first reactant supply 112 and first solvent supply 114. Similarly, second reactant feed assembly 122 is coupled in fluid communication with both second reactant supply 116 and second solvent supply 118.

As shown in this exemplary embodiment, system 110 includes four substantially identical reactors 124a-124d, configured to generate the desired product by combining and reacting the first and second reactants. The four reactors shown in FIGS. 1A-1D are merely exemplary and not intended to suggest a preferred number of reactors. The number of reactors can be increased (or decreased) as desired. Of course, the pumps in the reactant and fluid supplies will be able to accommodate a finite increase in the number of reactors while maintaining the desired flow rate. Once the maximum number of reactors that can be accommodated by specific pumps is achieved, any further scale up in the amount of desired product to be generated will require larger pumps, or additional chemical production systems.

Preferably, each reactor is identical to a test reactor employed to determine preferred processing conditions for the reaction being used to produce the desired product. If each of reactors 124a-124d is exposed to the same process conditions as the test reactor, minimal problems will be encountered scaling up production by employing multiple reactors coupled in parallel. The first and second feed assemblies can selectively place each of the reactors in fluid communication with either their respective solvent supply or reactant supply. As will be described in greater detail in connection with FIG. 4, each feed assembly includes valves controllably coupled to the system controller, to enable a specific reactor to be placed in fluid communication with a solvent supply or a reactant supply. Such valves can be pneumatically or electronically actuated, as is known in the art.

Each reactor 124a-124d is coupled in fluid communication with a collection assembly 126, which itself is coupled in fluid communication with a product receiver 128 and a waste receiver 130. The collector assembly also includes valves, controllably coupled to the system controller, to enable a specific reactor to be placed in fluid communication with either product receiver 128, or waste receiver 130.

In FIG. 1B, system controller 132 has designated the first reactor (i.e. reactor 124a) as a backup reactor. The system controller manipulates the valves associated with first feed assembly 120, second feed assembly 122, and collection assembly 126 to isolate reactor 124a from each reactant supply and from the product receiver. It will be understood that each of the reactors not designated as a backup reactor are coupled in fluid communicated with the reactant supplies and the product receiver by opening appropriate valves in the feed assemblies and the collection assembly. Thus, the desired product will be generated in reactors 124b-124d, while reactor 124a is kept offline. If desired, the system controller can activate the solvent supplies to cause reactor 124a to be flushed with solvent. The system controller can activate the pumps (and any valves) associated with the first and second solvent supplies, causing a flow of solvent to enter the first and second feed assemblies. As noted above, the valves in the feed systems have been manipulated by the system controller to ensure that solvent, rather than reactants, are delivered to reactor 124a. The solvents exiting the reactor are routed by the appropriate valve in collection assembly 126 to waste receiver 130, rather than to product receiver 128. The bold lines coupling the blocks in FIG. 1B indicate the solvent fluid flow path associated with flushing reactor 124a with solvent.

In FIG. 1C, system controller 132 has designated the second reactor (i.e. reactor 124b) as a backup reactor. Again, the system controller manipulates the appropriate valves associated with first feed assembly 120, second feed assembly 122, and collection assembly 126 to isolate the designated backup reactor from each reactant supply and from the product receiver. Also as discussed above, the system controller can optionally open the valves associated with controlling the flow of solvent from the solvent supplies to cause reactor 124b to be flushed with solvent. The bold lines coupling the blocks in FIG. 1C again indicate the fluid flow path associated with flushing reactor 124b with solvent, as described above. While reactor 124b is designated as the backup reactor, system controller 132 places the other reactors in fluid communication with the reactant supplies and the product receiver, again by opening the appropriate valves in the feed assemblies and the collection assembly. Thus, when reactor 124b is offline, product will be generated in reactors 124a, 124c, and 124d.

In FIG. 1D, system controller 132 has designated both the first and seconds (i.e. reactors 124a and 124b) as backup reactors. While having a single reactor designated as a backup reactor is likely to be sufficient under many circumstances, there is no reasons that more than one reactor cannot be designated as a backup reactor at one time. Note that the more reactors that are designated as backup reactors, the fewer reactors that are producing product, thus there is incentive to keep as many reactors online as practical. Again, the system controller manipulates the appropriate valves associated with first feed assembly 120, second feed assembly 122, and collection assembly 126 to isolate the designated backup reactors from each reactant supply and from the product receiver. The bold lines coupling the blocks in FIG. 1D similarly indicate the fluid flow path associated with flushing reactors 124a and 124b with solvent, as described above. When reactors 124a and 124b are offline, product will be generated in reactors 124c and 124d.

As noted above, automated continuous processing parallel chemical production system 110a of FIG. 1E is similar to system 110 of FIGS. 1A-1D, except that system 110a includes only one solvent supply 114a, and includes a different number of reactors (i.e., reactors 124). System 110a functions generally as described above, except that system controller 132 controls only a single solvent supply. Note that system 110a may include a housing 134 that encloses the feed assemblies, the collection assembly, and the reactors. The reactant supplies, the system controller, the waste receiver and the product receiver are disposed outside of the housing. It is contemplated that potential purchasers of such automated continuous processing parallel chemical production systems may desire to purchase those elements enclosed within housing 134, to be used with reactant supplies, a solvent supply, a system controller (such as a personal computer), a waste receiver, and a product receiver either purchased elsewhere or already in inventory.

As noted above, another aspect of the present invention provides for arranging the plurality of reactors in a parallel chemical reaction system in a concentric configuration, generally as indicated in FIG. 2A. A parallel chemical reaction system 210 includes eleven reactors 212 disposed in a concentric configuration. Each reactor 212 is coupled to a common assembly 216 by fluid lines 214. As will be described in greater detail below, common assembly 216 is preferably implemented a plurality of times in parallel chemical reaction system 210. In one implementation, the common assembly and related fluid lines are used to distribute a first reactant to each reactor. In another implementation, the common assembly and related fluid lines are used to distribute a second reactant to each reactor. In yet another implementation, the common assembly and related fluid lines are used to collect the desired product from each reactor.

Due to the orientation of the reactors, and the positioning of the common assembly, each fluid line is substantially the same length. When the common assembly represents a feed assembly, the flow rates into each reactor are equivalent, and when the common assembly is a collection assembly, the flow rates out of the reactor are the same. This facilitates the establishment of identical processing conditions in each reactor.

FIG. 2A provides yet another example of how the specific number of reactors employed in a parallel chemical processing system can be beneficially varied. While other numbers of reactors can optionally be used, eleven reactors represent a particularly beneficial number, particularly, for parallel chemical processing systems that are automated, and in which the system controller designates one of the reactors as a backup reactor. Using eleven reactors, ten reactors will be online while the eleventh is designated as a backup reactor. The ratio of 10 online reactors to one backup reactor appears to provide reasonable production capacity, while ensuring that reasonable backup capacity also exists. If an automated continuous processing parallel chemical production system were to employ hundreds of online reactors and only a single backup reactor, there is an increased potential that a number of online reactors might fail simultaneously (or in rapid succession), potentially overwhelming the system's ability to maintain continuous stable production by placing the previously designated backup unit online, and designating a failing unit as the newly designated backup unit.

FIG. 2B and FIG. 2C show a bifurcated network 230, configured to couple four reactors 234 to a common fluid supply 232. Assume that the path length between each reactor and the fluid supply is the same in network 230. These Figures illustrate why the concentric fluid network of FIG. 2A has advantages over a bifurcated fluid network. Significantly, isolating a reactor from a concentric fluid network does not lead to different flow conditions in the remaining reactors, which can occur in a bifurcated fluid network. In each of FIGS. 2B and 2C, the velocity of a reactant entering the network is 4 m/s. In FIG. 2B, each reactor in coupled in fluid communication with the network, and each reactor receives reactant at a velocity of 1 m/s. Significantly, in FIG. 2B, the fluid moving from point 236 to point 238 is moving at the same rate as fluid moving from point 236 to point 240.

Turning now to FIG. 2C, reactor 1 has been isolated from the network. Due to the bifurcated nature of the network 230, while the rate of the fluid received at reactors 2-4 is equivalent (i.e., ~1.3 m/s), there is a significant change. In FIG. 2C, the fluid moving from point 236 to point 238 is moving at ~1.3 m/s, while the fluid moving from point 236 to point 240 is moving at ~2.7 m/s. The path length between point 236 and point 238 is the same as the path length between point 236 and point 240. Thus, fluid from supply 232 will reach point 240 before fluid reaches point 238. This uneven flow distribution results in different residence times for the chemical products produced in reactor 2 compared to reactors 3 and 4. Residence time can have a very significant impact on product quality, and in a parallel production system, it is highly desirable to keep residence times in the plurality of reactors equal and constant. With respect to FIG. 2C, the only way to ensure equivalent residence times in the different reactors would be to add a pump between points 236 and point 238, which is not a very practical solution.

With respect to the star-like or concentric distribution exemplified in FIG. 2A, isolating one or more reactors 212 will not affect the residence times in the remaining reactors, because the applied pressure in common assembly 216 is kept constant. As will become clear with respect to the description of FIGS. 3B-3D, it is preferred to use such concentric distribution (or collection, as the case may be) for each reactant and for the collection of the product. Distribution of the cooling/heating media can also be achieved using a concentric distribution system. However, because equal flow distribution of the heat transfer media through the reactors is not as critical with respect to product quality as is the equal distribution of reactants, different configurations for the distribution and collection of heat transfer media can be beneficially employed, even if there is a slight difference between a branch connection near the inlet feed for alternate configurations, compared with a branch connection far from the inlet.

Yet another aspect of the present invention is the incorporation of a common concentric ring heat transfer assembly in a parallel chemical reaction system that includes reactors arranged in a concentric configuration. FIG. 3A illustrates a concentrically parallel chemical production system 310 that includes eight reactors 312. Each reactor is coupled to an inner fluid line 318 via feed lines 321. Ring shaped fluid line 318 is coupled in fluid communication with a heat transfer media supply (not shown) via a fluid line 323. The heat transfer media supply fluid is thus similar to the solvent and reactant supplies of FIGS. 1A-1E, in that the supply includes both a volume of heat transfer media and a pump. In embodiments employing a system controller, the heat transfer media supply is controllably coupled to the system controller, so that the system controller can vary the flow rate of the heat transfer media to establish and maintain preferred process conditions in each reactor.

Each reactor is also coupled to a ring shaped fluid line 317 via exit lines 319. Ring shaped fluid line 317 is coupled in fluid communication with a heat transfer media recovery via a fluid line 325. Those of ordinary skill in the art will recognize that heat transfer systems are often implemented as closed or loop systems. Thus the heat transfer media recovery can be coupled in fluid communication with the heat transfer media supply. It should also be understood that the direction of the flow of heat transfer media can be reversed, by coupling line 325 to a heat transfer media supply, while line 323 is coupled to a heat transfer media recovery. The actual direction employed will be a function of the orientation of the fluid paths in the reactors.

As noted above, particularly preferred embodiments of the present invention combine the automated parallel chemical production system with a system controller that designates one reactor as an offline backup reactor, and employ the concentric configuration of the reactors (as well as the concentric ring heat transfer assembly of FIG. 3A). FIGS. 3B-3C illustrate details showing how the reactant feed assemblies and collection assemblies of FIGS. 1A-1E are incorporated into the concentric configuration of FIG. 3A.

FIG. 3B shows a first reactant feed assembly incorporated into system 310. The first reactant feed assembly collectively includes a common assembly 316a, valves 320a, and fluid lines 330a. While not separately shown in this Figure, it should be understood that common assembly 316a is coupled in fluid communication with a first reactant fluid supply (as shown in FIGS. 1A-1E).

Common assembly 316a (and common assembly 316b discussed below in connection with FIG. 3C) functions as a distributor. Fluid from a reactant supply flows into the distributor, which is disposed in a central location relative to the reactors. Each fluid line from the distributor to the individual reactors is substantially identical, facilitating the establishment of equivalent flow rates in the reactors. This type of concentric flow distribution is preferred over a bifurcated flow distribution, because in the concentric distribution, one reactor can be decoupled from the reactant flow without affecting the flow rates in other reactors, as discussed above with respect to FIGS. 2B and 2C.

The first reactant flows into common assembly 316a and into fluid lines 320a. Each valve 320a is controllably coupled to the system controller (as shown in FIGS. 1A-1E). When a reactor is online (i.e., when the system controller has not designated the reactor as the backup reactor), valve 320a, which is associated with the reactor, is controlled by the system controller such that the first reactant flows through the valve into a fluid line 328a, and into the reactor. In contrast, when a reactor is designated as a backup reactor by the system controller (i.e., when a reactor is offline), valve 320a associated with the offline reactor is controlled by the system controller so that the first reactant does not flow through the valve. Instead, the valve associated with the backup reactor places the corresponding fluid line 328a (and the backup reactor) in fluid communication with a supply of solvent (a first solvent as in FIGS. 1A-1D, or a common solvent as in FIG. 1E), as indicated by valve inlets 324a. Thus it should be understood that each valve port 324a is coupled in fluid communication with a supply of solvent, either through individual fluid lines, or via an additional common assembly (such as assembly 316a).

The system controller can then activate the pump(s) associated with the solvent supply(ies), causing solvent to flow into the designated backup reactor. However, solvent is thus not introduced into portions of the backup reactor configured to accommodate a second reactant. The preferred embodiments are discussed in terms of reactors having two reactant inlets and a product outlet. Fluid lines 328a are coupled to the first reactor inlets.

FIG. 3C similarly shows a second reactant feed assembly incorporated into system 310. FIG. 3C is similar to FIG. 3B in form and function, except that fluid lines 328b couple valves 320b in fluid communication with the second reactant inlet on each reactor. Common assembly 316b is in fluid communication with the second reactant supply (see FIGS. 1A-1E). Valve ports 324b are coupled in fluid communication with either a common solvent supply (FIG. 1E) or a second solvent supply (FIGS. 1A-1D). Again, each valve is controllably coupled to the system controller. When a reactor is online, the system controller controls the valve associated with that reactor so the second reactant flows from common assembly 316b into the reactor. When a reactor is designated as the backup reactor, the system controller manipulates the valve corresponding to the backup reactor so the second reactant is blocked, and the inlet of the reactor is in fluid communication with the second solvent supply (FIGS. 1A-1D) or a common solvent supply (FIG. 1E). In this manner, the fluid lines within a reactor associated with each reactant can be flushed with solvent.

Referring now to FIG. 3D, a product collection assembly (see FIGS. 1A-1E) is incorporated into system 310. The product collection assembly collectively includes a common assembly 316c, valves 320c, and fluid lines 330c. While not separately shown in FIG. 3D, common assembly 316c is coupled in fluid communication with a product receiver (as shown in FIGS. 1A-1E). Common assembly 316c functions as a collector, while common assemblies 316a and 316b function as distributors. For each online reactor, the system controller controls the valve associated the reactor so that product flows through an exit line 328c, through valve 320c and into fluid line 330c, to common assembly 316c, and then into the product receiver. For the backup reactor, the system controller controls the valve associated the reactor designated as the backup reactor so that any solvent exiting the backup reactor through exit line 328c is directed by valve 320c (via port 324c) into the fluid lines coupling the valve to the waste receiver (as shown in FIGS. 1A-1E).

While each exit line 328c is shown coupled to a side of each reactor 312, those of ordinary skill will recognize that many different styles and designs of reactors can be employed in a concentrically parallel chemical production system, in accord with the present invention, and thus, exit lines 328 could each be coupled to a different portion of each reactor. Generally, each reactor in such a parallel system will be substantially identical. Thus exit lines 328 will generally be coupled to the same location on each reactor.

Figures 3E, 3F:
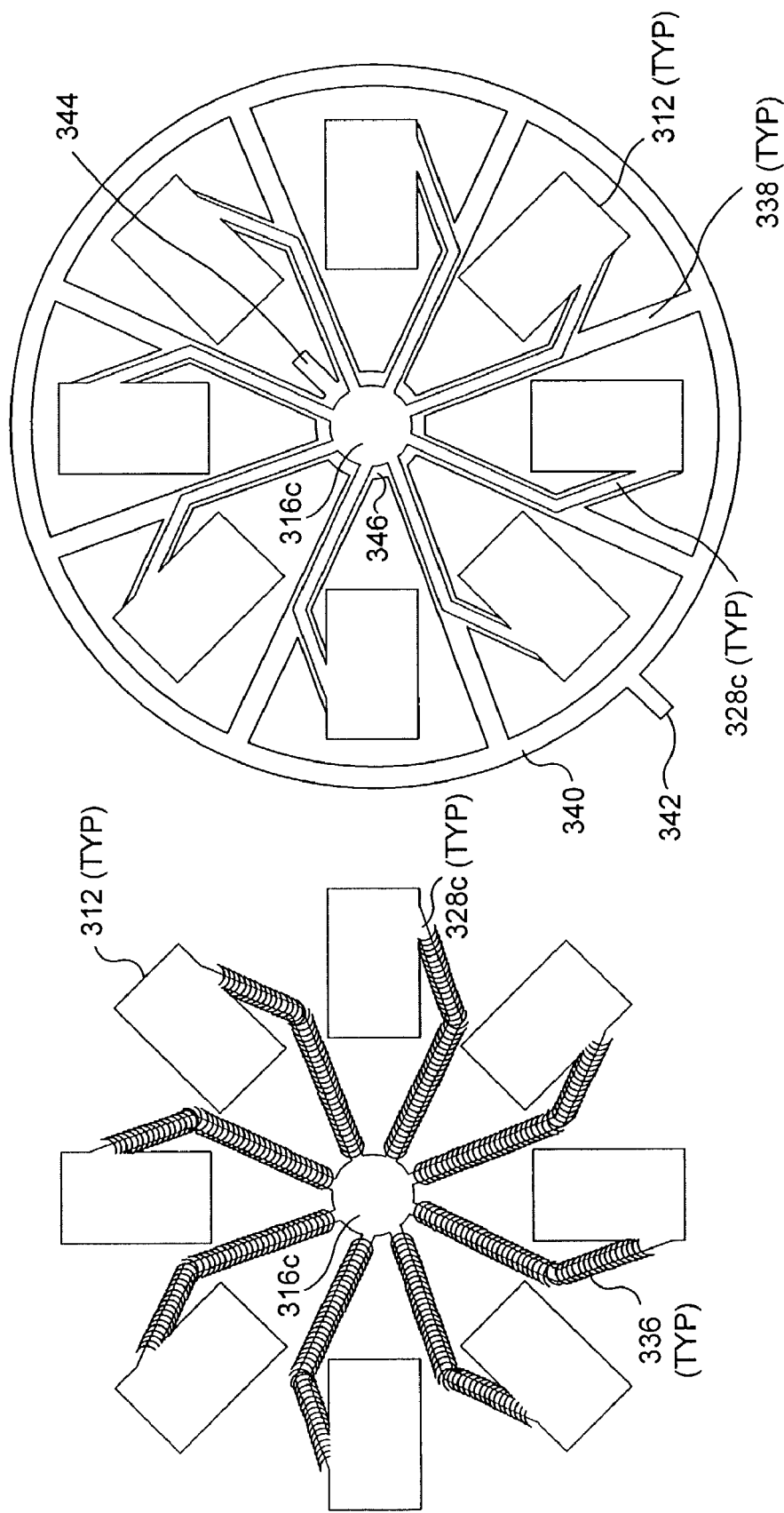
FIG. 3E is a schematic diagram that illustrates a temperature control assembly incorporated into the collection assembly of FIG. 3D.
FIG. 3F is a schematic diagram that illustrates a heat transfer assembly incorporated into the collection assembly of FIG. 3D.

For some reactions it may be important to thermally condition the product exiting each reactor. Control of product temperature can avoid crystallization of the product (which could block exit lines 328), and can reduce the quantity of undesired byproducts. FIGS. 3E and 3F schematically illustrate structures that can be employed to achieve such thermal conditioning. In FIGS. 3E and 3F, valves 320c and the concentric ring heat exchanger assembly have not been shown in order to simplify the Figures.

In FIG. 3E, a coiled structure 336 is wrapped around each exit line 328c, to control the temperature of the product flowing through the exit lines. In one embodiment, coiled structure 336 is implemented using a heating element, such as a resistive wire or tape type heater (similar in concept to the pipe heaters used to prevent water from freezing in water pipes). Such an embodiment is useful for raising the temperature of a product in the exit lines; however, such heaters can only add heat to a product. In another embodiment, each coiled structure 336 is a tube through which a heat transfer media can flow. Such an embodiment can be used to either heat or cool the product in the exits lines, depending on the temperature of the heat transfer media employed. While it is possible that each coiled structure corresponding to a different exit line could be independently controlled, it is generally desirable in a parallel system for operating conditions in each reactor (and through each exit line) to be identical, in order to achieve a high quality, consistent product. Note that if each coiled structure were independently controllable, the exit lines corresponding to backup reactors could be thermally conditioned according to different parameters. For example, it might be desirable to significantly raise the temperature of the exit line for a backup reactor while flushing the backup reactor with solvent, to help remove any blockage in the exit lines.

Referring now to FIG. 3F, the product in each exit line 328c is thermally conditioned using a tube-in-tube heat exchanger. Each exit line 328c is within a heat transfer fluid line 338. If the temperature of the product needs to be raised to prevent crystallization of the product, a heat transfer fluid having a temperature greater than the product is introduced into fluid lines 338. If the temperature of the product in the exit lines needs to be reduced, to prevent undesired byproducts from forming, or for some other reason, a heat transfer fluid having a temperature lower than the product is introduced into fluid lines 338. Those of ordinary skill in the art will recognize that the temperature selected for the heat transfer fluid is a function of the specific reaction employed.

A ring shaped fluid line 340 disposed outwardly of reactors 312 is coupled to each fluid line 338. Heat transfer media can be collected from (or introduced to) ring shaped fluid line 340 from a fluid port 342. A hub 346 disposed proximate a center of the concentrically disposed reactors is also coupled to each fluid line 338. Hub 346 jackets collector 316c and includes a fluid port 344. If fluid port 342 is an inlet port, then fluid port 344 functions as an outlet port, and vice a versa.

FIGS. 3B-3D are intended to represent different layers in a concentrically parallel chemical production system in accord with the present invention. While the two reactant assemblies and the collection assembly appear to be disposed in the same position relative to the reactors, in an assembled system, each assembly is configured as a separate layer. While the specific arrangement of the layers is not critical, it is contemplated that a preferred orientation will be to dispose the first reactant assembly in an upper layer, the second reactant assembly in a middle layer, and the collection assembly in a bottom layer, with sufficient spacing for all required fluidic and process control connections.

Figure 4:
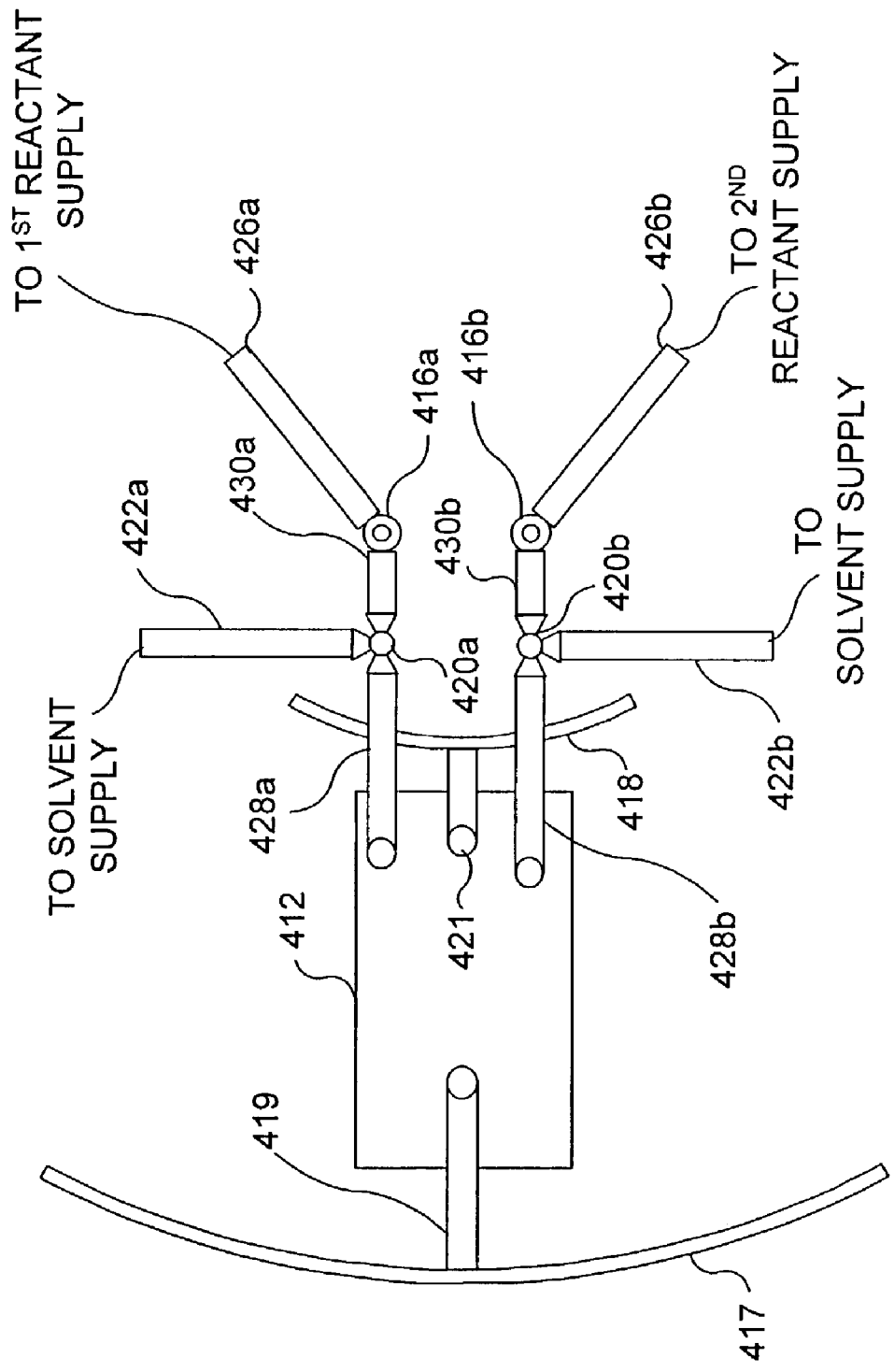
FIG. 4 is a schematic diagram that illustrates how each reactor from the parallel chemical production system of FIG. 2 is coupled to the first and second reactant feed assemblies, and the heat transfer assembly.

FIG. 4 provides additional detail with respect to how each reactor is coupled to the first and second reactant supplies, and to each solvent supply. FIG. 4 shows only one of the eight reactors from system 310 (FIGS. 3A-3D). Reactor 412 includes a heat transfer media inlet 421 coupled to a heat transfer media supply line 418 (a portion of the innermost ring-shaped heat transfer fluid line), and a heat transfer media outlet 419 coupled to a heat transfer media recovery line 420 (a portion of the outermost ring-shaped heat transfer fluid line). Reactor 412 also includes a first reactant inlet coupled with a valve 420a via fluid line 428a, and a second reactant inlet coupled with a valve 420b via fluid line 428b. As described above, valves 420a and 420b are controllably coupled to the system controller (FIGS. 1A-1E). When reactor 412 is designated as the backup reactor, the system controller manipulates valves 420a and 420b to place the first and second reactant inlets of the reactor in fluid communication with fluid lines 422a and 422b, which as indicated, are coupled to a solvent supply. As discussed above, a common solvent supply can be employed, or a dedicated solvent supply for each reactant can be employed.

When reactor 412 is designated as an online reactor, the system controller manipulates valves 420a and 420b to place the first and second reactant inlets of the reactor in fluid communication with fluid lines 430a and 430b. As discussed in connection with FIG. 3B, the first reactant feed assembly collectively includes valve 420a, fluid line 430a, and common assembly 416a. Common assembly 416a is coupled to the first reactant supply via a fluid line 426a. Similarly, the second reactant feed assembly collectively includes valve 420b, fluid line 430b, and common assembly 416b. Common assembly 416b is coupled to the second reactant supply via a fluid line 426b. In FIGS. 3B and 3C, common assemblies 316a and 316b are shown disposed in the center of system 310. As discussed above, each feed assembly and the collection assembly of FIGS. 3B-3D are stacked in layers, so each respective common assembly is disposed centrally with respect to the reactors. To enable FIG. 4 to simultaneously include the first and second reactant assemblies (normally disposed in different layers), the positions of common assemblies 416a and 416b have been shifted from their preferred central location.

FIG. 5A provides additional detail with respect to how each reactor is coupled to the product receiver and waste receiver described above. FIG. 5A shows only one of the eight reactors from system 310 (FIGS. 3A-3D), and for simplicity the heat transfer fluid lines and reactant inlets are not shown. Reactor 512 includes an outlet coupled in fluid communication with a valve 520c, via an exit line 528a. A sensor 546, which is discussed in detail below, is preferably included in exit line 528c. As noted above, valve 520c is controllably coupled with the system controller of FIGS. 1A-1E. When reactor 512 is designated as the backup reactor, the system controller manipulates valve 520c to place the reactant outlet in fluid communication with fluid line 540, which is ultimately coupled in fluid communication with the waste receiver. Thus, solvent employed to flush reactor 512 can be isolated (using valve 520c) from product collected from online reactors at the product receiver. As indicated in FIG. 5A, fluid line 540 is coupled to a common assembly 516d. While not shown in FIGS. 3B-3D, common assembly 516d functions similarly to common assembly 316c of FIG. 3D, in that material collected from all reactors is funneled to a common collector, and then is directed to the appropriate receiver. In the case of common assembly 516d, solvent from each separate reactor can be directed via each of the reactor's exit line 528c, valve 520c and fluid line 540. Then a single fluid line 542 couples common assembly 516d to the waste receiver. Alternatively, each fluid line 540 associated with each reactor can be individually coupled to the waste receiver.

Fluid line 542 includes a sensor 548b, which will be described below. By using common assembly 516d, no matter which reactor discharges a material via fluid line 540, based on the position of valve 520c, the material passes by sensor 548b. In contrast, if each fluid line 540 associated with each reactor were individually coupled to the waste receiver, then a duplicate sensor would need to be provided for each fluid line coupling the reactor to the waste receiver. Again, each feed assembly and the collection assembly of FIGS. 3B-3D are preferably stacked in layers, so each respective common assembly 316a-316c is disposed centrally with respect to the reactors. To enable FIG. 5 to simultaneously include a common assembly associated with waste (assembly 516d) and a common assembly associated with product (assembly 516c), the positions of common assemblies 516c and 516b have been shifted from their preferred central location. Preferably, common assembly 516d associated with waste is stacked in a separate layer, as described above with respect to FIGS. 3B-3D.

When reactor 512 is online and not designated by the system controller as the backup reactor, the system controller manipulates valve 520c to place the reactant outlet in fluid communication with fluid line 530c, which is ultimately coupled in fluid communication with the product receiver. Thus, product produced in reactor 512 is combined in common assembly 516c with product from other online reactors, before being directed to the product receiver via fluid line 544 (see FIG. 3D). The collector assembly of FIGS. 1A-1E collectively includes exit lines 528c, valves 520c, fluid lines 530 from each reactor, as well as common assembly 516c.

Fluid line 544 includes a sensor 548a. Optionally, the automated continuous processing parallel chemical production system can include an analytical unit 550. In such an embodiment, sensors 548a and 548b are relatively inexpensive data collectors, which are coupled to analytical unit 550 to analyze the collected data. Thus, only a single relatively more expensive analytical unit is required.

Each fluid line coupled to the outlet of a reactor includes a sensor 546. The installation of an inline-analytic sensor in every single line enables deviations from product standard values to be continually monitored for each reactor. While not specifically shown, it should be understood that each sensor 546 is coupled to the system controller, so that the system controller can immediately place a reactor offline (by manipulating the valves in the feed assemblies and collection assemblies as described above), to prevent degrading the quality of the product sent to the product receiver. Thus, data from sensors 546 can be used to detect a predetermined condition that triggers the system controller to designate a specific reactor as the backup reactor.

Sensors 546 can implement UV spectroscopy, IR spectroscopy, Raman spectroscopy, refraction index determination, conductivity determination, etc. The purpose of sensors 546 (which preferably are identical) is not to indicate an absolute qualitative result, but instead is simply to compare the quality of the product produced by a reactor to a predefined standard that defines a minimum acceptable standard.

As noted above, it is preferred to employ relatively inexpensive detector cells in fluid lines, and for signal analysis to be done by a single, relatively more expensive device. Thus, sensors 546 can also be coupled to analytical unit 550. Transfer of signals from sensors to the analytical unit can be via electrical or optical connections, depending on the type of data collected and the analytical method employed.

Because the system includes only one fluid line 542 and one fluid line 544, only two detectors are required to monitor these fluid lines. In some embodiments, the detector in fluid line 542 can be eliminated, because generally, there is no need to analyze the quality of the waste solvent. Including sensor 548b has practical utility, since after a designated backup reactor is flushed with solvent, the inlets of the reactor can be placed in fluid communication with the reactant supplies, while the outlet remains in fluid communication with the waste receiver. The product produced by the designated backup reactor can be sampled by sensor 548b, before the product from that reactor is combined with the product from other reactors. If the solvent flush is not effective in improving the product quality, then the product from the other reactors is not degraded.

With respect to sensors 548a and 548b, an absolute value of the parameter being measured, rather than a qualitative value, is preferable. For this purpose, a more sophisticated analytical method is desirable, and the results of such analysis need not be provided in real time. Methods such as HPLC, GC, and NMR may be appropriate in carrying out the analysis. Because only one (or two) sensors are required, more expensive detector cells can be employed.

For a reactor that has been designated as an offline or backup reactor, many different types of tests can be performed to determine if the reactor has been suitably serviced (such as by flushing with solvent), or whether additional service and/or replacement is required. For example, the pressure drop along the backup reactor can be measured as a function of applied flow rate and/or the flow rate can be measured, if a specified liquid pressure is applied to the fluid. The off-line reactor can be brought back to the production stream after proving its functionality or, after being cleaned by rinsing with solvent. Solvent rinsing can be employed at regular intervals value as a preventive maintenance procedure.

By cleaning all reactors consecutively at regular intervals (depending on the chemistry involved, e.g., once a day or once a month) fouling/blocking of the reactors due to clogging can be avoided. Preferably, this regular solvent rinsing is completely automated to ensure a long term failure free operation of the production system. If required, a defective reactor can be pulled offline and replaced with the backup reactor to maintain a constant production rate. It is expected that such a parallel chemical production system can easily operate 8000 hours per year, without downtime.

If desired, in addition to regularly rinsing each reactor consecutively, this preventive maintenance procedure can be extended by regularly performing a quality check of the product quality from each reactor, isolating the output from a specific reactor while providing reactants to that reactor, as noted above. The concentric distribution discussed above with respect to FIG. 2A is particularly beneficial in a system having a backup reactor, because concentric distribution enables a constant residence time to be achieved, no matter which reactor is designated as a backup reactor.

When scaling the chemical production system to achieve a desired production level, the system can be configured so that more than one reactor can be placed offline in a backup or maintenance mode. In a system that requires N reactors, to be active in producing the desired product, any number of reactors less than N can be operated at the same time to meet a reduced target volume of the desired product.

It should be understood that additional process modules (such as residence time modules) can be placed in line between each reactor and the collection assembly (see FIGS. 1A-1E) to provide additional processing and control, such as time and temperature treatment.

FIG. 5B includes each element from FIG. 5A, and adds optional thermal conditioning structures for thermally conditioning the product exiting each reactor, generally as described in connection with FIGS. 3E and 3F. Such thermal conditioning structures can be implemented as the coiled structures of FIG. 3E, or the tube-in-tube structures of FIG. 3F. Those of ordinary skill in the art will recognize that these implementations of thermal conditioning are merely exemplary, and that other implementations are alternatively feasible.

Referring to FIG. 5B, a thermal conditioning structure 550 is employed to thermally condition the product exiting the reactor via exit line 528c, and flowing through valve 520c into fluid line 530c. If thermal conditioning structure 550 does not thermally condition valve 520c, it would be beneficial to insulate valve 520c, so that valve 520c does not induce a significant thermal change in the product flowing through the valve.

A thermal conditioning structure 556 is employed to thermally condition the product flowing in fluid line 544, which couples product collector 516c with a product receiver. A thermal conditioning structure 552 is similarly employed to thermally condition the product (or solvent, as the case may be) flowing in fluid line 540, which couples valve 520c to waste collector 516d. Finally, a thermal conditioning structure 554 is employed to thermally condition the product flowing in fluid line 544, which couples waste collector 516d with a collector receptacle.

While inlet and outlet fluid ports are not shown as being associated with thermal conditioning structures 550, 552, 554, and 556, it should be understood that such elements are present (as shown in FIG. 3F) when the thermal conditioning structures are configured to direct a heat transfer medium in a heat exchange relationship with fluid lines through which a product or a waste flows.

As noted above, the assemblies of FIGS. 3A-3D (i.e., the concentric heat exchange assembly of FIG. 3A, the first reactant feed assembly of FIG. 3B, the second reactant feed assembly of FIG. 3C, and the collection assembly of FIG. 3D) are disposed in layers in at least one embodiment. FIG. 5C schematically shows such layers assembled into a continuous parallel chemical production system 560. As shown, system 560 is enclosed in a housing 562. It should be understood that while such a housing is convenient, it is merely exemplary and not intended to be limiting on the invention. Housing 562 includes inlets 564 and 566 for a first and second reactant, respectively, as well as inlet 568 for a solvent, and inlet 570 for a heat transfer media. Additional inlets can be added if more than two reactants are required. Also, an additional inlet for solvent can be added if the system is to be configured as indicated in FIGS. 1A-1D (each of which employ two solvent supplies), rather than the system of FIG. 1E (which includes a single solvent supply). Housing 562 includes outlet 582 for product, outlet 584 for waste, and outlet 586 for heat transfer media, generally as described above.

Within housing 562 are layers 574, 576, and 578. Layer 574 generally corresponds to the first reactant feed assembly of FIG. 3B. A common distributor for a first reactant is coupled with each of a plurality of concentrically oriented reactors, with valves to enable each reactor to be isolated to serve as a backup reactor, as described above. Layer 576 generally corresponds to the second reactant feed assembly of FIG. 3C. Again, a common distributor is coupled with each of the reactors, to enable the second reactant to be introduced into each reactor. Valves enable each reactor to be isolated. Layer 578 generally corresponds to the collection assembly of FIG. 3D. A common collector is coupled with each reactor, with valves being provided as required to enable each reactor to be isolated.

The heat exchanger assembly of FIG. 3A has been integrated into layer 576, as indicated by outer ring 576. It should be understood that the heat exchanger assembly could be implemented in one of the other layers, or as a completely separate layer. While FIGS. 3B-3D show the concentric heat exchanger assembly integrated into each Figure, it should be understood that the inclusion of the concentric heat exchanger assembly of FIG. 3A in each of FIGS. 3B-3D is intended to illustrate that the concentric heat exchanger assembly could be integrated with any of the first reactant feed assembly, the second reactant feed assembly, or the collection assembly. Further, inclusion of the concentric heat exchanger assembly into each of FIGS. 3B-3D provides a valuable reference to the orientation of the assembled system.

It should also be noted that each of layers 574, 576, and 578 include their own set of concentrically disposed reactors (see reactors 312 of FIGS. 3A-3D). In addition, it should be understood that system 560 includes one set of concentrically disposed reactors, and layers 547, 576, and 578 represent separate layers of that one set of reactors.

The concepts of concentrically disposed reactors, and parallel systems including backup reactors can be extended into continuous processing parallel chemical production systems configured to perform multistage synthesis. The continuous processing parallel systems described above are configured to generate a desired product based on a reaction performed in one reactor (with multiple reactors producing the same product in parallel). There are also chemical products that require the execution of multiple processes steps, in different reactors, to achieve a desired product.

Thus, chemical production systems in accord with the present invention are intended to be capable of multi-step syntheses. To ensure that the fluidics remain identical with those in a test reactor in multi-step syntheses, and to prevent the accumulation of high amounts of unstable intermediates, the product of the first step is not necessarily collected in a star like/concentric collection assembly from each reactor, but instead, can be directed separately into the inlet of a subsequent reactor.

FIG. 5D schematically illustrates a multistage concentrically parallel chemical production system 588 in accord with the present invention, in which a product 598 from each reactor 512a in a first stage 590 is directed into a reactor 512b in a second stage 592, for further processing. A first reactant 596 and a second reactant 594 enter first stage 590 via reactant feed assemblies, as described above. Rather than collecting the product from each reactor using a common collection assembly as shown in FIG. 3D, the outlet from each reactor 512a in first stage 590 is coupled with an inlet for a corresponding reactor 512b in second stage 592.

The reaction occurring in the reactors of the second stage may be involve a catalyst, such that an additional reactant is not required, or one or more additional reactants 597 may be introduced into each reactor 512b of second stage 592. Second stage 592 includes a collection assembly generally as shown in FIG. 3D, such that product 599 from each reactor is combined and directed to a product receiver (not shown in FIG. 5D, see FIGS. 1A-1E). While not shown, it should be understood that multiple stages similar to first stage 590 can be coupled in series, so that multipart synthesis requiring more than two steps (i.e., more than two stages) can be achieved. In each stage, the product from one reactor is directed to a corresponding reactor in a subsequent stage, and this step is repeated as required, until the final product is achieved and each product stream is combined, as shown by way of example, in connection with second stage 592.

Such multistage concentrically parallel chemical production systems can benefit from the incorporation of backup reactors, for the reasons noted above, enabling automated continuous processing concentrically parallel chemical production systems to be achieved. Backup reactors in multistage systems can be implemented in a number of ways. In one embodiment, each reactor in a first stage corresponds to a specific reactor in each later stage. Whenever any reactor in the first stage is designated as a backup reactor, the specific corresponding reactors in each later stage are also designated as backup reactors.

In a different embodiment, the reactors in each stage can be individually selected as backup reactors. Assume each stage includes five reactors, R1-R5. The first stage (S1) thus includes reactors S1R1, S1R2, S1R3, S1R4, and S1R5. The second stage (S2) includes reactors S2R1, S2R2, S2R3, S2R4, and S2R5. Stage "X" (SX) includes reactors SXR1, SXR2, SXR3, SXR4, and SXR5. In the embodiment described above, if S1R1 is a backup reactor, then S2R1 and SXR1 must also be backup reactors. Particularly when each outlet of each reactor includes a sensor (as shown in FIGS. 5A and 5B), it would be convenient to enable poorly performing reactors (in need of maintenance) in different stages to be designated as backup reactors, even if their corresponding reactors in other stages do not require maintenance. If reactors S1R4 and S2R3 are identified as producing product deviating from a standard, and all reactors in stage X are performing nominally, then it would be convenient to designate S1R4, S2R3, and any one reactor from stage X as backup reactors. To be able to achieve that function, a valve assembly is required between the outlet of each reactor in a preceding stage and the inlet of each reactor in the subsequent stage. Such a valve assembly is indicated by valves 595. While each fluid connection related to valves 595 is not shown, it should be understood that valves 595 enable the outlet of each reactor in a preceding stage to be coupled to the inlet of any reactor in the next stage, i.e., manipulating valves 595 enables any reactor in first stage 590 to be coupled to any reactor in second stage 592.

A related embodiment couples each valve 595 to the waste receiver (not shown in FIG. 5D, see FIGS. 1A-1E) to enable each reactor, regardless of the stage in which it is used, to be designated as a backup reactor and coupled to the waste receiver. In such an embodiment, any solvent flush exits a reactor and can be directed to the waste receiver, without requiring the solvent to also pass through a designated backup reactor in a later stage. This embodiment is particularly useful when solvents compatible with one stage are not compatible with later stages. In such an embodiment, each stage will require its own fluid connections with solvent sources. In embodiments in which each reactor in a preceding stage corresponds to a specific reactor in a subsequent stage, the solvent fluid lines need only be coupled to the first stage, as the solvent flush will pass through each stage in due course.

Of course, it should be understood that the product generated in a first stage could be collected in a product collector, and then sent as a single product stream to a second stage. The second stage might be a relatively simple reaction that can be achieved using fewer reactors than employed in the first stage. The collected product from the first stage might be directed into only a single reactor in the second stage. The collected product from the first stage might be also be separated into a plurality of different fluid streams and fed into a plurality of different reactors in a second stage, using structures and techniques as described above in connection with the first and second reactant feed assemblies (see FIGS. 3B and 3C). It is preferable, but not required, for the reactors in the second stage to be equal in number and orientation to the reactors in the first stage.

FIG. 6 and the following related discussion, are intended to provide a brief, general description of a suitable computing environment for practicing the system control of the present invention. In a preferred embodiment of the present invention, the system controller is implemented as a software application that is executed on a personal computer (PC). Those skilled in the art will appreciate that the present invention may be practiced with other computing devices, including a laptop and other portable computers, multiprocessor systems, networked computers, mainframe computers, hand-held computers, personal data assistants (PDAs), and on devices that include a processor, a memory, and a display. An exemplary computing system 630 that is suitable for implementing the present invention includes a processing unit 632 that is functionally coupled to an input device 620, and an output device 622, e.g., a display. Processing unit 632 includes a central processing unit (CPU) 634 that executes machine instructions comprising a continuous processing system control application and machine instructions for implementing the additional functions that are described herein. Those of ordinary skill in the art will recognize that CPUs suitable for this purpose are available from Intel Corporation, AMD Corporation, Motorola Corporation, and other sources.

Also included in processing unit 632 are a random access memory (RAM) 636, and a non-volatile memory 638, which typically includes read only memory (ROM) and/or some form of persistent memory storage, such as a hard drive, optical drive, etc. These memory devices are bi-directionally coupled to CPU 634. Such storage devices are well known in the art. Machine instructions and data are temporarily loaded into RAM 636 from non-volatile memory 638. Also stored in memory are operating system software and ancillary software. While not separately shown, it should be understood that a power supply is included to provide the electrical power needed to energize computing system 630.

Computing system 630 can include speakers 637 and other components that are not required to carry out the present invention, but which are often included in PCs. It is contemplated that the system controller can be programmed to use speakers 637 to provide an audible warning if one of the sensors described above detects a condition requiring operator attention. For example, if the system controller detects a specific reactor producing a product that falls below the predetermined quality standard, an audible alarm can be provided, while the system controller designates the underperforming reactor as the new backup reactor. In addition to, or instead of an audible alarm, a visual alarm can be employed.

A modem 635 is often included in computing systems, and is useful for importing or exporting data via a network connection over a telephone line. As shown, modem 635 and speakers 637 are components that are internal to processing unit 632; however, such units can be, and often are, provided as external peripheral devices.

Input device 620 can be any device or mechanism that enables input to the operating environment executed by the CPU. Such input device(s) include, but are not limited to a mouse, a keyboard, a microphone, a pointing device, or a touchpad. Output device 622 generally includes any device that produces output information perceptible to a user, but will most typically comprise a monitor or computer display designed for visually displaying output. However, it is contemplated that present invention can be modified so that the system's output is an electronic signal, or is adapted to interact with external systems. Accordingly, the conventional computer keyboard and computer display of the preferred embodiments should be considered as optional.

While FIG. 6 illustrates the functional elements of an exemplary computing system, FIG. 7 schematically illustrates a typical PC as described above. Computing system 730 is a desktop PC 730. PC 730 includes a processing unit 732 (generally as described above) and a display 728. Instructions for controlling the parallel chemical production system in accord with the present invention are preferably stored on a hard drive 731. When PC 30 is employed as the system controller, the PC is coupled to an appropriate connector on to each controlled element as indicated in FIGS. 1A-1E through a cable connected to a data port on the PC, such as its serial port, parallel port, universal serial bus port, Ethernet port, Profibus port, or other well known data ports (none of which are shown in the Figures, but are well known to those of ordinary skill).

It should be noted that a system controller can also be implemented with an application specific integrated circuit (ASIC), or some other type of hard wired logic circuit, as opposed to a more general purpose processor executing stored machine instructions.

While the steps implemented in carrying out the present invention have been generally discussed above, FIGS. 8 and 9 are logical flow charts that show the sequence of logical steps employed for two embodiments of using a parallel chemical production system. A first embodiment, corresponding to a flow chart 810 in FIG. 8, relates to the use of a backup reactor in a parallel chemical production system. In a block 812, a test reactor is employed to determine preferred processing conditions for producing a desired product. Such conditions will minimally typically include flow rates for the required reactants, and will often include additional parameters, such as optimal reactor temperatures, optimal temperatures for the individual reactants, and means for providing sufficient residence time. The amount of processing time provided by a given chemical processing system is a function of the volume of the reactor or reaction chamber within the system, and the flow rate of the reactants into the reactor (or reaction chamber). While the volume of the reaction chamber within a particular chemical processing system is generally fixed, flow rates can typically be varied throughout at least a limited range. Accordingly, the volume of the reaction chamber and the flow rates of the reactants should be selected to ensure that the reactants have sufficient time to thoroughly react. Furthermore, additional volumes can be provided, such that the additional volumes act as "residence time chambers" or modules, down stream of a reaction chamber. Basically, a residence time chamber is a volume into which the already mixed reactants (exiting a reaction chamber or reactor) are diverted. The mixed reactants are held in the residence time chamber for a length of time sufficient to ensure that the desired reaction has been completed before the resulting product and any byproducts are directed into a collection vessel. Thus, residence time chambers can be beneficially incorporated into a chemical processing system when the volume of the reaction chamber and the available reactant flow rates within that chemical processing system cannot otherwise be readily modified to provide sufficient processing time. Some residence time chambers are simply unobstructed chambers or fluid paths into which mixed reactants are directed, and the physical dimensions of the chamber or fluid path are such that the time necessary for the mixed reactants to traverse the chamber or fluid path provides the required residence time. Other residence time chambers include baffles or other types of flow restriction elements designed to increase the length of time required for the mixed reactants to traverse the chamber. Commonly assigned U.S. Pat. No. 6,436,720, entitled RESIDENCE TIME PROVIDING MODULE/APPARATUS describes a particularly flexible residence time module that can be beneficially employed in the present invention to provide sufficient residence time.

Referring once again to FIG. 8, in a block 814, a scalable continuous production system is created, using reactors substantially identical to the test reactor. While the size of each reactor can be scaled up as compared to the test reactor, it is preferable to employ production reactors that are substantially equivalent to the test reactor, so that production conditions in each production reactor are as close as possible to the conditions inside the test reactor. The plurality of production reactors are coupled together in a parallel fashion, as indicated in FIGS. 1A-1E. While the system of FIG. 8 does not require the reactors be arranged in the concentric configuration of FIGS. 2 and 3A-3D, such a configuration is preferred for establishing equivalent flow rates of the reactants into each reactor.

With respect to the number of production reactors, it is contemplated that an 11 reactor production system will be particularly beneficial (10 online reactors and one backup reactor). Of course, parallel chemical production systems including more, or fewer reactors, are also contemplated. It should be noted that at some point, systems including large numbers of reactors will require such complicated fluid connections and such powerful pumps that a number of parallel chemical production systems including fewer reactors is likely to be a more efficient solution. For example, 10 systems that each include 10 online production reactors and one backup reactor, might be more efficient to produce and operate than one system including 100 online reactors.

One important aspect of the present invention to keep in mind when selecting the number of production reactors to include in a parallel chemical production system is that in some embodiments, not all the reactors are online at all times. In such embodiments, at least one reactor will be designated as a backup reactor. Thus, if it is determined that N reactors will provide a desired quantity of product per unit time, then N+1 reactors will be included. While in the preferred embodiments discussed above only a single backup reactor is included, in theory there is no reason that a parallel chemical production system cannot include additional backup reactors. The purpose of the backup reactor(s) is to facilitate continuous production over a relatively long period of time. Experience with specific reactors and specific products may indicate that more than one backup reactor is desirable.

In a block 816, one of the production reactors is designated as a backup reactor. In a block 818, the backup reactor is isolated from the reactant fluid supplies and the product receiver. In a block 820, the reactants are provided to the other reactors, and the product is collected.

In a block 822 the system controller determines if a predetermined condition has been met. If not, the logic loops back to block 820, and reactants are continuously provided to the online reactors. If the predetermined condition has been met, the system controller designates a different reactor as the backup reactor in a block 824. At block 824, the logic branches in two directions. With respect to the online reactors, reactants are provided to the online reactors and product is collected, as indicated in block 820. When block 820 is reached via block 824, one of the online reactors was previously designated as the backup reactor. The other branch from block 824 corresponds to performing maintenance on the newly designated reactor. Such maintenance might be the replacement of the backup reactor with another equivalent reactor, or flushing the backup reactor with solvent. After flushing, the backup reactor can be tested to ensure that the product produced by that reactor meets acceptance standards. If flushing with solvent does not improve the product quality to an acceptable level, and replacement of that reactor is not an option, the system controller can be programmed to keep the backup reactor offline indefinitely, and to select another online reactor as a backup reactor.

Referring once again to block 822, the predetermined condition can correspond to a number of different parameters. In a simple embodiment, the system controller is programmed to operate the parallel chemical production system for a certain length of time, and once that time has elapsed, a new backup reactor is selected. This cycle repeats, and the system controller rotates the selection of the backup reactor until each reactor has been a backup reactor. This process can be repeated until the desired quantity of product is produced, or until serious maintenance issues require the system to be taken offline.

The predetermined condition can also be based on the quality of the product produced by each reactor. As indicated in FIG. 5, in one preferred embodiment, a sensor monitors the product from each reactor. If any of the reactors begin to produce a product that deviates from the predetermined standard, the system controller designates that reactor as the backup reactor. The quality condition can be combined with the elapsed time condition to determine when a reactor becomes a backup reactor.

In some cases, it may be desirable to run all of the reactors for an initial period of time, rather than immediately designating any reactor as a backup reactor. While not specifically shown, such a method eliminates block 816, and the system operates with all reactors online until a predetermined condition is met, at which point, one of the reactors is designated as the backup reactor. In a somewhat related embodiment, once the maintenance indicated in block 826 is performed, the backup reactor is placed back online, so that all reactors are online. This embodiment is indicated by the dashed line connecting block 826 to block 820.

FIG. 9 is a logical flow chart 910 of a different method in accord with the present invention. In this embodiment, the use of a backup reactor is a preferred, but optional step, while the concentric configuration of the reactors is not only preferred, but required. In a block 912, a test reactor is once again employed to determine preferred processing conditions for producing a desired product. In a block 914, a plurality of production reactors (preferably reactors that are substantially equivalent to the test reactor) are arranged in the concentric configuration of FIG. 2. While it may be beneficial to orient each reactor in the same plane, reactors can be oriented in different planes. The use of additional planes is expected to be particularly advantageous when relatively large numbers of reactors are included in the system. Care should be taken that disposing reactors in different planes does not effect flow rates of reactants into the reactors to a degree that adversely impacts the product quality. The use of additional planes is preferred for performing multiple step synthesis. It is convenient to arrange such planes in a substantially parallel orientation.

In a block 916, the plurality of reactors are coupled in parallel to reactant feed systems (in a preferred embodiment, a first and second reactant feed system are employed, as well as at least one solvent feed system). The use of two reactants is merely exemplary, and the present invention can readily be modified to produce desired products from a single reactant, or more than two reactants. In a block 918, the reactants are provided to each reactor, and in a block 920 the product is collected.

Of course, it should be understood that the logic in FIGS. 8 and 9 can be combined, to achieve a method that includes both the steps of configuring the reactors in a concentric configuration, and designating a backup reactor.

As discussed above, sensors can be employed to determine the quality of the product produced in each reactor. It should be understood that sensors can be employed that will provide quantitative results, as opposed to qualitative results. When such sensors are used, a quantitative standard can be defined, so that whenever a reactor produces a product that fails to meet the predefined quantitative standard, that reactor (and any corresponding second or later stage reactor) will be designated as a backup reactor and taken offline.

Exemplary Reactors

While many different reactors designs can be used to produce a parallel chemical production system in accord with the present invention, it is contemplated that the use of microreactors will be particularly advantageous. Various different configurations of microreactors can be beneficially employed in the present invention. Each micro reactor may be designed for only a specific chemical reaction, but will more likely be designed to support the production of a specific class or type of chemical products, since one design configuration is normally useable to produce various chemical products in which the reaction processes are similar in nature. A particularly useful micro reactor is described in a commonly assigned U.S. Pat. No. 6,537,506, entitled "MINIATURIZED REACTION APPARATUS," which was filed Feb. 3, 2000, the specification and drawings of which are hereby specifically incorporated herein by reference. While in one preferred embodiment, the reactors within the parallel chemical production system are microreactors, non-microscale reactors can alternatively be used in connection with the present invention. Microreactors are generally characterized as incorporating fluidic structures of less than 1 mm in size, especially with respect to reactant fluid pathways. Thus, it should be understood that the present invention is not limited only to parallel chemical production systems in which the reactors are microreactors, because the reactors could include fluidic structures larger in size than the micro scale fluidic structures generally associated with microreactors.

The miniaturized chemical reaction apparatus noted above is fabricated from a plurality of simple plates, as is described in greater detail below in connection with FIGS. 10, 11A-11C, and 12A-12C. Unlike prior art stacked layer chemical reactors that require relatively complicated surface features, such as grooves or channels, which do not penetrate plate comprising each layer, the simple plates employed in the present invention require that an opening be formed through each plate. Machining or stamping openings into a flat plate is significantly less complicated than the silicon etching, injection molding, and ceramic molding/sintering processes described in the prior art for producing the surface features that the prior art uses to channel fluid flow. Yet, the relatively simple technique of forming openings in a flat plate can be used to achieve a very useful chemical reactor, if the openings are properly placed, and the plates are properly configured and stacked so that the openings in the plates cooperate to convey fluids through the apparatus.

In the following description and the claims that follow, it will be understood that the term "simple plate" means a plate that has substantially planar opposed surfaces, e.g., a flat sheet of material. The simple plates used in the embodiments of the present invention disclosed herein are all generally rectangular and are characterized by having one or more openings that pass completely through the simple plate. Thus, the term "simple plate" as used herein and in the claims should be understood to mean a plate that does not include any etchings, grooves, or channels that do not completely penetrate the plate.

The term "groove," as used herein, should be understood to mean a surface feature that has been formed into the surface of an object, which does not penetrate completely through the object, and applies to components of prior art chemical reactors. The term "crystalline wafer," as used herein and in the claims that follow, means a material that has a crystalline structure and has been sliced into wafer-like components. Silicon and germanium are examples of materials employed for producing such crystalline wafers; however, it is not necessary for the material to be a semiconductor to comprise a crystalline wafer. In addition, it is not necessary for the material to be a single element such as silicon or germanium, but rather such a material can be a mixture of several elements that together form a material, which can be fabricated into crystalline wafers. The fabrication techniques commonly used in the semiconductor industry to form substrate wafers can be employed to produce crystalline wafers.

In a preferred embodiment, the simple plates are formed of a high quality stainless steel, and standard metal working techniques such as stamping and/or milling are used to fabricate the simple plates. It should be understood that a variety of other materials can be used to fabricate simple plates. Metals other than stainless steel can alternatively be used, as well as other materials, such as glass, plastic, or a combinations of these materials. Crystalline wafers are another alternative material from which to form the simple plates. The use of other materials will be accompanied by fabrication techniques appropriate to the specific type of material, such as injection molding for plastic materials. The material used to fabricate the plates must be considered in light of the chemical properties of the reactants used in a particular reaction. Stainless steel is a relatively chemically inert material, and is an appropriate material for many chemical reactants. Tantalum alloys and silver alloys are also expected to be useful. Hydrofluoric acid is a chemical that is extremely corrosive to metals and glass. Special plastic materials are appropriate when the desired reaction involves hydrofluoric acid. Those of ordinary skill in the art of chemical processing will readily understand how the choice of reactants necessitates an appropriate material be selected for fabricating the simple plates of the reactor.

A preferred embodiment of such a simple plate reactor represents a design that has been optimized for a liquid/liquid phase reaction involving two reactants. It should be understood that the underlying concept of the present invention, i.e., a reactor formed of a stack of plates incorporating only openings, can be applied to many other types of reactions, such as liquid/gas, gas/gas, liquid/solid, or gas/solid. As will be described in detail below, the preferred embodiment includes four heat exchangers; three heat transfer media pathways, and two reactant fluid pathways. However, it should similarly be understood that similar stacked plate reactors can be easily designed to include more or fewer heat exchangers, more or fewer heat transfer media pathways, and more or fewer reactant pathways.

The plurality of stacked simple plates enables a reactor to be constructed that performs from one to all of the following functions: reactant conditioning, control of reactant supply, thermal pre-treatment, combination and mixing of reactants under controlled thermal conditions, intermediate thermal treatment, post-procedural isothermal containment, post-procedural thermal treatment of reactant products, and product separation. In particular, simple plates can readily be designed and fabricated in which the dimensional characteristics of the reactant fluid passages formed by the interconnected openings of the simple plates provide for a stacked laminar flow of the reactants. Such a stacked laminar flow ensures that a particularly efficient type of mixing, referred to as diffusion mixing, can occur.

The quality of the interconnections between the simple plates is of great importance, since the interconnections must be free of gaseous and liquid leakage. This requirement is achieved through a combination of specially prepared surfaces and use of simple plates that are fabricated to close tolerances. The individual simple plates can be assembled by pressure fitting (using clamps or a housing that encloses the simple plates and applies a compressive force to the outer plates), or individual simple plates can be permanently assembled using diffusion welding technology, vacuum soldering, or other suitable techniques for joining the simple plates together.

The pressure fitting technique has the advantage of allowing a reactor to be built using specific simple plates that can readily be disassembled so that the reactor design can be changed by adding or removing simple plates. In this manner, the same simple plates can be used in more than one reactor to effect different chemical processes, However, if the simple plates are assembled using pressure fitting, very good control of the surface finishes is required, with almost no scratches on the surface of the simple plates, and a mean surface roughness less than 1 µm. The pressure that should be applied to maintain a stack of simple plates that have been fabricated from metals into a reactor, to prevent gas or liquid leakage, is preferably about 50 Newtons/cm$^2$.

Preferably, any stacked simple plate reactor should have the ability to maintain a desired narrow temperature range within the reactor, so that reaction dynamics can be closely controlled. In a preferred embodiment, the reactant and heat transfer media enter the stacked simple plate reactor via vertically oriented fluidic channels. Reacted product and spent heat transfer media exit the reactor via similarly disposed vertically oriented fluidic channels. The chemical processing operations occur in horizontally disposed channels within the reactor. It should be noted that the use of the term channel when used in conjunction with a stacked simple plate reactor should not be construed to mean that such a channel corresponds to a groove formed into the surface of an individual plate. While each individual simple plate only has openings and no grooves, channels or other fluid pathways are easily obtained in a stacked simple plate reactor. To form a channel, an elongate narrow opening is formed in one simple plate and that simple plate is sandwiched between two simple plates that do not have a corresponding elongate opening. The top of the channel is defined by the upper simple plate, the sides of the channel are defined by the sides of the opening formed in the middle simple plate, and the bottom of the channel is defined by the bottom plate. Thus, the depth of the channel is the same as the thickness of the middle simple plate. Fluid pathways between adjacent simple plates within a stacked simple plate reactor are created when openings through the stacked simple plates are aligned.

The fluidic system of the stacked simple plate reactor is preferably characterized by having a small pressure drop across the entire system. Furthermore, potential clogging problems are minimized by having few constrictions within the reactor, by introducing as few sharp directional flow changes as possible, by maintaining a small inner volume (about 1 ml), and by enabling rapid diffusion mixing in the mixing portion of the reactor. Preferably, fluidic channel geometries range from 100-500 µm, especially with respect to reactant fluid pathways (the dimensions of any heat transfer media pathways are less critical), and the walls separating the heat transfer media from the reactants or product should be of similar scale, to enable rapid heat transfer. As discussed above, several materials can be used to fabricate a stacked simple plate reactor; however, simple plates that are adjacent to openings in those simple plates comprising heat exchangers are preferably fabricated from a material that has good thermal conductivity. However, if the dimensional thickness of each plate adjacent to a heat exchanger is small, on the order of 0.3 mm, the effect of the thermal conductivity of different materials is negligible.

In general, the openings in each simple plate of a stacked simple plate reactor correspond to a fluid pathway established by stacking a plurality of simple plates, such that openings in simple plates above and below overlap, thereby allowing fluids to move throughout the reactor. Openings may also correspond to passageways for sensors, particularly temperature sensors. Preferably, to maximize heat transfer, the fluid flow directions of the heat transfer media within openings defining a heat exchanger are opposite to the direction of reactant flow.

FIG. 10 is an exploded isometric view of a preferred reactor 1170 that includes sixteen layers. Simple plates 1010-1160 are shown stacked in order so that the relative positions of each simple plate to each other may be examined. The preferred dimensional thickness of each simple plate is as follows:

| | |
|---|---|
| Top simple plate 1010: | 3.0 mm. |
| Second simple plate 1020: | 0.3 mm. |
| Third simple plate 1030: | 0.3 mm. |
| Fourth simple plate 1040: | 0.3 mm. |
| Fifth simple plate 1050: | 0.3 mm. |

-continued

| | |
|---|---|
| Sixth simple plate 1060: | 0.3 mm |
| Seventh simple plate 1070: | 0.2 mm. |
| Eighth simple plate 1080: | 0.3 mm. |
| Ninth simple plate 1090: | 0.6 mm |
| Tenth simple plate 1100: | 0.3 mm. |
| Eleventh simple plate 1110: | 0.2 mm. |
| Twelfth simple plate 1120: | 0.3 mm |
| Thirteenth simple plate 1130: | 0.6 mm |
| Fourteenth simple plate 1140: | 0.3 mm. |
| Fifteenth simple plate 1150: | 0.3 mm |
| Sixteenth simple plate 1160: | 3.0 mm |

Simple plates 1010 and 1160 (the top and bottom simple plates) are thicker than other plates to provide greater structural stability. Simple plates 1020-1060, 1100, 1120, 1140 and 1150 are much thinner, to enhance heat transfer. As will be discussed below, a thickness of 0.3 mm provides a reasonable heat transfer ability for a wide variety of materials. Simple plate 1070 is thinner by ⅓ to ensure proper laminar flow within mixing chambers. Simple plate 1110 is the same thickness as simple plate 1070, to maintain fluidic equilibrium conditions in the reactor. Simple plates 1090 and 1130 are thicker than other plates to provide a larger mass of fluid in the heat exchangers defined by plates 1090 and 1130. It should be noted that the preferred plate thickness represent sheet metal thicknesses that are commercially available, and that the ready availability of such materials lowers production costs.

For simple plates that include solid portions used to transfer thermal energy to or from heat exchangers, a preferred thickness is about 0.3 mm. As plate thickness increases, mechanical stability increases and heat transfer ability decreases. The 0.3 mm thickness provides good heat transfer characteristics without sacrificing mechanical stability. When graphs representing mechanical stability as a function of plate thickness (50 μm-1 mm) and heat transfer ability as a function of plate thickness (50 μm-1 mm) are combined, the curves representing each functional relationship intersect at approximately 0.3 mm. It should be noted that this optimum value of 0.3 mm is independent of the actual material selected (glass, metal, plastic, etc.). While the shape of the curves defining the functional relationships change when a different material is selected, the intersection of the curves at 0.3 mm remains relatively constant. Thus, 0.3 mm represents a simple plate thickness that provides for reasonable heat transfer ability without sacrificing structural integrity.

FIG. 11A illustrates a fluid flow path of Reactant A, as it enters top simple plate 1010 and proceeds through the sixth simple plate 1060 of reactor 1170. Reactant A enters through inlet 1015 in top simple plate 1010, proceeds to second simple plate 1020 of the second layer, and enters Reactant A distributor 1025. Reactant A then passes to third simple plate 1030 of the third layer, passing through four Reactant A openings 1035. In fourth simple plate 1040 of the fourth layer, Reactant A passes through four Reactant A openings 1045, which are part of the inter-digital-mixer. The purpose of the inter-digital-mixer is to precisely align the fluid flows for Reactants A and B to optimize mixing in later layers of the reactor. The purpose of Reactant A openings 1045 is to precisely align a plurality of Reactant A fluid paths with a plurality of Reactant B fluid paths, so that a stacked laminar flow can be achieved with equilibrated pressure drops. It should be noted that first heat exchanger 1024 is used to bring both Reactants A and B to the proper temperature in the inter-digital-mixer of the fourth layer.

In the fifth layer, fifth simple plate 1050 incorporates a plurality of reactant A openings that are aligned with a plurality of Reactant B openings. These openings form an alternating pattern of 1055 openings in four rows of six openings each (for a total of 12 Reactant A openings and 1057 Reactant B openings). In the sixth layer, sixth simple plate 1060 incorporates four fluid channels 1065. It is in the four channels 1065 that Reactants A and B first intermingle. Because of the pattern of fluid paths for Reactants A and B enabled by the inter-digital-mixer, Reactants A and B enter channels 1065 in a stacked laminar flow pattern.

FIG. 11B illustrates the fluid path that Reactant B takes in entering the first six layers of a reactor 1170. Reactant B enters top simple plate 1010 through opening 1017, passes through the second layer an identical Reactant B openings 1017 in second simple plate 1020. In the third layer, Reactant B enters Reactant B distributor 1037 in third simple plate 1030. In the fourth layer, Reactant B enters four Reactant B openings 1047 in fourth simple plate 1040. Openings 1047 (and 1045) are collectively referred to as the inter-digital-mixer. After passing through the fourth layer, Reactant B flows into twelve openings 1057 in fifth simple plate 1050, of the fifth layer. Reactant B then proceeds to the four fluid channels 1065 on sixth simple plate 1060, where Reactants A and B are first commingled.

FIG. 11C illustrates the combined flows of Reactants A and B after passing through the sixth layer and proceeding through layers 7-16 of reactor 1170. Reactants A and B as combined (in a stacked laminar flow pattern) flow through four fluid channels 1075 on seventh simple plate 1070. Channels 1075 lead to four mixing chambers 1077. In mixing chambers 1077, the stacked laminar flow is compressed, further enhancing rapid diffusion mixing. Second heat exchanger 1046 is used to control the temperature of the reactants as they mix in mixing chambers 1077. After Reactants A and B become thoroughly mixed in mixing chambers 1077, the now mixed Reactants A and B flow through a plurality of mixed reactant openings 1085 on eighth simple plate 1080. The mixed reactants then flow through the ninth and tenth layers via identical mixed reactant openings 1085 in simple plates 1090 and 1100, respectively. The mixed reactants then flow into reaction channels 1115 on eleventh simple plate 1110. Reaction channels 1115 preferably provide sufficient residence time so that the majority (if not all) of the reaction is complete. If reaction channels 1115 do not provide sufficient residence time, then an additional residence time chamber can be added downstream of reactor 1170. As noted above, the quality and yield of the desired reaction is greatly affected by the ability to control temperature during the reaction process. The preferred reactor provides heat exchangers 1093, 1133a and 1133b (respectively on simple plates 1090 and 1130) to precisely control the temperature within reaction channels 1115. If additional residence time chambers are required, then control of the temperature in the additional residence time chambers is also highly desirable. After passing through reaction channels 1115 in the eleventh layer, the resulting product passes through a plurality of product openings 1125 in simple plates 1120, 1130, and 1140 of layers 12, 13 and 14, respectively. The eight individual product streams represented by these product openings are then combined into a single product channel 1155 on fifteenth simple plate 1150, of layer 15. This single product exits the reactor via a product outlet 1165 on sixteenth simple plate 1160, in the bottom (sixteenth) layer of the reactor.

FIGS. 12A-12C illustrate the fluid paths for heat transfer media A, B, and C throughout the preferred reactor. FIG. 12A illustrates the fluid path for heat transfer media B, which services first heat exchanger 1024 in the second layer. Heat transfer media B flows into heat transfer media inlet 1014a in top simple plate 1010 and proceeds to heat exchanger 1024 on second simple plate 1020. Heat transfer media B passes through heat exchanger 1024, and exits heat exchanger 1024 via outlet port 1014b in top simple plate 1010. The purpose of heat exchanger 1024 is to adjust the temperature of the solid section of portion of the third layer that is immediately above the inter-digital-mixer (openings 1045 and 1047) in fourth simple plate 1040. In this manner, heat exchanger 1024 is moderating the temperatures of Reactants A and B prior to the reactants being mixed together. It is contemplated that for the majority of reactions, it will be desirable for Reactants A and B to be of similar temperature. Those of ordinary skill in the art will readily understand, however, that there may be some reactions in which Reactant A and Reactant B will preferably be kept at separate temperatures. It is contemplated that a different stacked plate design using the same principles of the invention can be designed and fabricated to provide for a separate heat exchanger to individually modify the temperatures of Reactants A and B.

FIG. 12B illustrates the fluid path that heat transfer media C takes through layers 1-5 of the preferred reactor. Heat transfer media C enters the reactor through inlet 1016a in top simple plate 1010 and then proceeds through heat transfer media C intake manifolds 1026a on simple plates 1020 and 1030, in layers 2 and 3, respectively. Heat transfer media C then enters heat exchanger 1046 on fourth simple plate 1040 of layer 4 and exits heat exchanger 1046 by utilizing heat transfer media C exhaust manifolds 1026b of simple plates 1030 and 1020, in layers 3 and 2, respectively. Heat transfer media C then exits the reactor using outlet port 1016b of top simple plate 1010. The purpose of second heat exchanger 1046 is to modify the temperature of the solid portion of sixth simple plate 1060 that corresponds to the mixing chambers 1077 of seventh simple plate 1070 (see FIG. 12C). Because the mixing of chemicals often spontaneously generates heat, a great deal of heat can be generated as Reactants A and B are thoroughly mixed. Second heat exchanger 1046 is thus able to cool Reactants A and B while in mixing chambers 1077 (see FIG. 12C), so that the temperatures of the reactants do not exceed the ideal temperature for the desired reaction. Second heat exchanger 1046 occupies both the fourth and fifth layers (simple plates 1040 and 1050), to increase the capacity of the heat exchanger.

FIG. 12C illustrates the fluid path for heat transfer media A as it passes through the first thirteen layers of preferred reactor 1170. Heat transfer media A enters the reactor at top simple plate 1010 via intake port 1012a. The heat transfer media A then passes through identical heat transfer media A intake manifolds 1022a on simple plates 1020 and 1030 of layers 2 and 3 respectively. Heat transfer media A continues to pass through heat transfer media A intake manifolds in layers 4, 5, 6 and 7, via intake manifolds 1042a. It should be noted that intake manifolds 1042a differ in size and shape relative to the intake manifolds 1022a of layers 2 and 3. The functional purpose of the size change is both reduce potential pressure drops within the fluid paths of the reactor, as well as to reduce the surface area of simple plates 1040-1070 to enhance bonding.

In layer 8, the shape of heat transfer media A intake manifold 1082a changes once again. The purpose of the size change between the heat transfer media A intake manifolds in layers 7 and 8 is so that heat transfer media A can be fed into two separate sections of the layer 9. In a first heat transfer media A fluid path in layer 9, heat transfer media A flows into a heat transfer media A intake manifold 1042a, and from there to an enlarged heat transfer media A intake manifold 1082a of tenth simple plate 1100 in layer 10. From there, heat transfer media A flows to heat transfer media A intake manifold 1042a in layer 11 (simple plate 1110), an enlarged heat transfer media A intake manifold in layer 12 (simple plate 1120), and then to heat transfer media A intake manifold 1042a in layer 13 (simple plate 1130).

In a second heat transfer media A fluid path in layer 9, fluid flows out of heat transfer media A intake manifold 1082a of eighth simple plate 1080 and into third heat exchanger 1093 on ninth simple plate 1090 of layer 9. As discussed above, the purpose of third heat exchanger 1093 is to moderate the temperature of the solid portion of layer 10 immediately adjacent to reaction channels 1115 in layer 11. Heat transfer media A exits heat exchanger 1093 by returning to layer 8 via heat transfer media A exhaust manifold 1082a, which is enlarged and overlaps the right end of third heat exchanger 1093.

Simple plate 1100 of layer 10 includes enlarged heat transfer media A intake manifold 1082a (as well as exhaust manifold 1082b). It should be noted that reaction channels 1115 of layer 11 are not quite long enough to overlap the enlarged heat transfer medial intake and exhaust manifolds 1082a and 1082b, thus no heat transfer media enters reaction channels 1115. Here, the functional purpose of the size change of the intake and exhaust manifolds is to reduce the surface area of tenth simple plate 1100, to enhance bonding, rather than to feed a heat exchanger (as in layer 8 and eighth simple plate 1080).

Referring now to layer 11, note that again the size and shape of heat transfer media A intake manifold 1042a has changed relative to the intake manifolds of layers 8 and 10. This size change relates to maintaining a calculated fluidic equilibrium throughout the microreactor. However, it is contemplated that the overall effect of the size change is relatively minor, and that an effective microreactor can be achieved without changing the size of the intake manifolds on layer 11.

In layer 12, the size and shape of heat transfer media A intake manifold 1082a is again enlarged, to once again divert some heat transfer fluid A into a second fluid path that services fourth heat exchangers 1133a and 1133b of layer 13. Heat transfer media A also flows into a heat transfer media A intake manifold 1042a in layer 13. The functional purpose of heat transfer media A intake manifold 1042a of layer 13 is to ensure that the fluid pressure within fourth heat exchangers 1133a and 1133b matches the fluid pressure within third heat exchanger 1093. Note both the third and fourth heat exchangers are moderating the temperature of reaction channels 1115, and thus preferably both heat exchanges should have similar flow characteristics.

Heat transfer fluid A that has entered fourth heat exchangers 1133a and 1133b exits layer 13 via heat transfer media A exhaust manifold 1042b in layer 12. From there, heat transfer media A moves successively through heat transfer media exhaust manifolds 1042b in layer 11, 1082b in layer 10, 1042b in layer 9, 1082b in layer 8, 1042b in layers 7-4 and 1022b in layers 3-2. Heat transfer media A finally exits the reactor via outlet 1012b in top simple plate 1010.

Generally the heat transfer media used in the preferred reactor will be liquids, although it is envisioned that selected gases may also be beneficially employed. Fluidized solid heat transfer media (such as sand or silica) are known in the art, and might be used, though the dimensions involved in the fluid channels of the preferred reactor raise the concern that the solid heat transfer media could cause clogging of the heat transfer pathways.

Another type of microreactor that is also likely to be particularly useful is described in a commonly assigned U.S. patent application Ser. No. 09/991,377, entitled ENHANCING FLUID FLOW IN A STACKED PLATE MICROREACTOR, which was filed Nov. 15, 2001, the specification and drawings of which are hereby specifically incorporated herein by reference. Such a microreactor is similarly fabricated from a plurality of simple plates, as is described in greater detail below in conjunction with FIGS. 13A and 13B.

One aspect of such an enhanced flow microreactor relates to internal parallelization. The term internal parallelization, as applied both to this disclosure and to the claims that follow, should be understood to mean simultaneously addressing a plurality of substantially identical microscale processing elements using only a single fluid inlet and a single fluid outlet for each fluid type (i.e., reactant, product, and heat transfer media). These processing elements can include microreactor units, fluid processing channels (i.e., channels utilized for thermal treatment and reactant mixing; but not fluid channels utilized for reactant distribution and product collection), heat exchangers and workup units. Workup units (i.e., post processing units) can be employed for quenching a reaction, purification of a product (such as by extraction, distillation, filtration, phase separation, crystallization, or adsorption), and/or for providing additional residence time to a reaction mixture before product collection. Thus one aspect of the present invention is a parallel chemical production system exhibiting external and internal parallelization.

A preferred internally parallelized chemical reaction plant incorporates a plurality of reversibly joined reactor stacks. The reactor stacks in turn incorporate a plurality of irreversibly joined reaction units, each reaction unit being made up of a plurality of irreversibly joined simple plates. The individual simple plates include openings that when aligned form fluid channels enabling reactants bypass a first reaction plate to provide reactants to a subsequent reaction plate, enabling parallel processing of the reactants within a reaction unit. These reaction units represent a first type of internal parallelization. Some of the simple plates within a reaction unit include an array of openings that when aligned with adjacent simple plates form a plurality of parallel fluid channels, representing a second type of internal parallelization. It is anticipated that graphite seals can be beneficially employed in reversibly sealing reactor units together to produce a chemical plant.

A key feature of the internally parallelized chemical reactor is the plurality of simple plates. For example, the manner in which the openings in the simple plates are configured, oriented relative to other openings, and dimensioned, and the manner in which the simple plates are joined together are important aspects of the present invention. The openings in simple plates in accord with the present invention are configured and oriented to manipulate a flow of fluid in a reactor to achieve a desired result. Preferably the manipulation will result in an enhancement of a quantity or a quality of a chemical product produced in such a reactor. Additional product can be generated by a single simple plate by including on a single simple plate a plurality of openings that define internally parallelized reaction channels. Higher levels of product can be produced by including more such single simple plates (each of which define a plurality of reaction channels) into a stack of simple plates comprising a reaction unit. Multiple reaction units can then be joined together to achieve a reactor stack, capable of producing higher levels of product. Even higher levels of production can be achieved by adding additional reactor stacks together to achieve a chemical production plant. Note that regardless of the number of reactor stacks (or reactor units, or single plates defining a plurality of reaction channels) that are joined to produce a chemical plant (or reactor stack, or reaction unit), only a single separate fluid inlet is required for each reactant and each heat transfer media, and only a single separate fluid outlet is required for the product and for the spent heat transfer media.

It should be noted that to enable a chemical plant to scale production up or down by adding or removing reactor stacks, careful attention needs to be paid to the dimensions of the fluid paths defined by the openings in the simple plates making up each reaction unit. The sizes of the openings in each simple plate, particularly the openings enabling reactants and product to bypass the reaction and mixing channels of individual reactant units, must be large enough to support the volume of flow required in the largest anticipated chemical plant. Preferably, the sizes of the openings are selected to support a useful minimum and maximum throughput. It is anticipated that openings optimized for a flow rate of "X" will be useful for flow rates of 0.1X as well as 10X. Thus, "X" should be selected to support the anticipated minimum and maximum production rates.

In other embodiments, the dimensions of individual fluid channels within a reaction unit are manipulated to enable a product having a substantially different viscosity to be processed in parallel fluid channels with substantially equivalent residence time distributions. This is accomplished in one embodiment using bifurcated fluid channels with the reactor, and in another embodiment by manipulating the dimensions of parallel openings on a the same simple plate to achieve equipartition of flow.

For increasing the quantity of a chemical to be produced by using microreactors, external parallelization can be employed (as illustrated in FIGS. 1A-1E, and FIG. 2). Externally parallelized reactors utilize external fluid lines to connect a plurality of individual reactors. To achieve flow equipartition in externally parallelized systems, manifolds, valves and control devices for each reactor can be employed (an active network). If a passive network employs a common feed, the use of a bifurcational approach provides functional systems, but such bifurcation suffers from a major disadvantage— scaling must be effected in multiples of two ($2^n$=>2, 4, 8, 16, 32, etc.). The concentric feed assemblies of FIGS. 3B and 3C do not suffer from such a drawback (i.e. scaling does not need to be effected in multiples of two).

A key concept in the internally parallelized chemical production plant is increasing the quantity of product a single reactor (or a single reactor stack or reactor plant) can produce. Clearly, if the individual reactors of FIGS. 1A-1E and FIG. 2 were replaced by parallel chemical plants as indicated in FIG. 13A, the quantity of product produced per unit time could be increased. Chemical plant 1301 of FIG. 13A includes a plurality of reversibly connected reactor stacks 1303. While three such reactor stacks are illustrated in FIG. 13A, it should be understood that either fewer or more stacks could be used in chemical plant 1301 to control the production rate. It is anticipated that up to about 100 such stacks could be included in a single chemical plant. Note that even 100 reactor stacks would not occupy a very large volume, because the smallest unit, a single simple plate, is generally less than one square foot in size. Parallel chemical production systems including a number of such chemical plants coupled in parallel as indicated in FIGS. 1A-1E and FIG. 2 are envisioned. With respect to each chemical plant, a single fluidic system 1302a is employed to provide reactants (and heat transfer media if required) and to collect product from chemical plant 1301. Chemical plant 1301 requires at least one solid bottom plate 1302c for sealing the chemical plant, as well as a top plate 1302b (with appropriate openings for fluidic system 1302a).

FIG. 13B is an enlarged view of one of the plurality of identical reactor stacks 1303 that comprise chemical plant 1301. Each reactor stack 1303 itself comprises a plurality of internally parallelized, irreversibly bonded reaction units 1305. While FIG. 13B shows only four reaction units 1305, it should be understood that considerably more reaction units or fewer could be joined to form a reactor stack. It is anticipated that up to about 10 reaction units can be beneficially joined to provide a reactor stack. It must be noted that 10 reaction units per reactor stack does not necessarily represent a maximum necessitated by a technology limitation. That number relates to what is considered to be a reasonable cost per each reactor stack. It is anticipated that up to 100 reactor stacks can be reversibly joined to produce a chemical plant. Because the individual reaction units comprising a reactor stack are irreversibly joined, should a leak or blockage occur within any of the simple plates comprising the reaction units and reactor stacks, then the entire reactor stack would need to be replaced. If each reactor stack included 100 reaction units, and only one reaction unit leaked, 99 other reaction units would need to be discarded to replace the corresponding defective reactor stack. It is expected that up to about 10 reaction units per reactor stack represents a reasonable balance between convenience and economy. Each reactor stack is internally parallelized, in that each reactor stack simultaneously addresses a plurality of substantially identical microscale processing elements (i.e., reaction units) using only a single separate fluid inlet and a single separate fluid outlet for each fluid type (i.e., for each different reactant, product, and heat transfer media). At a certain point, irreversibly joining a larger number of reaction units into a reactor stack is technically challenging.

FIG. 13C is an exploded view of one of the plurality of reaction units 1305 that comprise each reactor stack 1303. Each reaction unit 1305 comprises a plurality of simple plates 1307a-1307j that are irreversibly bonded together. While FIG. 13C illustrates 10 different simple plates per each reaction unit, it should be understood that more (or fewer) simple plates could be used to fabricate each reaction unit. One embodiment of a reactor stack comprising two reaction units is described in more detail below.

While each reaction unit comprises a plurality of individual simple plates, each simple plate is not identical. Generally speaking, each reaction unit is required to perform more than one process to facilitate a chemical reaction used to produce a desired product. Individual reactants need to be properly distributed in the reaction unit, and in most cases heat transfer media must be routed through the reaction unit to thermally condition the reactants and/or the product. These processes are enabled by the use of simple plates having different configurations. For each reaction unit, the desired chemical reaction substantially occurs in openings defined on a single simple plate. Each reaction unit is internally parallelized, in that each reaction unit includes means simultaneously addressing a plurality of substantially identical microscale processing elements using only a single separate fluid inlet and a single separate fluid outlet for each fluid type (i.e., each reactant, product, and heat transfer media). The plurality of substantially identical microscale processing elements is a set of reaction fluid channels defined by openings in one of the simple plates of the reaction stack. FIG. 13D illustrates an enlarged view of a simple plate 1307h, which has a plurality of openings, including a parallel array of openings 1309 that define reaction channels in which reactants are mixed to generate the desired chemical product.

Because multiple reaction units are joined together, reactants, product, and heat transfer media must be able to flow from one reaction unit to another. Each reaction unit must therefore include a bypass that enables reactants to pass, unmixed, from one reaction unit to a subsequent reaction unit. While product and heat transfer media can mix as they pass from one reaction unit to a next, the reactants cannot be mixed together until they are in the reaction channels designed to facilitate the desired chemical reaction. Thus, each simple plate in the reaction unit must include openings that define a bypass for each reactant. These bypass openings are discussed in greater detail below.

Bonding between the various elements in a chemical plant is quite important. Leaks can allow contaminants to enter, product to be lost, and the idealized equipartition of fluid flow within the chemical plant to be disrupted. Under ideal circumstances, from a leak prevention standpoint, all components would be irreversibly bonded together, but such a configuration is not practical. For example, if each reaction unit is fabricated from 10 simple plates, 10 reaction units are joined to generate a reactor stack, and 100 reactor stacks are joined together to produce a chemical plant, that chemical plant will include 10,000 simple plates. If a leak occurs in any one of those approximately 10,000 joints between adjacent simple plates, the performance of the chemical plant will be compromised. Not only is it uneconomical to replace a 10,000 plate chemical plant because one or more joints leak, it is also very difficult to irreversibly join that many plates together at one time. The component architecture of a chemical plant in accord with the present invention (reaction units and reactor stacks) enables irreversible bonds to be produced in smaller lots. First, a plurality of identical reaction units are prepared, each including a relatively small number (e.g., 2-20) of simple plates that are irreversibly joined together. Then, a relatively small number (e.g., 2-10) of reaction units are irreversibly joined to generate a reactor stack. Finally, as many reactor stacks as desired are reversibly joined to produce a chemical plant. Each reactor stack comprises irreversibly joined elements. Should a leak in the chemical plant occur, the chemical plant can readily be disassembled, and the faulty reactor stack replaced; the entire chemical plant need not be replaced.

The main advantages of such an internally parallelized chemical plant (and of each internally parallelized reactor stack, and each internally parallelized reaction unit) are summarized as follows:

Parallelization is achieved with no additional external fluidic periphery. Only one fluid line is required for each reactant, the product, and any heat transfer media, thereby saving a significant amount of space.

Desirable equipartition of flow can be achieved without requiring valves, measurement devices and/or engineering controls. Such equipartition of flow is achieved by the design of the openings in the simple plates comprising each reaction unit. The dimensions of the reactant supply channels and the product withdrawal channel are preferably much larger compared to the dimensions of the distribution, mixing, reaction and collection channels in which the desired product is produced. Thus, the flow resistance in the mixing and reaction channels is negligible.

Even should an individual reaction unit experience a blockage, equipartition of flow in the reactor stack (and chemical plant) is substantially maintained, since all other reaction units are affected in the same way.

Compared to externally parallelized reactors, the number of plates necessary to form a reaction unit is reduced, because no reaction unit (or reactor stack) needs either a top plate or a bottom plate, since the only top and bottom plates needed are those utilized for the chemical plant top and bottom plates, whereas each externally parallelized reactor requires separate top and bottom plates.

Reversibly fixed reactor stacks provide flexibility, enabling a chemical plant to be readily scaled up or down and enabling simple replacement of leaking or damaged reactor stacks.

An exemplary chemical plant includes a stacked simple plate reactor that is specifically adapted to enable n-fold internal parallelization to be achieved simply by adding additional sets of simple plates to the stacked plate reactor. The chemical plant described in detail below is much smaller than the maximum size that chemical plants configured in accord with the present invention can be. In addition, this chemical plant includes only a single reactor stack, which itself includes only two reaction units. As discussed above, production can be significantly increased by adding additional reaction units to the reactor stack, as well as by adding additional identical reactor stacks.

Referring now to FIG. 14A, a 2-fold internally parallelized chemical plant is shown that incorporates a single reactor stack comprising two reaction units. FIG. 14A illustrate layers 1-24 in an exploded view, corresponding to simple plates 1410-1640. The illustrated chemical plant includes these 24 simple plates, stacked one on top of another, in 24 layers. Note that the number of simple plates is a function of the number of parallel reaction units desired. If more product is desired, then the chemical plant will include additional simple plates, arranged as duplicate reaction units and/or as duplicate reactor stacks. As will be described in more detail below, each reaction unit in this example comprises 10 simple plates, with an additional simple plate added to the chemical plant immediately adjacent to the last reaction unit, to provide an additional heat exchanger so that mixing and reaction channels in the last reaction unit can be sandwiched between heat exchangers. Also, the reaction unit design described below requires a distributor plate to be included immediately adjacent to the top or bottom plate where the reactant fluids first enter the chemical plant, to ensure that the fluids are properly distributed into each reactor stack. Thus, for a chemical plant having 4-fold internal parallelization, 44 simple plates (having the required configurations) would be required (including 40 plates for 4-fold parallelization, a top plate, a distributor plate, a final heat exchanger plate, and a bottom plate). A reactor stack included in a chemical plant does not need the top plate, the distributor plate, the final heat exchanger plate or the bottom plate, so that a reactor stack having 10-fold internal parallelization would require 100 simple plates (arranged in groups of 10 reaction units). FIG. 14A also indicates the fluid paths of a heat transfer medium to each heat exchanger within the 2-fold internally parallelized chemical plant.

In this embodiment, two reaction units are included, yielding a 2-n fold reactor. Additional reaction units could be added. For example, a first plate of the additional reaction unit can be added immediately subsequent to simple plate 1620, and a last plate of any final reaction unit disposed immediately preceding simple plate 1630. As discussed above, any subsequent reaction unit will include 10 simple plates, of the same configurations and in the same order as simple plates 1430-1520 (or simple plates 1530-1620). Of course, if additional reaction units are added, openings 1412 and 1414 will be required to allow reactants to bypass the second reaction unit and to be delivered to a subsequent reaction unit. Any final reaction unit, disposed immediately preceding the final heat exchanger plate (see simple plate 1630) and bottom plate 1640 can include openings as optional features, rather than required elements. Also as noted above, if openings 1412 and 1414 are eliminated, more configurations of the simple plates will be required. From a fabrication cost consideration, fewer configurations of simple plates is preferred. If for a particular reaction, there is a concern that either the dead volume or plugs are undesirable, then the extra fabrication steps and concomitant cost required to produce the added plate configurations is acceptable. Keeping all reaction units identical (i.e., having openings 1412 and 1414 in all reaction units) is preferable, particularly when a chemical plant includes many reaction units, arranged in reactor stacks as described with respect to FIGS. 13A-13C.

Note that in the exploded isometric view of FIG. 14A, simple plates 1410-1640 are shown stacked in order so that the relative positions of each simple plate to each other is evident. Note that simple plates 1430-1520 define the first reaction unit, and that simple plates 1530-1620 define the second reaction unit. If additional reaction units are desired to increase the rate of product production, then additional 10-layer reaction units can be included (each additional reaction unit comprising duplicates of simple plates 1530-1620, in the same order and corresponding configurations). As explained above, reaction units are preferably irreversibly bonded in groups of up to 10 reaction units, thereby generating a reactor stack. Therefore, plates 1430-1620 are preferably irreversibly joined to form a reactor stack that includes two reaction units. Any chemical plant corresponding to the 2-fold internally parallelized chemical plant described above includes a distributor plate (see simple plate 1420) and a final heat exchanger plate (see simple plate 1630). While irreversible bonding is generally preferred, it is not critical that distributor plate or the final heat exchanger plate be irreversibly bonded to the top and bottom simple plates. A preferred dimensional thickness of the simple plates is as follows:

| | |
|---|---|
| Top simple plate 1410: | 3.0 mm. |
| Simple plates 1420-1630: | 0.3 mm. |
| Bottom simple plate 1640: | 3.0 mm |

Simple plates 1410 and 1640 (the top and bottom simple plates) are thicker than the other simple plates to provide greater structural stability. Simple plates 1420-1630 are thinner than the top and bottom simple plates to enhance mixing and heat transfer. A thickness of 0.3 mm provides a reasonable heat transfer ability for a wide variety of materials. It should be noted that if desired, some of simple plates 1420-1630 can be made thicker, to increase a volume of a fluid channel defined by an opening in that simple plate. For example, simple plates 1430, 1490, 1530, 1590, and 1630 include a plurality of elongate openings disposed in a longitudinal parallel array. Those openings define heat exchangers. To provide a larger volume of fluid in any of those heat exchangers, the respective simple plate can be made thicker. It should be noted that the preferred plate thicknesses correspond to sheet metal thicknesses that are commercially available, and that the ready availability of such materials lowers production costs of the reactor.

For simple plates that include solid portions used to transfer thermal energy to or from heat exchangers, a preferred thickness is about 0.3 mm. As plate thickness increases, mechanical rigidity and stability increases, mixing and heat transfer efficiency decreases. The 0.3 mm thickness provides a good trade off between heat transfer characteristics and pressure drop demands, without sacrificing mechanical stability. It should be noted however, that it has been empirically determined that simple plates defining openings that only conduct fluids in an orthogonal direction relative to a fluid flow in an adjacent simple plate, can be thinner, preferably 0.1 mm.

While not specifically shown in FIG. 14A, the fluid flow path of Reactant A can be summarized as follows. Reactant A enters top simple plate 1410 and proceeds through the tenth simple plate 1500. Reactant A enters through opening 1414 in top simple plate 1410, passes through simple plates 1420 and 1430 of the second and third layers via openings 1414, and enters Reactant A manifold defined by opening 1444 on simple plate 1440 of the fourth layer. Reactant A then flows to simple plate 1450 of the fifth layer and enters Reactant A distributor defined by a plurality of parallel openings 1454. In layers six through ten (simple plates 1460-1500), Reactant A passes through each plate via the plurality of openings 1464. At this point, Reactant A is properly disposed to be laminated with Reactant B. As discussed above, the purpose of the distributors for Reactants A and B is to precisely align the fluid flows for Reactants A and B to optimize mixing in subsequent layers of the reactor. The purpose of Reactant A openings 1464 is to precisely align a plurality of Reactant A fluid paths with a plurality of Reactant B fluid paths, so that a stacked laminar flow can be achieved with equilibrated pressure drops. It should be noted that heat exchangers provided in simple plates 1430 and 1490 are used to bring both Reactants A and B to the proper temperature before they are mixed.

Again, while not specifically shown in FIG. 14A, the fluid flow path of Reactant B can be summarized as follows. Reactant B enters top simple plate 1410 through opening 1412, and then passes through the second-fifth layers via identical Reactant B openings 1412 in simple plates 1420-1450. In the sixth layer, Reactant B enters the Reactant B manifold defined by opening 1462 in simple plate 1460. Reactant B then flows to simple plate 1470 of the seventh layer and enters the Reactant B thermal preconditioning channels defined by the plurality of parallel openings 1472. In layers eight through ten (simple plates 1480-1500), Reactant B passes through each plate via the plurality of openings 1482. At this point, Reactant B is properly disposed to enable laminated flow to be established when combined with Reactant A.

The combined flows of Reactants A and B after passing through the tenth layer and proceeding through layers 1510-1520 of the 2-fold internally parallelized chemical plant can be summarized as follows. Reactants A and B are combined (in a stacked laminar flow pattern) in the plurality of parallel fluid channels defined on simple plate 1510 by the plurality of opening 1512. It is in these mixing and reaction channels (defined by openings 1512) that lamination of Reactants A and B is achieved, resulting in rapid diffusion mixing and a desired chemical reaction between Reactants A and B. The heat exchangers defined by openings in simple plates 1490 and 1530 are used to control the temperature of the reactants as they mix and react in the mixing and reaction channels (defined by openings 1512). After Reactants A and B become thoroughly mixed in simple plate 1510, the now mixed Reactants A and B flow into a collection channel defined by opening 1518 in simple plate 1520. Opening 1518 includes an enlarged section that aligns with product opening 1418 on simple plate 1510. The mixed reactants/product then flow back up the reactor, through aligned product openings 1418 in simple plates 1420-1500, and the product exits the reactor via opening 1418 in top simple plate 1410. If the combination of the mixing and reaction channels defined by openings 1412 on simple plate 1510 and the fluid channel defined by aligned openings 1418 in simple plates 1410-1510 do not provide sufficient residence time for the reaction to reach completion, then an additional residence time channel can be added downstream of the product outlet of the chemical plant.

Note that the fluid flows described above are for the first reactor portion (generally plates 1430-1520) of the 2-fold internally parallelized chemical plant. The fluid flows are duplicated in the second reactor portion (generally plates 1530-1620) of the 2-fold internally parallelized chemical plant. Fluid flow for Reactant A alone in the second reactor portion is duplicated in plates 1540-1600, while fluid flow for Reactant B alone in the second reactor portion is duplicated in plates 1560-1600. The fluid flow for the combined Reactants is duplicated in plates 1610-1620. This second reactor portion is feed with Reactants A and B via the overlapping openings 1412 and 1414.

FIG. 14A does specifically illustrate the fluid paths for the heat transfer medium throughout the exemplary 2-fold internally parallelized chemical plant. Note that heat exchangers in the preferred reactor are defined by openings in simple plates 1430, 1490, 1530, 1590, and 1630. These heat exchangers thermally condition each Reactant as it enters a reaction unit, as well as thermally conditioning the mixed reactants in the mixing and reaction channels of each reaction unit. It should be noted that the flow of the heat transfer fluid through the heat exchanges is always orthogonal to a flow of reactant or mixed reactants/product.

Freshly conditioned heat transfer medium enters the 2-fold internally parallelized chemical plant via opening 1415 in top simple plate 1410, and spent heat transfer medium exits the 2-fold internally parallelized chemical plant via opening 1416 in top simple plate 1410. After entering the 2-fold internally parallelized chemical plant, the heat transfer medium flows through a manifold defined by opening 1425 in simple plate 1420. Next, the heat transfer medium enters a first heat exchanger defined by openings 1435 in simple plate 1430. Note that the first heat exchanger thermally conditions that portion of Reactant A that enters the first reaction unit (see openings 1454 in simple plate 1450). A second portion of Reactant A continues through aligned openings 1412 and is not yet thermally conditioned. That portion of the flow of Reactant A will service the second reaction unit, and will be thermally conditioned as the flow enters the second (or subsequent) reaction unit.

The flow of heat transfer medium actually splits at simple plate 1430. Some heat transfer medium enters the heat exchanger defined by openings 1435. That portion then flows up out of the reactor, passing through a heat transfer medium manifold defined by opening 1426 in simple plate 1420, and then exits the reactor via opening 1416 in top simple plate 1410.

A second portion of heat transfer medium continues to flow down into the 2-fold internally parallelized chemical plant via the overlap of openings 1435 in simple plate 1430 and opening 1425 in simple plate 1440. As noted above, openings 1425 define heat transfer medium manifolds, and aligned openings 1425 in simple plates 1440-1480 direct the flow of heat transfer medium through the reactor to service a second heat exchanger defined by openings 1495 in simple plate 1490. The second heat exchanger thermally conditions the portion of Reactant B that enters the first reaction unit (see openings 1472 in simple plate 1470), as well as the mixed reactants/product flowing through mixing and reaction channels defined by openings 1512 on simple plate 1510. The heat transfer medium flowing through the second heat exchanger exits the reactor through aligned openings 1426 in simple plates 1480, 1470, 1460, 1450, and 1440. Simple plate 1430 includes the first heat exchanger, and a portion of the first heat exchanger overlaps opening 1426 in simple plate 1440, enabling the heat transfer medium from the second heat exchanger to pass through the this overlapping portion, and then exit the reactor, as described above.

The flow of heat transfer medium again splits at simple plate 1490. Some heat transfer medium enters the heat exchanger defined by openings 1495. That portion then flows out of the 2-fold internally parallelized chemical plant, as described above. A second portion of the heat transfer medium continues to flow down into the 2-fold internally parallelized chemical plant, via the overlap of openings 1495 in simple plate 1490 and opening 1425 in simple plate 1500. Aligned openings 1425 in simple plates 1500-1520 direct the heat transfer medium through the reactor to service a third heat exchanger defined by openings 1535 in simple plate 1530. The third heat exchanger thermally conditions mixed reactants/product flowing through mixing and reaction channels defined by openings 1512 on simple plate 1510. Because temperature control is critical to achieving quality reaction products, mixing and reaction channels defined by openings 1512 on simple plate 1510 are sandwiched between the second and third heat exchanger to maximize thermal control. The third heat exchanger also thermally conditions that portion of Reactant A that enters the second reaction unit (through openings 1554 in simple plate 1550).

The heat transfer medium flowing through the third heat exchanger exits the 2-fold internally parallelized chemical plant by flowing upwards through aligned openings 1426 in simple plates 1520, 1510, and 1500. The heat transfer medium from the third heat exchanger merges with the heat transfer medium from with the second heat exchanger in simple plate 1490, to exit the 2-fold internally parallelized chemical plant as described above.

Also as described above, the flow of heat transfer medium once again splits at simple plate 1530. Some heat transfer medium enters the heat exchanger defined by openings 1535. That portion of the heat transfer medium then flows up and out of the 2-fold internally parallelized chemical plant as described above. Another portion of the heat transfer medium continues to flow down into the 2-fold internally parallelized chemical plant, via the overlap of openings 1535 in simple plate 1530 and opening 1425 in simple plate 1540. Aligned openings 1425 in simple plates 1540-1580 direct the heat transfer medium through the reactor to service a fourth heat exchanger defined by openings 1595 in simple plate 1590. The fourth heat exchanger thermally conditions mixed reactants/product flowing through mixing and reaction channels defined by openings 1612 on simple plate 1610, as well as the portion of Reactant B that enters the second reaction unit (through openings 1572 in simple plate 1570).

The heat transfer medium flowing through the fourth heat exchanger exits the 2-fold internally parallelized chemical plant by flowing upwards through aligned openings 1426 in simple plates 1580, 1570, 1560, 1550, and 1540. The heat transfer medium from the fourth heat exchanger merges with the heat transfer medium from the third heat exchanger in simple plate 1530, to exit the 2-fold internally parallelized chemical plant as described above.

Once again, the flow of heat transfer medium splits at simple plate 1590, such that some heat transfer medium enters the fourth heat exchanger defined by openings 1595, and a still further portion of the heat transfer medium continues to flow down into the 2-fold internally parallelized chemical plant, via the overlap of openings 1595 in simple plate 1590 and opening 1425 in simple plate 1600. Aligned openings 1425 in simple plates 1600-1620 direct the heat transfer medium through the 2-fold internally parallelized chemical plant to service a fifth heat exchanger defined by openings 1635 in simple plate 1630. Note that the fifth heat exchanger is the final heat exchanger noted above. The fifth heat exchanger thermally conditions mixed reactants/product flowing through mixing and reaction channels defined by openings 1612 on simple plate 1610, thus sandwiching the reaction channels of the second reaction unit between an upper heat exchanger in simple plate 1590 and a lower heat exchanger in simple plate 1630. The heat transfer medium flowing through the fifth heat exchanger exits the reactor by flowing upward through aligned openings 1426 in simple plates 1620, 1610, and 1600. The heat transfer medium from the fifth heat exchanger merges with the heat transfer medium from the heat exchanger in simple plates 1590, 1530, 1490, and 1430, and exits the reactor as described above.

Because no additional reaction units are present, the heat transfer medium does not continuing flowing downward (bottom plate 1640 is immediately below the fifth heat exchanger). However, if an additional reaction unit were added to the reactor (enabling 3-fold internal parallelization), that reaction unit would be incorporated preceding the final heat exchanger, so the final heat exchanger would thermally condition the mixing and reaction channels of the last reaction unit added.

When a heat exchanger in the reactor "thermally conditions a fluid," it should be understood that the heat exchanger is actually enabling heat transfer through a solid section of a simple plate that is disposed between the simple plate that contains an opening defining the heat exchanger and the simple plate containing an opening that defines a fluid channel in which the fluid to be thermally conditioned flows. For example, heat transfer occurs between the heat transfer medium flowing through the first heat exchanger defined by openings 1435 in simple plate 1430 and Reactant A that is flowing in fluid channel defined by openings 1454 in simple plate 1450. The heat transfer is through the solid portions of simple plate 1440 that overlie openings 1435 in simple plate 1430. Generally the heat transfer medium used in the reactor will be a liquid, although it is envisioned that liquid/gas-mixtures, fluid/solid mixtures as well as selected gases may also be beneficially employed.

FIG. 14B illustrates how plugs 1641 and 1642 are inserted through bottom simple plate 1640 to fill openings 1412 and 1414 when they are not needed to divert a flow of Reactant A and B to any subsequent reaction unit. Plugging these openings eliminates a dead volume, and enables identical simple plates to be used for both the first and second reaction units. As noted above, if unnecessary openings 1412 and 1414 from the second reaction unit are eliminated, additional configurations of simple plates will be required, complicating the fabrication process. Plug 1641 fills unneeded openings 1414 in simple plates 1550-1640, while plug 1642 fills unneeded openings 1412 in simple plates 1570-1640. Note that because FIG. 14B is an exploded isometric view, plugs 1641 and 1642 are shown greatly exaggerated in length. In reality, the length of each plug will be equal to the total thickness of the simple plates in which the plug is used to seal openings. Thus, plug 1641 is only as long as the total thicknesses of simple plates 1550-1640, while plug 1642 will be slightly shorter, being as long as the total thicknesses of simple plates 1570-1640. When plugs 1641 and 1642 are employed, an n-fold internally parallelized chemical plant reactor can be assembled from simple plates of 12 different configurations, as follows:

| | |
|---|---|
| Configuration #1 | Simple plate 1410; |
| Configuration #2 | Simple plate 1420; |
| Configuration #3 | Simple plates 1430, 1530 and 1630; |
| Configuration #4 | Simple plates 1440 and 1540; |
| Configuration #5 | Simple plates 1450 and 1550; |
| Configuration #6 | Simple plates 1460 and 1560; |
| Configuration #7 | Simple plates 1470 and 1470; |
| Configuration #8 | Simple plates 1480, 1500, 1580 and 1600; |
| Configuration #9 | Simple plates 1490 and 1590; |
| Configuration #10 | Simple plates 1510 and 1610; |
| Configuration #11 | Simple plates 1520 and 1620; and |
| Configuration #12 | Simple plate 1640. |

Additional reaction units can be added by incorporating duplicates of simple plates 1430-1520. It should also be noted that if additional plugs are used, having a size and shape corresponding to openings 1415, 1416, and 1418 in top simple plate 1410, then a duplicate of top simple plate 1410 can be used for bottom simple plate 1640, reducing by one the number of different configurations of simple plates required to

| | |
|---|---|
| Configuration #9 | Simple plates 1490 and 1590; and |
| Configuration #10 | Simple plates 1510 and 1610; |

Finally, the configurations of simple plates 1450 and 1550 (Configuration #5) are very similar to the configurations of simple plates 1510 and 1610 (Configuration #11). The mixing and reaction channels in simple plates 1510 and 1610 (defined by openings 1512) are oriented and positioned identically to Reactant A distributor fluid channels in simple plates 1450 and 1550 (defined by openings 1554); however, the mixing and reaction channels are approximately 5 percent longer. This difference is due to the offset between the Reactant A manifolds of simple plate 1440 and 1540 (defined by openings 1444) and the product collection channels of simple plates 1520 and 1620 (defined by openings 1518). To further reduce the number of different configurations of simple plates required, the configuration of simple plates 1510 and 1610 could be used for simple plates 1450 and 1550. This would generate additional volume in the Reactant A thermal preconditioning channels which would mean that the volumes of the Reactant A distributor fluid channels and the Reactant B distributor fluid channels (defined by openings 1472 on simple plates 1470 and 1570) are not the same. Such differences in volume will affect the residence time distribution of Reactants A and B within each reaction unit, and will also result in different pressure drops between the reactants. Because this difference would result in less than ideal mixing dynamics, this embodiment is generally less preferred, as such a difference is likely to have a measurable effect on product quality (unless reducing the number of different configurations of plates is more important than product quality). Depending on the reaction in question, the effect may or may not be acceptable. If employed, this substitution (combined with the other substitutions suggested above) would require simple plates with only 9 different configurations, as follows:

| | |
|---|---|
| Configuration #1 | Simple plate 1410 and bottom plate 1640; |
| Configuration #2 | Simple plates 1420, 1520 and 1620; |
| Configuration #3 | Simple plates 1430, 1530 and 1630; |
| Configuration #4 | Simple plates 1440 and 1540; |
| Configuration #5 | Simple plates 1450, 1510, 1550 and 1610; |
| Configuration #6 | Simple plates 1460 and 1560; |
| Configuration #7 | Simple plates 1470 and 1570; |
| Configuration #8 | Simple plates 1480, 1500, 1580 and 1600; and |
| Configuration #9 | Simple plates 1490 and 1590. |

An additional alternative would use the configuration of simple plates 1450 and 1550 for the mixing and reaction channels of simple plates 1510 and 1610, so that Reactant A thermal preconditioning channels and Reactant B thermal preconditioning channels would be of substantially the same length, but the mixing and reaction channels would have slightly less volume. Such an alternative is likely to have little impact on product quality. Note that if this change is made, the shape and position of the product collection channels of simple plates 1520 and 1620 (defined by openings 1518) would need to be modified to extend more toward the center of each simple plate so as to overlap openings 1454/1554 (see simple plates 1450 and 1550). In this case, openings 1518 would be disposed similarly to openings 1444/1544 of simple plates 1440 and 1540, but with an extension enabling openings 1518 to overlap openings 1418 of the adjacent simple plates.

As discussed above, the simple plates of each reaction unit are preferably irreversibly bonded together to achieve a pressure tight fit, so that the resulting stacked plate reactor is free from leaks. While theoretically, n-fold internal parallelization can be achieved with any reasonable number of reaction units, it is likely that attempting to bond too many simple plates together will be challenging. A working 2-fold internally parallelized chemical plant (having 24 plates as described above) has been fabricated and successfully operated. It is anticipated that a 1000-fold internally parallelized chemical plant is readily achievable. To facilitate the production of such scaled up chemical plants, up to 10 irreversibly bonded reactor units will be irreversibly joined to generate reactor stacks, up to 100 of which can then be reversibly joined to produce the desired 1000-fold internally parallelized chemical plant. Sealing between reactor stacks can be enhanced using conventional flat seals or O-rings. Preferably, the reactor stacks are reversibly joined, such that a reactor stack that experiences a failure (a bond failure, or clogging of the fluid channels in a specific reaction unit) can be removed from the chemical plant and replaced with a fresh reactor stack. Using a combination of reversible and non-reversible bonding in this manner, it is contemplated that the stated 1000-fold internally parallelized chemical plant can be achieved. It is believed that neither residence time nor pump capacity is a practical limit on the degree of internal parallelization that can be achieved, but internal flow equipartition between the parallelized reaction units and reactor stacks must be ensured. Note that if lower n-fold internally parallelized chemical plants are desired (i.e., n=less than 10), individual reaction units may be reversibly joined together, so that individual reaction units can be replaced in the event of a reaction unit failure.

Including parallel fluid channels in a stacked plate reactor, such as those fluid channels defined by the openings shown in simple plates 1430, 1450, 1470, 1490, 1510, 1530, 1550, 1570, 1590, 1610 and 1630 as described above, preferably is done in such a manner that flow equipartition throughout such channels is achieved. To obtain flow equipartition, two important concepts are employed. Each of these concepts are addressed in the following sections. A first concept is flow bifurcation, and a second concept involves manipulating a dimension of individual fluid channels.

In addition to reactors designed for only a specific chemical reaction, or a specific class or type of chemical reactions, it is envisioned that beneficial reactors will incorporate the ability to facilitate a plurality of different processes related to the production of a desired product from a plurality of reagents. Generally reactors will facilitate the mixing of a plurality of reagents. It should be noted however, that not all reactions require the mixing of reagents, such as reactions involving passing one or more reagents over a catalyst impregnated surface, or photochemical reactions that are initiated by the application of light of the appropriate wavelength. Preferable reactors will enable the precise temperature control of the reagents and the product, so that yield and product quality can be enhanced. Other process control parameters that can be beneficially incorporated into reactors for use in the present invention include magnetic, piezoresistive, piezoelectric, shape memory, radioactive, catalytic, optical, electromagnetic, and electrostatic control parameters. Any such control parameter is preferably capable of being controlled the system controller.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An automated continuous processing parallel chemical production system for automatically producing a desired chemical product by combining at least two reactants, the chemical production system comprising:
   (a) a plurality of chemical reactors, each chemical reactor being configured to produce a quantity of the desired chemical product, each chemical reactor comprising at least: a first reactant inlet, a second reactant inlet, a reaction volume coupled in fluid communication with the first reactant inlet and the second reactant inlet, and a product outlet coupled in fluid communication with the reaction volume;
   (b) a reactant feed apparatus including:
      (i) a first reactant feed assembly configured to be placed in fluid communication with a supply of a first reactant, and to selectively couple said first reactant inlet of each chemical reactor in fluid communication with the supply of the first reactant, so that each first reactant inlet of the plurality of chemical reactors is coupled in parallel, with the supply of the first reactant; and
      (ii) a second reactant feed assembly configured to be placed in fluid communication with a supply of a second reactant, and to selectively couple said second reactant inlet of each chemical reactor in fluid communication with the supply of the second reactant, so that each second reactant inlet of the plurality of chemical reactors is coupled in parallel, with the supply of the second reactant;
   (c) a product collection assembly configured to be placed in fluid communication with a product receiver, and to selectively couple said product outlet of each chemical reactor in fluid communication with the product receiver; and
   (d) a system controller controllably coupled with said first reactant feed assembly, said second reactant feed assembly, and said product collection assembly, the system controller monitoring and controlling production of the desired chemical product by said plurality of chemical reactors, and designating at least one of said plurality of chemical reactors as a backup reactor, such that the system controller causes:
      (i) said first reactant feed assembly to isolate said first reactant inlet of the backup reactor from the supply of the first reactant, while coupling said first reactant inlet of each other chemical reactor in parallel fluid communication with the supply of the first reactant, such that while the system is automatically producing the desired chemical product, the first reactant inlet of each reactor not designated as a backup reactor is coupled in fluid communication with the first reactant feed assembly, such that a first reactant fluid is simultaneously supplied to each reactor not designated as a backup reactor;
      (ii) said second reactant feed assembly to isolate said second reactant inlet of the backup reactor from the supply of the second reactant, while coupling said second reactant inlet of each other chemical reactor in parallel fluid communication with the supply of the second reactant, such that while the system is automatically producing the desired chemical product, the second reactant inlet of each reactor not designated as a backup reactor is coupled in fluid communication with the second reactant feed assembly, such that a second reactant fluid is simultaneously supplied to each reactor not designated as a backup reactor; and
      (iii) said product collection assembly to isolate said product outlet of the backup reactor from said product receiver, while coupling the product outlet of each other chemical reactor in fluid communication with the product receiver.

2. The automated continuous processing parallel chemical production system of claim 1, wherein each chemical reactor comprises a microreactor.

3. The automated continuous processing parallel chemical production system of claim 1, wherein each chemical reactor is configured to provide substantially identical processing conditions.

4. The automated continuous processing parallel chemical production system of claim 1, wherein each chemical reactor is substantially identical to a test reactor employed to determine preferred processing conditions for producing the desired chemical product, before the automated parallel chemical production system is employed to produce the desired chemical product.

5. The automated continuous processing parallel chemical production system of claim 1, wherein the system controller designates a different one of the plurality of chemical reactors as the backup reactor after a predefined period, the chemical reactor previously designated as the backup reactor being then coupled in fluid communication with the supply of the first reactant, the supply of the second reactant, and the product receiver, while the chemical reactor that is newly designated as the backup reactor is isolated from the supply of the first reactant, the supply of the second reactant, and the product receiver, thereby making the newly designated backup reactor available for maintenance operations, to facilitate continuous production of the desired product over extended periods of time.

6. The automated continuous processing parallel chemical production system of claim 1, wherein the product collection assembly includes a sensor for each chemical reactor, each sensor being disposed between the product outlet of the chemical reactor and the product receiver, so that an indication of the quality of the chemical product from the chemical reactor is provided to the system controller.

7. The automated continuous processing parallel chemical production system of claim 6, wherein the system controller is programmed to designate a different one of the plurality of chemical reactors as the backup reactor when one of said sensors indicates that the quality of the chemical product produced by its corresponding chemical reactor deviates from a predetermined standard, the chemical reactor that was previously designated as the backup reactor being then coupled with the supply of the first reactant, the supply of the second reactant, and the product receiver, while the newly designated backup reactor is isolated from the supply of the first reactant, the supply of the second reactant, and the product receiver, thereby making the newly designated backup reactor available for maintenance operations, to facilitate continuous production of the desired product over extended periods of time.

8. The automated continuous processing parallel chemical production system of claim 1, wherein:
    (a) said first reactant feed assembly and said second reactant feed assembly are each respectively configured to be selectively coupled in fluid communication with a first solvent supply and a second solvent supply, such that for each chemical reactor:
        (i) said first reactant feed assembly can selectively couple said first reactant inlet in fluid communication with one of the first reactant supply and the first solvent supply; and
        (ii) said second reactant feed assembly can selectively couple said second reactant inlet in fluid communication with one of the second reactant supply and the second solvent supply; and
    (b) said product collection assembly is configured to be selectively coupled in fluid communication with a waste receiver, such that for each chemical reactor, said product collection assembly can selectively couple said product outlet in fluid communication with one of the product receiver and the waste receiver, thereby enabling the backup reactor to be flushed with solvent.

9. The automated continuous processing parallel chemical production system of claim 1, further comprising a common heat exchange assembly coupled in fluid communication with each chemical reactor and a heat transfer media supply, the common heat exchange assembly providing substantially equivalent thermal conditions in each chemical reactor.

10. The automated continuous processing parallel chemical production system of claim 9, wherein the plurality of chemical reactors are arranged in a generally concentric configuration, and said common heat exchange assembly comprises a first ring-shaped fluid manifold disposed outwardly of the plurality of chemical reactors, and a second ring-shaped fluid manifold disposed inwardly of the plurality of chemical reactors, each chemical reactor being coupled in fluid communication with the first and second ring-shaped fluid manifolds.

11. The automated continuous processing parallel chemical production system of claim 10, wherein the first fluid line provides each chemical reactor with fresh heat transfer media, and the second fluid line recovers spent heat transfer media from each chemical reactor.

12. The automated continuous processing parallel chemical production system of claim 1, wherein the plurality of chemical reactors are arranged in a generally concentric configuration.

13. The automated continuous processing parallel chemical production system of claim 12, wherein:
    (a) the first reactant feed assembly comprises:
        (i) a first reactant distributor configured to couple in fluid communication with the supply of the first reactant; and
        (ii) a plurality of first reactant fluid lines configured to selectively couple said first reactant distributor to each first reactant inlet of said plurality of chemical reactors, each first reactant fluid line being configured to provide a substantially equivalent flow rate of the first reactant fluid; and
    (b) the second reactant feed assembly comprises:
        (i) a second reactant distributor configured to couple in fluid communication with the supply of the second reactant; and
        (ii) a plurality of second reactant fluid lines configured to selectively couple said second reactant distributor to each second reactant inlet of said plurality of chemical reactors, each second reactant fluid line being configured to provide a substantially equivalent flow rate of the second reactant fluid.

14. The automated continuous processing parallel chemical production system of claim 13, wherein:
    (a) each first reactant fluid line comprises a valve configured to selectively couple the first reactant inlet of each reactor in fluid communication with one of the supply of the first reactant and the first solvent supply, each valve being controllably coupled with the system controller; and
    (b) each second reactant fluid line comprises a valve configured to selectively couple the second reactant inlet of each reactor in fluid communication with one of the supply of the second reactant and the second solvent supply, each valve being controllably coupled with the system controller.

15. The automated continuous processing parallel chemical production system of claim 12, wherein said product collection assembly comprises:
    (a) a product collector configured to couple in fluid communication with the product receiver; and
    (b) a plurality of product fluid lines configured to selectively couple said product collector to each product outlet of said plurality of chemical reactors, each product fluid line being configured to provide a substantially equivalent flow rate.

16. The automated continuous processing parallel chemical production system of claim 15, wherein each product fluid line comprises a valve configured to selectively couple the product outlet of each reactor in fluid communication with one of the product receiver and the waste receiver, each valve being controllably coupled with the system controller.

17. The automated continuous processing parallel chemical production system of claim 1, further comprising a product heat exchange assembly configured to thermally condition a product discharged from each reactor outlet.

18. The automated continuous processing parallel chemical production system of claim 1, wherein the product collection assembly comprises a thermal conditioning structure configured to thermally condition a product discharged from each reactor outlet.

19. The automated continuous processing parallel chemical production system of claim 1, wherein each chemical reactor comprises a plurality of simple plates stacked together in layers, each reactor including a first inlet pathway coupled to said first reactant inlet, a second inlet pathway coupled to said second reactant inlet, each inlet pathway merging within the reactor to form at least one reaction chamber in which at least two chemical reactants react to generate a chemical product, at least one outlet pathway coupling said at least one reaction chamber in fluid communication with said product outlet, and wherein each first reactant inlet, first reactant pathway, second reactant inlet, second reactant pathway, reaction chamber, and product outlet comprises an opening through at least one simple plate aligned with at least a portion of an opening through an adjacent simple plate.

20. The automated continuous processing parallel chemical production system of claim 1, wherein each chemical reactor comprises a plurality of simple plates, stacked in layers, each simple plate having at least one opening that extends therethrough, an opening in each simple plate overlapping at least one other opening in an adjacent simple plate, said simple plates, when thus stacked in layers, defining:
  (a) a fluid path for the first and second reactants;
  (b) a fluid path for the desired chemical product;
  (c) a fluid path for a heat transfer medium;
  (d) a heat exchanger coupled in fluid communication with the fluid path for the heat transfer medium; and
  (e) means for manipulating a flow of fluid in said stacked plate reactor to achieve a desired result.

21. The automated continuous processing parallel chemical production system of claim 1, wherein each chemical reactor comprises a plurality of simple plates, stacked in layers, each simple plate having at least one opening that extends therethrough, an opening in each simple plate overlapping at least one other opening in an adjacent simple plate, thereby forming:
  (a) a fluid path for the first and second reactants;
  (b) a processing volume in fluid communication with each fluid path for the first and second reactants;
  (c) a fluid path for the desired chemical product in fluid communication with the processing volume;
  (d) a fluid path for a heat transfer medium;
  (e) a heat exchanger in fluid communication with the fluid path for the heat transfer medium and disposed so as to moderate a temperature of at least one of the first reactant, the second reactant, the processing volume, and the fluid path for the desired chemical product; and
  (f) means for enhancing at least one of:
    (i) a quantity of the desired chemical product that is produced by said stacked plate reactor per unit time; and
    (ii) a quality of the desired chemical product that is produced by said stacked plate reactor.

22. The automated continuous processing parallel chemical production system of claim 1, wherein the plurality of reactors and the reactant feed apparatus are configured as a first stage, and further comprising a plurality of additional chemical reactors, the plurality of additional chemical reactors and the product collection assembly being configured as a second stage, such that:
  (a) a number of the additional chemical reactors in the second stage is equal to a number of the plurality of reactors in the first stage;
  (b) each additional chemical reactor in the second stage includes at least an inlet and a second stage product outlet;
  (c) each product outlet of each chemical reactor in the first stage is coupled to the inlet of one of the additional chemical reactors in the second stage, such that each additional chemical reactor in the second stage is coupled with only one chemical reactor in the first stage; and
  (d) each second stage product outlet of each additional chemical reactor in the second stage is coupled to the product collection assembly, to selectively couple the product outlet of each additional chemical reactor in the second stage in fluid communication with the product receiver; and wherein instead of isolating the product outlet of the backup reactor in the first stage from the product receiver, while coupling the product outlet of each other chemical reactor in the first stage in fluid communication with the product receiver, the system controller causes the product collection assembly to isolate the second stage product outlet of the additional chemical reactor in the second stage whose inlet is coupled to the outlet of the backup reactor in the first stage, from the product receiver, while coupling the second stage product outlet of each other additional chemical reactor in the second stage in fluid communication with the product receiver.

23. The automated continuous processing parallel chemical production system of claim 1, wherein the plurality of reactors and the reactant feed apparatus are configured as a first stage, and further comprising:
  (a) a plurality of additional chemical reactors, such that:
    (i) the plurality of additional chemical reactors and the product collection assembly are configured as a second stage;
    (ii) a number of the additional chemical reactors in the second stage is equal to a number of the plurality of reactors in the first stage; and
    (iii) each additional chemical reactor in the second stage includes at least an inlet and a second stage product outlet, each second stage product outlet being coupled to the product collection assembly, to selectively couple the product outlet of each additional chemical reactor in the second stage in fluid communication with the product receiver;
  (b) a valve system disposed in fluid communication with each outlet of the plurality of chemical reactors in the first stage, and each inlet of the plurality of additional chemical reactors in the second stage, the valve system being controllably connected to the system controller, the valve system selectively coupling the product outlet of a selected chemical reactor in the first stage to the inlet of a selected additional chemical reactor in the second stage under the control of the system controller; and
  wherein instead of isolating the product outlet of the backup reactor in the first stage from the product receiver, while coupling the product outlet of each other chemical reactor in the first stage in fluid communication with the product receiver, the system controller causes the product collection assembly to isolate the second stage product outlet of the additional chemical reactor in the second stage whose inlet is selectively coupled to the outlet of the backup reactor in the first stage from the product receiver.

24. The automated continuous processing parallel chemical production system of claim 1, wherein the plurality of reactors, the reactant feed apparatus and the product collection assembly are configured as a first stage, and further comprising a second stage, the second stage including:
  (a) a plurality of additional chemical reactors, each additional chemical reactor in the second stage including at least: an inlet, and a second stage product outlet; and (b) a second stage feed assembly configured to be placed in fluid communication with the product receiver, and to selectively couple the inlet of each additional chemical reactor in fluid communication with the product receiver, so that each additional chemical reactor is coupled in parallel with the product receiver; the second stage feed assembly being controllably connected to the system controller; wherein the system controller designates at least one of the additional reactors in the second stage as a backup reactor, and causes the second stage feed assembly to isolate the inlet of each additional chemical reactor in the second stage designated as the backup reactor from the product receiver.

25. The automated continuous processing parallel chemical production system of claim 1, wherein:
(a) the plurality of reactors and the reactant feed apparatus are configured as a first stage, and further comprising a plurality of additional chemical reactors, the plurality of additional chemical reactors being configured as at least one additional stage, such that:
(i) a number of the additional chemical reactors in each additional stage is equal to a number of the plurality of reactors in the first stage, and each additional chemical reactor includes at least an inlet and a product outlet;
(ii) the inlet of each additional chemical reactor in each additional stage is coupled in fluid communication with one of the product outlet of a corresponding chemical reactor in the first stage and the product outlet of a corresponding chemical reactor in a preceding additional stage; and
(iii) the outlet of each additional chemical reactor in each additional stage is coupled in fluid communication with one of the inlet of a corresponding chemical reactor in a subsequent additional stage, and the product collection assembly; and
(b) the system controller designates a corresponding number of additional chemical reactors in each additional stage as backup reactors, ensures the product outlet of each additional chemical reactor designated as backup reactor is isolated from the product receiver, and ensures the product outlet of each additional chemical not designated as a backup reactor is coupled in fluid communication with the product receiver.

26. A concentrically parallel chemical production system for producing a desired chemical product by combining at least two reactants, the chemical production system comprising:
(a) a first stage including:
(i) a plurality of chemical reactors, each chemical reactor being configured to produce a quantity of the desired chemical product, each chemical reactor of the plurality of chemical reactors having at least: a first reactant inlet, a second reactant inlet, a reaction volume coupled in fluid communication with the first reactant inlet and the second reactant inlet, and a product outlet, the plurality of chemical reactors being arranged in a generally concentric configuration, such that each reactor comprises an inner end and an outer end, each inner end being disposed relatively closer to a center of a circle defined by the plurality of chemical reactors than each outer end, the first reactant inlet and the second reactant inlet for each chemical reactor being disposed proximate the inner end of that reactor;
(ii) a reactant feed apparatus including:
(1) a first reactant feed assembly configured to be placed in fluid communication with a supply of a first reactant, and to couple said first reactant inlet of each chemical reactor in parallel fluid communication with the supply of the first reactant; and
(2) a second reactant feed assembly configured to be placed in fluid communication with a supply of a second reactant, and to couple said second reactant inlet of each chemical reactor in parallel fluid communication with the supply of the second reactant; and
(iii) a product collection assembly configured to be placed in fluid communication with a product receiver, and to couple said product outlet of each chemical reactor in fluid communication with the product receiver; and
(b) a second stage including:
(i) a plurality of additional chemical reactors, each additional chemical reactor in the second stage including at least an inlet and a second stage product outlet; and
(ii) a second stage feed assembly configured to be placed in fluid communication with the product receiver, and to selectively couple the inlet of each additional chemical reactor in fluid communication with the product receiver, so that each additional chemical reactor is coupled in parallel with the product receiver, to enable the product collected from the first stage to be introduced as a reactant in the second stage.

27. The concentrically parallel chemical production system of claim 26, wherein:
(a) the first reactant feed assembly comprises:
(i) a first reactant distributor configured to couple in fluid communication with the supply of the first reactant; and
(ii) a plurality of first reactant fluid lines configured to selectively couple said first reactant distributor to each first reactant inlet of said plurality of chemical reactors, each first reactant fluid line being configured to provide a substantially equivalent flow rate, each first reactant fluid line including a first reactant fluid line valve configured to selectively couple the first reactant inlet of each reactor in fluid communication with one of the supply of the first reactant and a first solvent supply;
(b) the second reactant feed assembly comprises:
(i) a second reactant distributor configured to couple in fluid communication with a supply of a second reactant; and
(ii) a plurality of second reactant fluid lines configured to selectively couple said second reactant distributor to each second reactant inlet of said plurality of chemical reactors, each second reactant fluid line being configured to provide a substantially equivalent flow rate, each second reactant fluid line including a second reactant fluid line valve configured to selectively couple the second reactant inlet of each reactor in fluid communication with one of the supply of the second reactant and a second solvent supply; and
(c) the product collection assembly comprises:
(i) a product collector configured to couple in fluid communication with the product receiver; and
(ii) a plurality of product fluid lines configured to selectively couple said product collector to each product outlet of said plurality of chemical reactors, each product fluid line being configured to provide a substantially equivalent flow rate, each product fluid line including a product fluid line valve configured to selectively couple the product outlet of each reactor in fluid communication with one of the product receiver and a waste receiver, whereby each chemical reactor can selectively be isolated from the other chemical reactors and flushed with solvent.

28. The concentrically parallel chemical production system of claim 26, further comprising a common heat exchange assembly coupled in fluid communication with each chemical reactor in at least one of the first and second stages, and a heat transfer media supply, the common heat exchange assembly providing substantially equivalent thermal conditions in each chemical reactor in at least one of the first and second stages.

29. The concentrically parallel chemical production system of claim 26, wherein said common heat exchange assembly comprises a first fluid line and a second fluid line, said first and second fluid lines being configured as concentric rings, and wherein the plurality of chemical reactors in the first stage are disposed between said concentric rings.

30. The concentrically parallel chemical production system of claim 26, wherein each chemical reactor comprises a microreactor.

31. The concentrically parallel chemical production system of claim 26, wherein each chemical reactor in at least one of the first and second stages is configured to provide substantially identical processing conditions.

32. The concentrically parallel chemical production system of claim 26, further comprising a system controller controllably coupled with said first reactant feed assembly, said second reactant feed assembly, and said product collection assembly, the system controller being programmed to monitor and control production of the desired chemical product by said plurality of chemical reactors, including designating one of said plurality of chemical reactors in the first stage as a backup reactor, such that the system controller causes:
  (a) said first reactant feed assembly to isolate said first reactant inlet of the backup reactor from the supply of the first reactant, while coupling said first reactant inlet of each other chemical reactor in fluid communication with the supply of the first reactant;
  (b) said second reactant feed assembly to isolate said second reactant inlet of the backup reactor from the supply of the second reactant, while coupling said second reactant inlet of each other chemical reactor in fluid communication with the supply of the second reactant; and
  (c) said product collection assembly to isolate said product outlet of the backup reactor from said product receiver, while coupling the product outlet of each other chemical reactor in fluid communication with the product receiver.

33. The concentrically parallel chemical production system of claim 32, wherein the system controller is programmed to designate a different one of the plurality of chemical reactors in the first stage as the backup reactor after a predefined period, a previously designated backup reactor being coupled in fluid communication with the supply of the first reactant, the supply of the second reactant, and the product receiver, while a newly designated backup reactor is isolated from the supply of the first reactant, the supply of the second reactant, and the product receiver, thereby making the newly designated backup reactor available for maintenance operations, to facilitate continuous production of the desired product over extended periods of time.

34. The concentrically parallel chemical production system of claim 32, wherein:

(a) the product collection assembly includes a sensor for each chemical reactor in the first stage, each sensor being disposed between the product outlet of the chemical reactor and the product receiver, each sensor being coupled to the system controller, so that an indication of the quality of the chemical product from the chemical reactor is provided to the system controller; and (b) the system controller is programmed to designate a different one of the plurality of chemical reactors as the backup reactor when one of said sensors indicates that the quality of the chemical product produced by its corresponding chemical reactor deviates substantially from a predetermined standard, a previously designated backup reactor being coupled with the supply of the first reactant, the supply of the second reactant, and the product receiver, while a newly designated backup reactor is isolated from the supply of the first reactant, the supply of the second reactant, and the product receiver, thereby making the newly designated backup reactor available for maintenance operations, to facilitate continuous production of the desired product over extended periods of time.

35. The concentrically parallel chemical production system of claim 26, further comprising a product heat exchange assembly configured to thermally condition a product discharged from each reactor outlet.

36. The concentrically parallel chemical production system of claim 26, wherein the product collection assembly comprises a thermal conditioning structure configured to thermally condition a product discharged from each reactor outlet.

37. A concentrically parallel chemical production system for producing a desired chemical product by combining at least two reactants, the chemical production system comprising:
  (a) a first stage including:
    (i) a plurality of chemical reactors, each chemical reactor being configured to produce a quantity of the desired chemical product, each chemical reactor of the plurality of chemical reactors having at least: a first reactant inlet, a second reactant inlet, a reaction volume coupled in fluid communication with the first reactant inlet and the second reactant inlet, and a product outlet, the plurality of chemical reactors being arranged in a generally concentric configuration, such that each reactor comprises an inner end and an outer end, each inner end being disposed relatively closer to a center of a circle defined by the plurality of chemical reactors than each outer end, the first reactant inlet and the second reactant inlet for each chemical reactor being disposed proximate the inner end of that reactor;
    (ii) a first reactant feed assembly configured to be placed in fluid communication with a supply of a first reactant, and to couple said first reactant inlet of each chemical reactor in parallel fluid communication with the supply of the first reactant; and
    (iii) a second reactant feed assembly configured to be placed in fluid communication with a supply of a second reactant, and to couple said second reactant inlet of each chemical reactor in parallel fluid communication with the supply of the second reactant;
  (b) a final product collection assembly configured to couple in fluid communication with a product receiver; and (c) at least one additional stage, each additional stage including a plurality of chemical reactors arranged in a generally concentric configuration, such that:
  (i) a number of the plurality of chemical reactors in each additional stage is equal to a number of the plurality of reactors in the first stage, and each chemical reactor in each additional stage includes at least an inlet and a product outlet;
  (ii) the inlet of each chemical reactor in each additional stage is coupled in fluid communication with one of the product outlet of a corresponding chemical reactor in the first stage or the product outlet of a corresponding chemical reactor in a preceding additional stage; and
  (iii) the outlet of each chemical reactor in each additional stage is coupled in fluid communication with one of the inlet of a corresponding chemical reactor in a subsequent additional stage, and the final product collection assembly.

38. The concentrically parallel chemical production system of claim 37, wherein at least one of the first stage and the at least one additional stage includes a product collection assembly configured to couple the product outlet of each chemical reactor in that stage, such that the product produced in that stage is provided to a subsequent stage as a single product stream.

39. The concentrically parallel chemical production system of claim 37, wherein the product outlet of each chemical reactor in the first stage is coupled to the inlet of a different chemical reactor in one of the at least one additional stages.

40. The concentrically parallel chemical production system of claim 37, further comprising a valve system disposed in fluid communication with each outlet of the plurality of chemical reactors in the first stage, and each inlet of the plurality of chemical reactors in a subsequent additional stage, the valve system enabling the selective coupling of the product outlet of each chemical reactor in the first stage to the inlet of a different selected chemical reactor in the subsequent additional stage.

41. The concentrically parallel chemical production system of claim 37, further comprising a system controller controllably connected to the first reactant feed assembly, the second reactant feed assembly, and the product collection assembly, the system controller being configured to automate operation of the concentrically parallel chemical production system.

42. The concentrically parallel chemical production system of claim 41, further comprising a plurality of sensors, each sensor being logically coupled with the system controller, each sensor being configured to provide an indication of a quality of a product produced in at least one of each chemical reactor in the first stage and each chemical reactor in each additional stage, the system controller being configured to designate each chemical reactor producing a product having a quality that is less than a predefined quality as a backup reactor.

43. An automated continuous processing parallel chemical production system for automatically producing a desired chemical product by combining at least two reactants, the chemical production system comprising:
  (a) a first stage including:
    (i) a plurality of chemical reactors, each chemical reactor being configured to produce a quantity of the desired chemical product, each chemical reactor of the plurality of chemical reactors having at least: a first reactant inlet, a second reactant inlet, and a product outlet;
    (ii) a first reactant feed assembly configured to be placed in fluid communication with a supply of a first reactant, and to couple the first reactant inlet of each chemical reactor in parallel fluid communication with the supply of the first reactant; and
    (iii) a second reactant feed assembly configured to be placed in fluid communication with a supply of a second reactant, and to couple the second reactant inlet of each chemical reactor in parallel fluid communication with the supply of the second reactant;
  (b) a product collection assembly configured to couple in fluid communication with a product receiver;
  (c) at least one additional stage, each additional stage including a plurality of additional chemical reactors, such that:
    (i) a number of the additional chemical reactors in each additional stage is equal to a number of the plurality of reactors in the first stage, and each additional chemical reactor includes at least an inlet and a product outlet;
    (ii) the inlet of each additional chemical reactor in each additional stage is coupled in fluid communication with one of the product outlet of a corresponding chemical reactor in the first stage or the product outlet of a corresponding chemical reactor in a preceding additional stage; and
    (iii) the outlet of each additional chemical reactor in each additional stage is coupled in fluid communication with one of the inlet of a corresponding chemical reactor in a subsequent additional stage, or the product collection assembly, the product collection assembly being further configured to selectively couple each product outlet of each additional chemical reactor in a final additional stage in fluid communication with a product receiver; and
  (d) a system controller controllably coupled with the first reactant feed assembly, the second reactant feed assembly, and the product collection assembly, the system controller monitoring and controlling production of the desired chemical product by the plurality of chemical reactors, and designating at least one of the plurality of chemical reactors in the first stage as a backup reactor, and at least one of the plurality of additional chemical reactors in each additional stage as a backup reactor, such that the system controller causes:
    (i) the first reactant feed assembly to isolate the first reactant inlet of the backup reactor from the supply of the first reactant, while continuing to couple the first reactant inlet of each other chemical reactor in parallel fluid communication with the supply of the first reactant;
    (ii) the second reactant feed assembly to isolate the second reactant inlet of the backup reactor from the supply of the second reactant, while continuing to couple the second reactant inlet of each other chemical reactor in parallel fluid communication with the supply of the second reactant; and
    (iii) the product collection assembly to isolate the product outlet of each additional chemical reactor in the final additional stage that is designated as a backup reactor from a product receiver, while continuing to couple the product outlet of each other additional chemical reactor in the final additional stage in fluid communication with a product receiver.

44. An automated continuous processing parallel chemical production system for automatically producing a desired chemical product by combining at least two reactants, the chemical production system comprising:

(a) a first stage including:
  (i) a plurality of chemical reactors, each chemical reactor being configured to produce a quantity of the desired chemical product, each chemical reactor of the plurality of chemical reactors having at least: a first reactant inlet, a second reactant inlet, and a product outlet;
  (ii) a first reactant feed assembly configured to be placed in fluid communication with a supply of a first reactant, and to couple the first reactant inlet of each chemical reactor in parallel fluid communication with the supply of the first reactant; and
  (iii) a second reactant feed assembly configured to be placed in fluid communication with a supply of a second reactant, and to couple the second reactant inlet of each chemical reactor in parallel fluid communication with the supply of the second reactant;
(b) a second stage including a plurality of additional chemical reactors, such that:
  (i) there are at least as many additional chemical reactors in the second stage as there are chemical reactors in the first stage; and
  (ii) each additional chemical reactor in the second stage includes at least: an inlet and a second stage product outlet, each additional chemical reactor inlet being configured to receive a product produced in the first stage and to use the product as a reactant to produce a second stage product;
(c) a product collection assembly configured to couple the second stage product outlet of each chemical reactor in the second stage in fluid communication with a product receiver; and
(d) a system controller controllably coupled with the first reactant feed assembly, the second reactant feed assembly, and the product collection assembly, the system controller monitoring and controlling production of the desired chemical product by the plurality of chemical reactors, and designating at least one of the plurality of chemical reactors in the first stage as a backup reactor, and at least one of the plurality of additional chemical reactors in the second stage as a backup reactor, such that the system controller causes:
  (i) the first reactant feed assembly to isolate the first reactant inlet of the backup reactor from the supply of the first reactant, while continuing to couple the first reactant inlet of each other chemical reactor in parallel fluid communication with the supply of the first reactant;
  (ii) the second reactant feed assembly to isolate the second reactant inlet of the backup reactor from the supply of the second reactant, while continuing to couple the second reactant inlet of each other chemical reactor in parallel fluid communication with the supply of the second reactant; and
  (iii) the product collection assembly to isolate the second stage product outlet of the second stage backup reactor from the product receiver, while continuing to couple the second stage product outlet of each other additional chemical reactor in the second stage in fluid communication with the product receiver.

45. The automated continuous processing parallel chemical production system of claim 44, wherein:
(a) the first stage further includes a first stage product collection assembly configured to couple the product outlet of each chemical reactor in the first stage in fluid communication with the second stage, the first stage product collection assembly including a product fluid channel and a waste fluid channel, the first stage product collection assembly being controllably coupled to the system controller, such that the system controller causes the first stage product collection assembly to couple the product outlet of the first stage backup reactor to the waste fluid channel, while coupling the product outlet of each other chemical reactor in the first stage in fluid communication with the product fluid channel, such that the product produced in the first stage is provided to the second stage as a single product stream; and
(b) the second stage further includes a second stage reactant feed assembly configured to be placed in fluid communication with the first stage product collection assembly, and to couple the inlet of each additional chemical reactor in the second stage in parallel fluid communication with the first stage product collection assembly, the second stage reactant feed assembly being controllably coupled to the system controller, such that the system controller causes the second stage reactant feed assembly to isolate the inlet of the second stage backup reactor from the product fluid channel of the first stage product collection assembly, while coupling the inlet of each other additional chemical reactor in the second stage in fluid communication with the product fluid channel of the first stage product collection assembly.

46. The automated continuous processing parallel chemical production system of claim 44, wherein the product outlet of each chemical reactor in the first stage is coupled to the inlet of a different additional chemical reactor in the second stage.

47. The automated continuous processing parallel chemical production system of claim 44, further comprising a valve system disposed in fluid communication with each outlet of the plurality of chemical reactors in the first stage, and each inlet of the plurality of additional chemical reactors in the second stage, the valve system being controllably coupled to the system controller, such that the system controller causes:
(a) the product outlet of the designated backup reactor in the first stage to be coupled in fluid communication with the inlet of the designated backup reactor in the second stage; and
(b) the product outlet of each chemical reactor in the first stage not designated as the backup reactor in the first stage to be coupled in fluid communication with the inlet of a selected different one of the additional chemical reactors in the second stage, where the different one of the additional chemical reactors is not designated as the backup reactor in the second stage.

48. The automated continuous processing parallel chemical production system of claim 44, wherein the plurality of reactors in the first stage are arranged in a substantially concentric orientation, to enhance the distribution of reactants to the plurality of chemical reactors.

49. The automated continuous processing parallel chemical production system of claim 44, further comprising a plurality of sensors, each sensor being logically coupled with the system controller, each sensor being configured to provide an indication of the quality of a product produced in at least one of each chemical reactor in the first stage and each additional chemical reactor in the second stage, the system controller being configured to designate each reactor producing a product having a quality that is less than a predefined quality as a backup reactor.

50. A concentrically parallel chemical production system for producing a desired chemical product by combining at least two reactants, the chemical production system comprising:
(a) a first stage including:
(i) a plurality of chemical reactors, each chemical reactor being configured to produce a quantity of the desired chemical product, each chemical reactor of the plurality of chemical reactors having at least: a first reactant inlet, a second reactant inlet, a reaction volume coupled in fluid communication with the first reactant inlet and the second reactant inlet, and a product outlet, the plurality of chemical reactors being arranged in a generally concentric configuration, such that each reactor comprises an inner end and an outer end, each inner end being disposed relatively closer to a center of a circle defined by the plurality of chemical reactors than each outer end, the first reactant inlet and the second reactant inlet for each chemical reactor being disposed proximate the inner end of that reactor; and
(ii) a reactant feed apparatus including:
(1) a first reactant feed assembly configured to be placed in fluid communication with a supply of a first reactant, and to couple said first reactant inlet of each chemical reactor in parallel fluid communication with the supply of the first reactant; and
(2) a second reactant feed assembly configured to be placed in fluid communication with a supply of a second reactant, and to couple said second reactant inlet of each chemical reactor in parallel fluid communication with the supply of the second reactant; and
(b) a second stage including a plurality of additional chemical reactors and a product collection assembly, the plurality of additional chemical reactors and the product collection assembly being configured such that;
(i) a number of the additional chemical reactors in the second stage is equal to a number of the plurality of reactors in the first stage;
(ii) each additional chemical reactor in the second stage includes at least: an inlet, and a second stage product outlet;
(iii) the product collection assembly is configured to be placed in fluid communication with a product receiver, and to couple the second stage product outlet of each chemical reactor in the second stage in fluid communication with the product receiver; and
(iv) each product outlet of each chemical reactor in the first stage is coupled to the inlet of a different one of the additional chemical reactors in the second stage, such that each additional chemical reactor in the second stage is coupled with only one chemical reactor in the first stage.

51. A concentrically parallel chemical production system for producing a desired chemical product by combining at least two reactants, the chemical production system comprising:
(a) a first stage including:
(i) a plurality of chemical reactors, each chemical reactor being configured to produce a quantity of the desired chemical product, each chemical reactor of the plurality of chemical reactors having at least: a first reactant inlet, a second reactant inlet, a reaction volume coupled in fluid communication with the first reactant inlet and the second reactant inlet, and a product outlet, the plurality of chemical reactors being arranged in a generally concentric configuration, such that each reactor comprises an inner end and an outer end, each inner end being disposed relatively closer to a center of a circle defined by the plurality of chemical reactors than each outer end, the first reactant inlet and the second reactant inlet for each chemical reactor being disposed proximate the inner end of that reactor; and
(ii) a reactant feed apparatus including:
(1) a first reactant feed assembly configured to be placed in fluid communication with a supply of a first reactant, and to couple said first reactant inlet of each chemical reactor in parallel fluid communication with the supply of the first reactant; and
(2) a second reactant feed assembly configured to be placed in fluid communication with a supply of a second reactant, and to couple said second reactant inlet of each chemical reactor in parallel fluid communication with the supply of the second reactant;
(b) a second stage including a plurality of additional chemical reactors and a product collection assembly, the plurality of additional chemical reactors and the product collection assembly being configured such that;
(i) a number of the additional chemical reactors in the second stage is equal to a number of the plurality of reactors in the first stage;
(ii) each additional chemical reactor in the second stage includes at least: an inlet, and a second stage product outlet;
(iii) the product collection assembly is configured to be placed in fluid communication with a product receiver, and to couple the second stage product outlet of each chemical reactor in the second stage in fluid communication with the product receiver; and
(iv) each product outlet of each chemical reactor in the first stage is coupled to the inlet of a different one of the additional chemical reactors in the second stage, such that each additional chemical reactor in the second stage is coupled with only one chemical reactor in the first stage; and
(c) a valve system disposed in fluid communication with the outlet of each of the plurality of chemical reactors in the first stage, and the inlet of each of the plurality of additional chemical reactors in the second stage, the valve system enabling the selective coupling of the product outlet of each chemical reactor in the first stage to the inlet of a selected additional chemical reactor in the second stage.

* * * * *

UNITED STATES PATENT AND TRADEMARK OFFICE
CERTIFICATE OF CORRECTION

PATENT NO. : 7,435,392 B2  Page 1 of 1
APPLICATION NO. : 10/456162
DATED : October 14, 2008
INVENTOR(S) : Oberbeck et al.

It is certified that error appears in the above-identified patent and that said Letters Patent is hereby corrected as shown below:

| | |
|---|---|
| Column 2, line 32 | "microreactors" should read --microreactors'-- |
| Column 16, line 31 | "seconds" should read --second-- |
| Column 16, line 34 | "reasons" should read --reason-- |
| Column 17, line 53 | "in" (1st occurrence) should read --is-- |
| Column 21, line 15 | after "vice" delete "a" |
| Column 23, line 64 | after "intervals" delete "value" |
| Column 28, line 41 | "PC 30" should read --PC 730-- |
| Column 37, line 8 | after "of" insert therefor --the-- |
| Column 39, line 35 | after "reactants" insert therefor --to-- |
| Column 40, line 30 | after "on" delete "a" |
| Column 45, line 50 | "opening" should read --openings-- |
| Column 47, line 32 | after "from" delete "with" |
| Column 49, line 7 | "1470" (2nd occurrence) should read --1570-- |

Signed and Sealed this

Sixth Day of July, 2010

David J. Kappos
*Director of the United States Patent and Trademark Office*